United States Patent
Chun et al.

(10) Patent No.: US 12,495,381 B2
(45) Date of Patent: Dec. 9, 2025

(54) NETWORK SLICE PROVISION MANAGEMENT

(71) Applicant: Ofinno, LLC, Reston, VA (US)

(72) Inventors: SungDuck Chun, Fairfax, VA (US); Peyman Talebi Fard, Vienna, VA (US); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/046,982

(22) Filed: Feb. 6, 2025

(65) Prior Publication Data

US 2025/0184942 A1 Jun. 5, 2025

Related U.S. Application Data

(63) Continuation of application No. PCT/US2024/015208, filed on Feb. 9, 2024.

(60) Provisional application No. 63/444,775, filed on Feb. 10, 2023.

(51) Int. Cl.
*H04W 60/04* (2009.01)
*H04W 48/16* (2009.01)
*H04W 48/18* (2009.01)

(52) U.S. Cl.
CPC ........... *H04W 60/04* (2013.01); *H04W 48/16* (2013.01); *H04W 48/18* (2013.01)

(58) Field of Classification Search
CPC ...... H04W 60/04; H04W 48/16; H04W 48/18
See application file for complete search history.

(56) References Cited

U.S. PATENT DOCUMENTS

| | | | |
|---|---|---|---|
| 11,943,306 B2 * | 3/2024 | Suh | H04L 67/141 |
| 12,028,341 B2 * | 7/2024 | Kunz | H04L 63/0892 |
| 2023/0052699 A1 * | 2/2023 | Ninglekhu | H04W 48/16 |
| 2024/0064626 A1 * | 2/2024 | Chun | H04W 48/16 |
| 2025/0016644 A1 * | 1/2025 | Panchal | H04W 76/12 |
| 2025/0184942 A1 * | 6/2025 | Chun | H04W 48/18 |

FOREIGN PATENT DOCUMENTS

| | | | |
|---|---|---|---|
| CN | 113498086 A | 10/2021 | |
| WO | WO-2021135187 A1 * | 7/2021 | ............ H04W 76/10 |
| WO | WO-2023008504 A1 * | 2/2023 | ............ H04W 36/08 |
| WO | 2024/062387 A1 | 3/2024 | |
| WO | 2024/083572 A1 | 4/2024 | |

OTHER PUBLICATIONS

3GPP TR 23.700-41 V18.0.0 (Dec. 2022); Technical Report; 3rd Generation Partnership Project; Technical Specification Group Services and System Aspects; Study on enhancement of network slicing; Phase 3; (Release 18).

(Continued)

*Primary Examiner* — Julio R Perez
(74) *Attorney, Agent, or Firm* — Sachin Kandhari; Kavon Nasabzadeh; Jacob L. Mangan

(57) ABSTRACT

A wireless device receives, from a core network node, one or more messages comprising an identifier of a network slice, an identifier of an alternative network slice mapped to the network slice, and an identifier of a network slice group associated with the alternative network slice.

20 Claims, 27 Drawing Sheets

(56) References Cited

OTHER PUBLICATIONS

3GPP TS 24.501 V18.1.0 (Dec. 2022); Technical Specification; 3rd Generation Partnership Project; Technical Specification Group Core Network and Terminals; Non-Access-Stratum (NAS) protocol for 5G System (5GS); Stage 3; (Release 18).
3GPP TS 38.423 V17.2.0 (Sep. 2022); Technical Specification; 3rd Generation Partnership Project; Technical Specification Group Radio Access Network; NG-RAN; Xn application protocol (XnAP); (Release 17).
S2-2208409; 3GPP TSG-WG SA2 Meeting #153E e-meeting; Elbonia, Oct. 10-17, 2022; Source: Huawei, HiSilicon; Title: Evaluation and conclusion for KI#1: Support of Network Slice Service continuity; Document for: Approval.
S2-2208944; 3GPP TSG-WG SA2 Meeting #153E e-meeting; Elbonia, Oct. 10-17, 2022; (revision of S2-220xxxx); Source: Lenovo, ZTE, NEC, Apple, Ericsson; Title: KI#1 Evaluation and Conclusions; Document for: Approval.
S2-2210376; SA WG2 Meeting #154; Toulouse, France, Nov. 14-18, 2022; (revision of S2-220xxxx); Source: LG Electronics; Title: Update of conclusion on KI#1; Document for: Approval.
S2-2210717; 3GPP TSG-WG SA2 Meeting #154 e-meeting; Toulouse, Nov. 14 -18, 2022; (revision of S2-220xxxx); Source: Nokia, Nokia Shanghai Bell, NTT Docomo; Title: KI#3 Updated evaluations and conclusions; Document for: Approval.
S2-2210752; f3GPP SA WG2 Meeting #154; Toulouse, France, Nov. 14-18, 2022; (was S2-2208764); Source: Ericsson; Title: KI#3: Conclusion for KI#3; Document for: Discussion/Approval; Agenda Item: 9.14.1; Work Item / Release: FS_eNS_PH3.
S2-2300294; 3GPP TSG-WG SA2 Meeting #154-AH-e; Jan. 16-20, 2023; Elbonia; Change Request; 23.502; CR 3698; rev-; Current version: 18.0.0.
S2-2300570; 3GPP TSG-SA WG2 Meeting #154AH-E; Elbonia, Jan. 16-20, 2023; (revision of S2-230xxxx); Change Request; 23.502; CR 3749; rev-; Current version: 18.0.0.
S2-2300651; 3GPP TSG-SA WG2 Meeting #154-AH-E (e-meeting); Jan. 16-20, 2023, Electronic Meeting; Change Request; 23.502; CR 3764; rev-; Current version: 18.0.0.
S2-2300871; 3GPP TSG SA-WG2 Meeting #154AH; Online, Jan. 16-20, 2023; (revision of); Change Request; 23.501; CR 4004; rev-; Current version: 18.0.0.
S2-2300905; 3GPP TSG-WG SA2 Meeting #154AH; Online, Jan. 16-20, 2023; (revision of); Change Request; 23.502; CR 3813; rev-; Current version: 18.0.0.
S2-2300912; 3GPP TSG-WG SA2 Meeting #154AH; Online, Jan. 16-20, 2023; (revision of); Change Request; 23.502; CR 3814; rev-; Current version: 18.0.0.
S2-2300922; 3GPP TSG-WG SA2 Meeting #154AH; Online, Jan. 16-20, 2023; (revision of); Change Request; 23.503; CR 0869; rev-; Current version: 18.0.0.
S2-2300998; 3GPP TSG-SA2 Meeting #154-AH-E; Elbonia, Jan. 16-20, 2023; (revision of S2-230xxxx); Change Request; 23.502; CR 3825; rev-; Current version: 18.0.0.
S2-2301183; 3GPP TSG-WG SA2 Meeting #154AH; Online, Jan. 16-20, 2023; (revision of); Change Request; 23.502; CR 3852; rev-; Current version: 18.0.0.
S2-2301601; 3GPP TSG-WG SA2 Meeting #154-AH-e; Jan. 16-20, 2023; Elbonia; Change Request; 23.501; CR 3867;rev 1; Current version: 18.0.0.
S2-2301602; 3GPP TSG-WG SA2 Meeting #154AH; Online, Jan. 16-20, 2023; (revision of 1182r14); Change Request; 23.501; CR 4083; rev 1; Current version: 18.0.0.
S2-2300650; 3GPP TSG-SA WG2 Meeting #154-AH-E (e-meeting); Jan. 16-20, 2023, Electronic Meeting; Change Request; 23.501; CR 3957; rev-; Current version: 18.0.0.
International Search Report and Written Opinion of the International Searching Authority mailed Jun. 17, 2024, in International Application No. PCT/US2024/015208.
C1-222953; 3GPP TSG-CT WG1 Meeting #135-e; E-Meeting, Apr. 6-12, 2022; Source: Samsung; Title: Discussion on S-NSSAI selection with NSSRG information; Agenda item: 17.2.14; Document for: Discussion.
3GPP TS 29.510 V17.8.0 (Dec. 2022); Technical Specification; 3rd Generation Partnership Project; Technical Specification Group Core Network and Terminals; 5G System; Network Function Repository Services; Stage 3; (Release 17).
3GPP TS 23.501 V18.0.0 (Dec. 2022); Technical Specification; 3rd Generation Partnership Project; Technical Specification Group Services and System Aspects; System architecture for the 5G System (5GS); Stage 2 (Release 18).
European Office Action mailed May 21, 2025 in EP Patent Application No. 24713096.6.

* cited by examiner

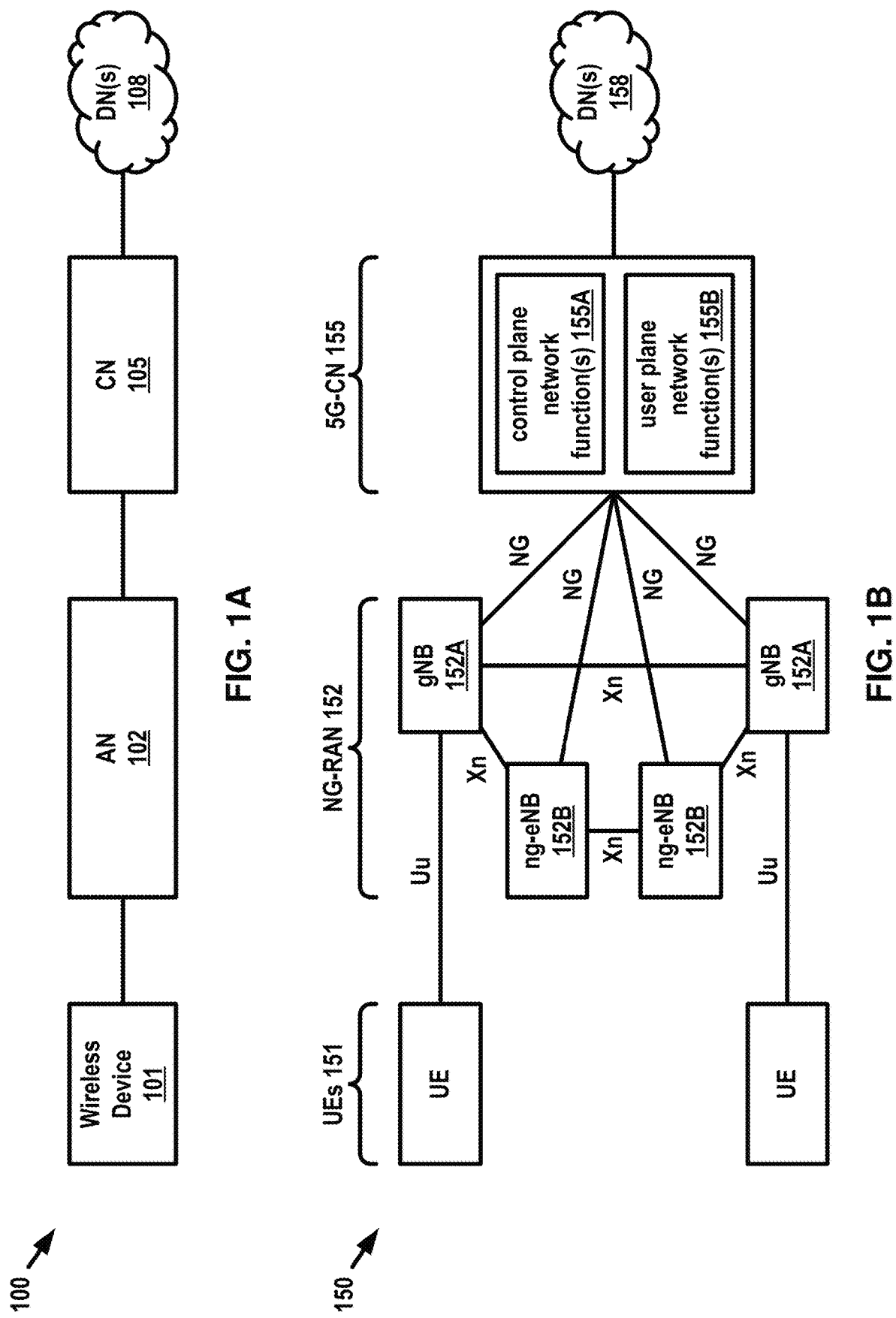

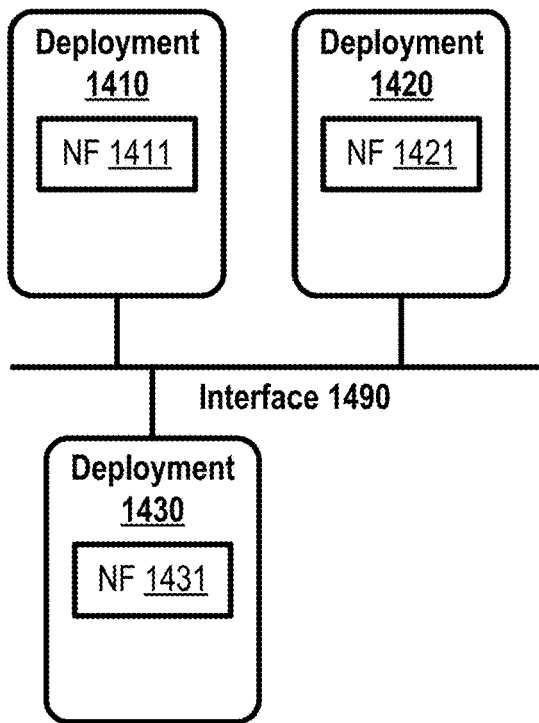
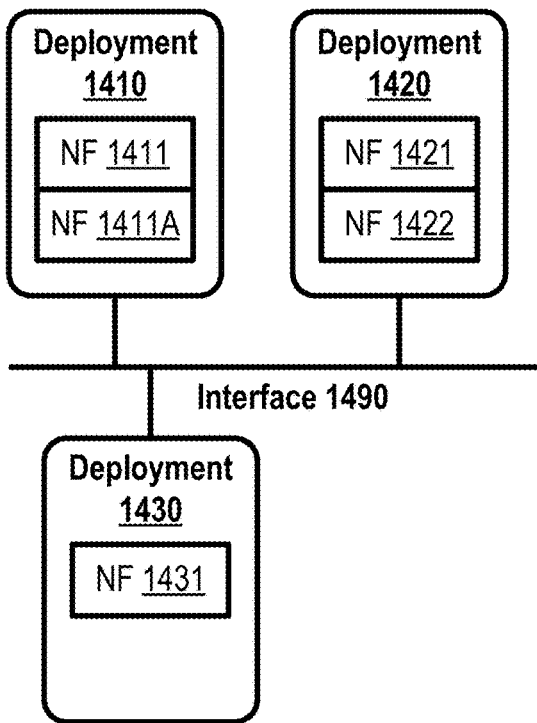
FIG. 14A
FIG. 14B
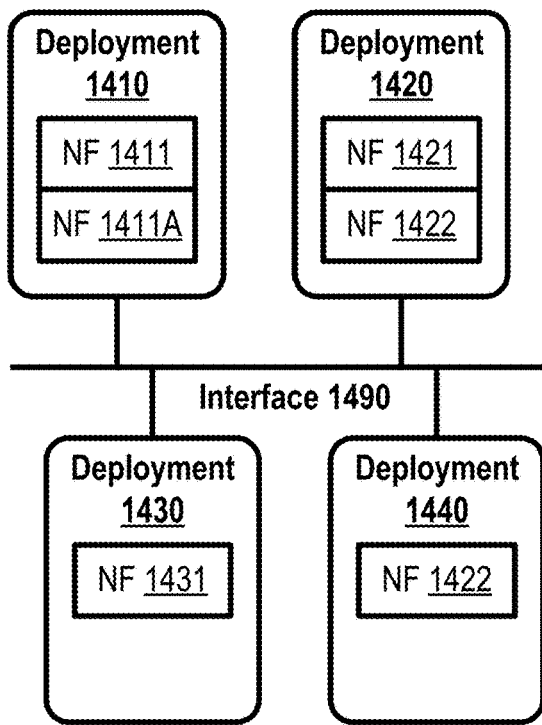
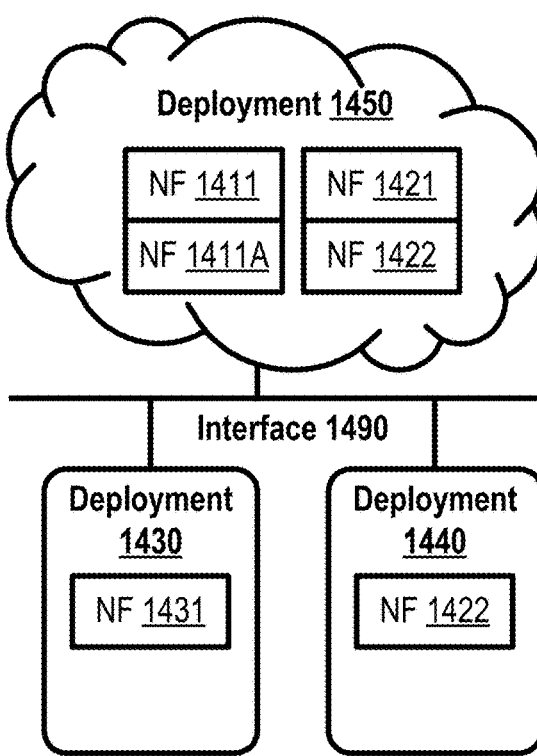
FIG. 14C
FIG. 14D

NETWORK SLICE PROVISION MANAGEMENT

CROSS-REFERENCE TO RELATED APPLICATIONS

This application is a continuation of International Application No. PCT/US2024/015208, filed Feb. 9, 2024, which claims the benefit of U.S. Provisional Application No. 63/444,775, filed Feb. 10, 2023, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example communication networks including an access network and a core network.

FIG. 14A, FIG. 14B, FIG. 14C, and FIG. 14D illustrate various examples of physical core network deployments, each having one or more network functions or portions thereof.

DETAILED DESCRIPTION

Figure 2A:
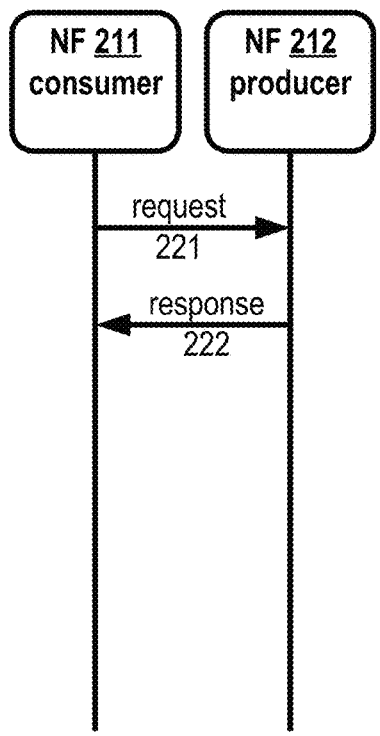
FIG. 2A, FIG. 2B, FIG. 2C, and FIG. 2D illustrate various examples of a framework for a service-based architecture within a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more". In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNS) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNS (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

Figure 2B:
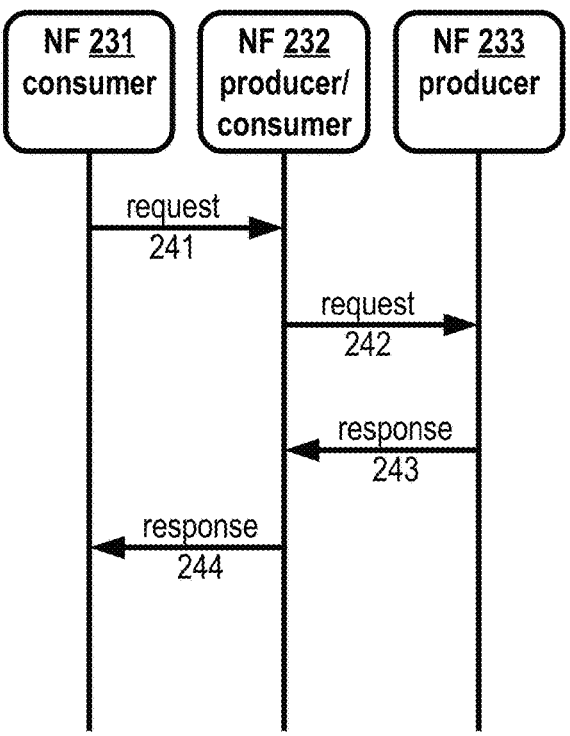

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

Figure 2C:
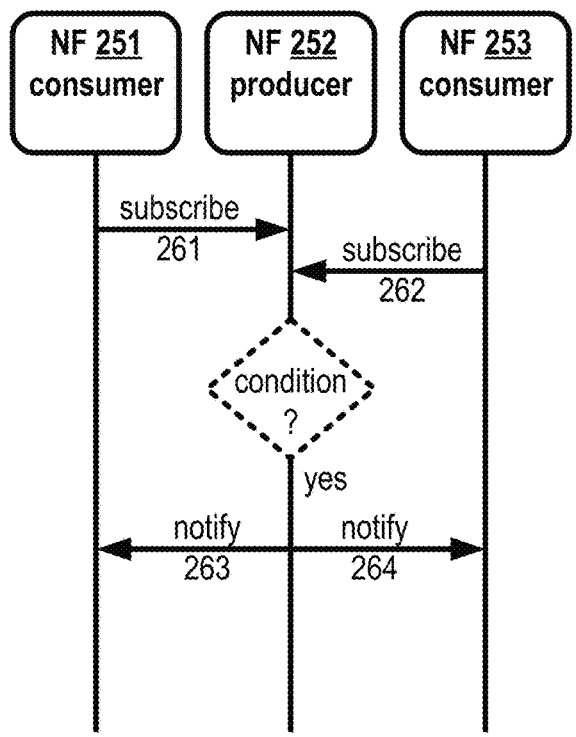

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

Figure 2D:
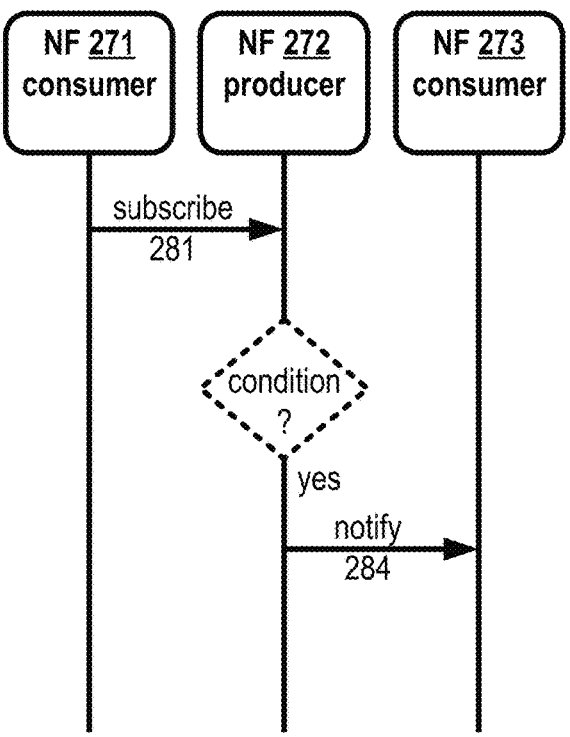

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
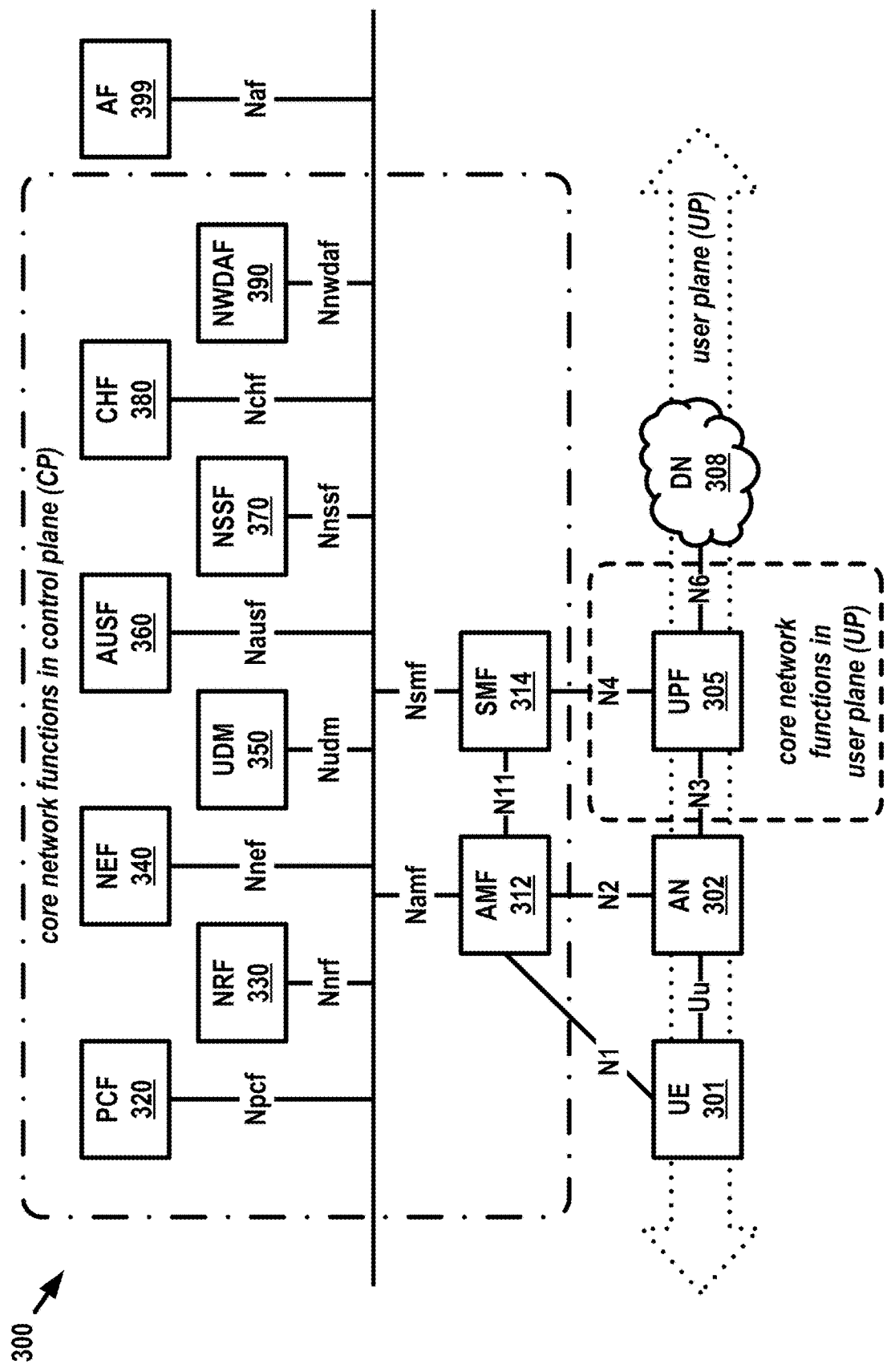
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QOS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
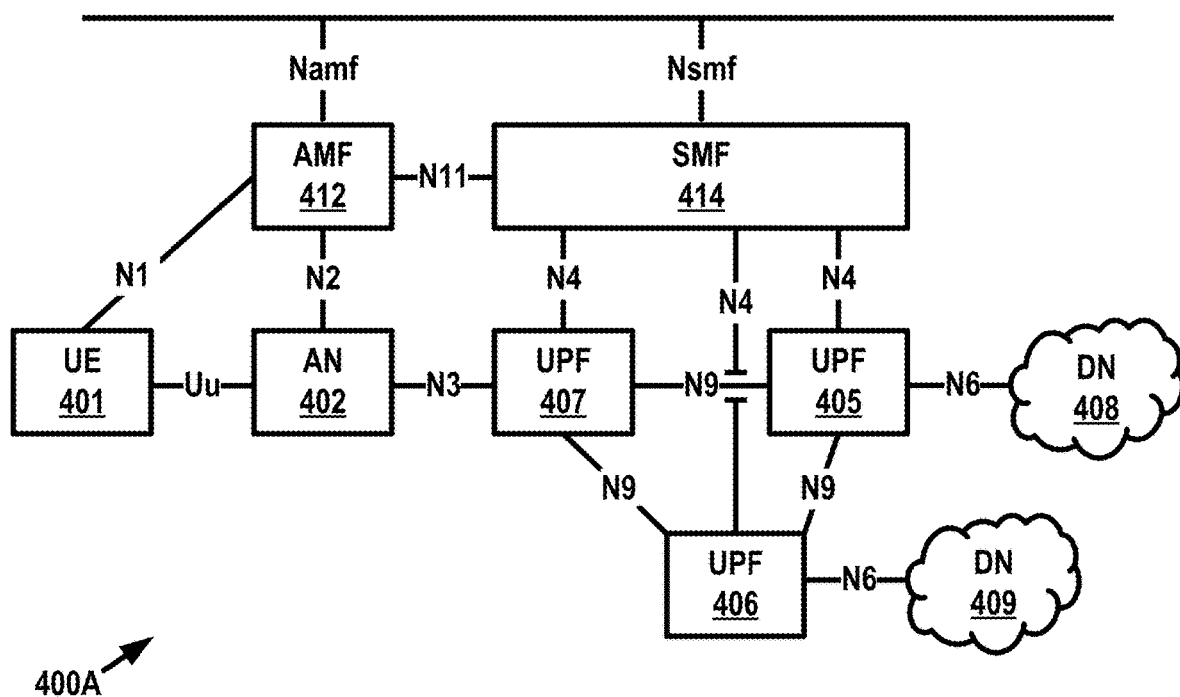
FIG. 4A and FIG. 4B illustrate examples of core network architecture with multiple user plane functions and untrusted access.
Figure 4B:
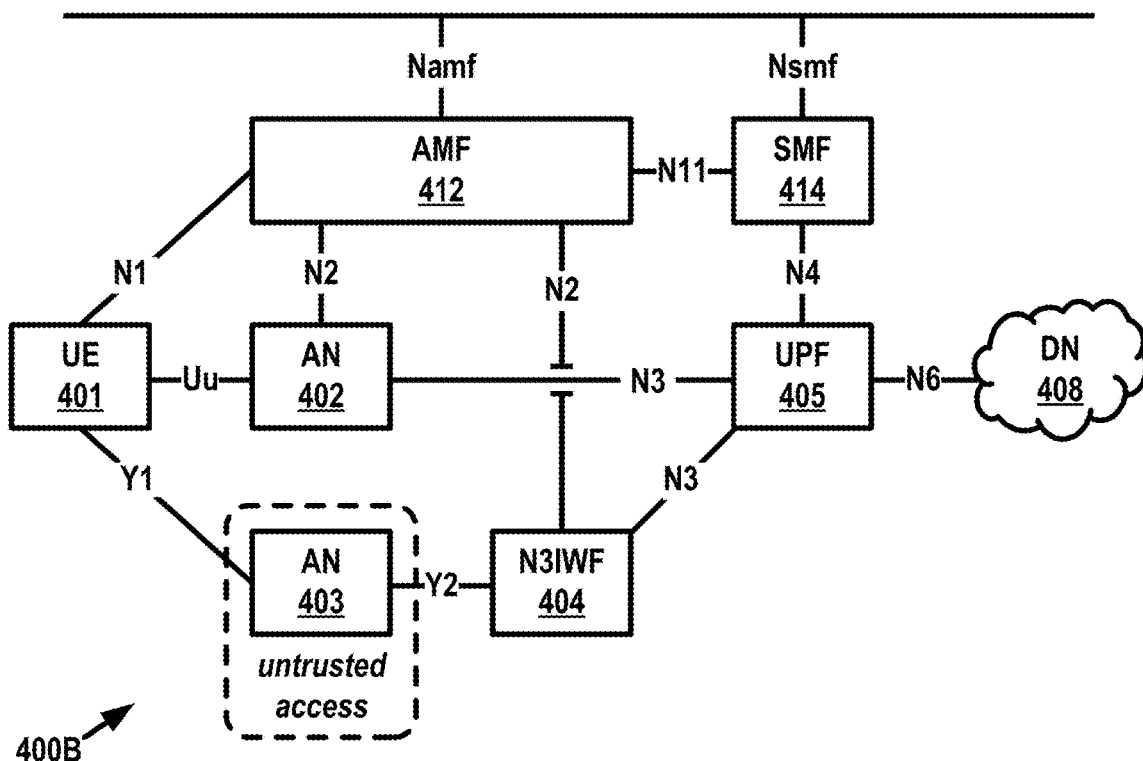
Figure 5:
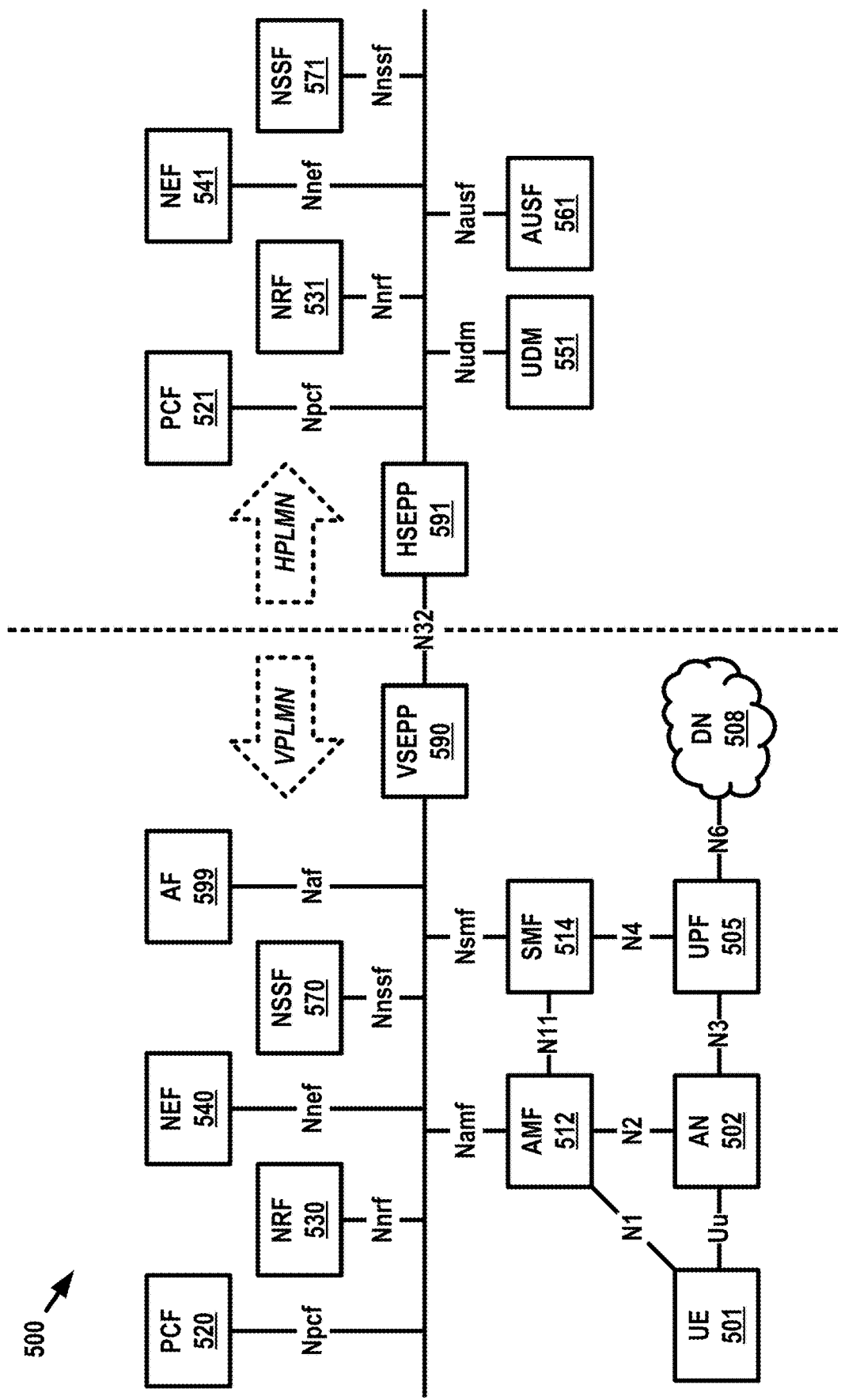
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QOS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNS (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
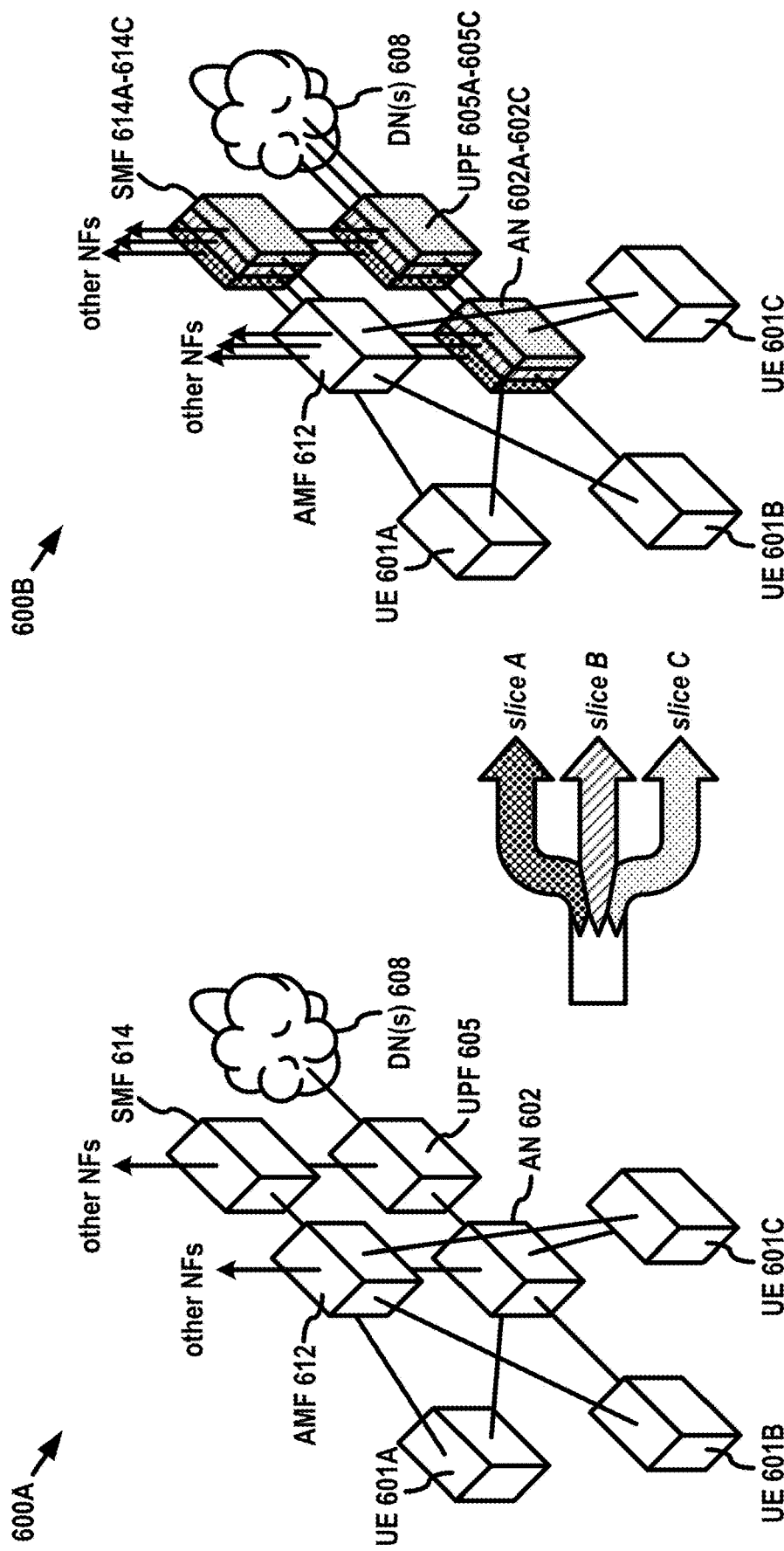
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

Figure 7C:
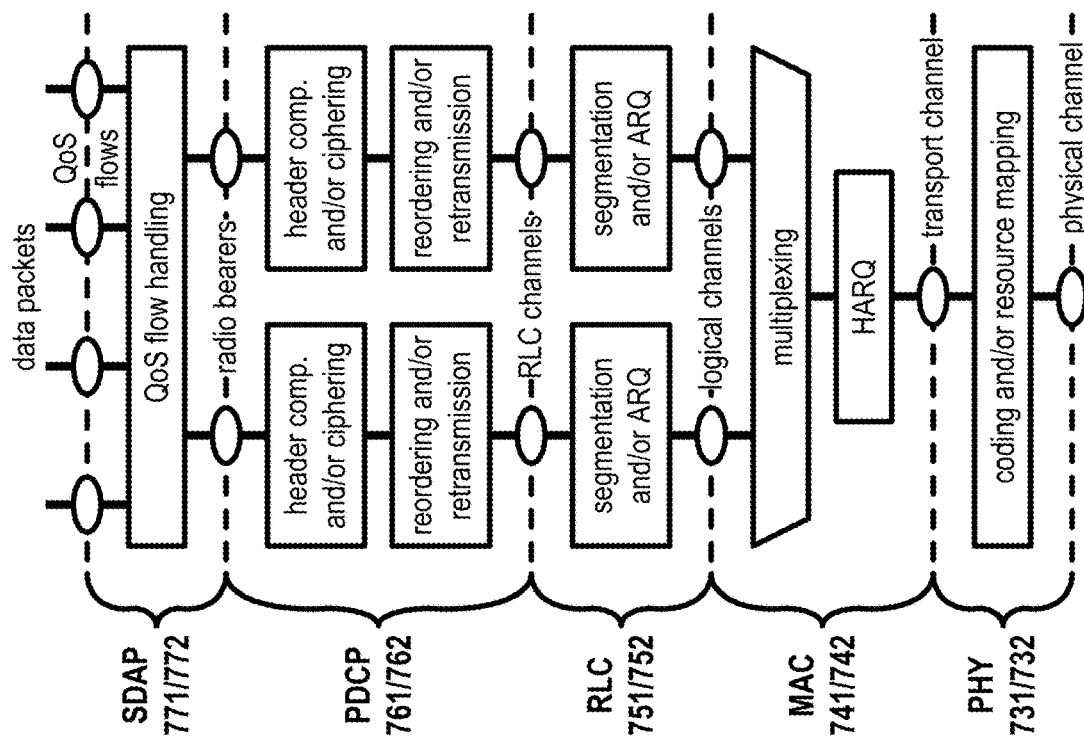
FIG. 7A, FIG. 7B, and FIG. 7C illustrate a user plane protocol stack, a control plane protocol stack, and services provided between protocol layers of the user plane protocol stack.
Figure 7A:
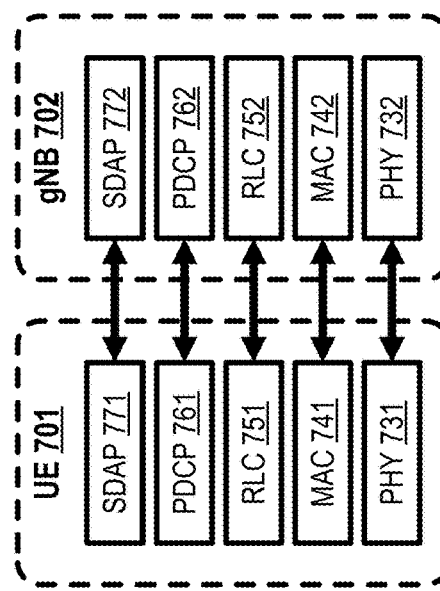
Figure 7B:
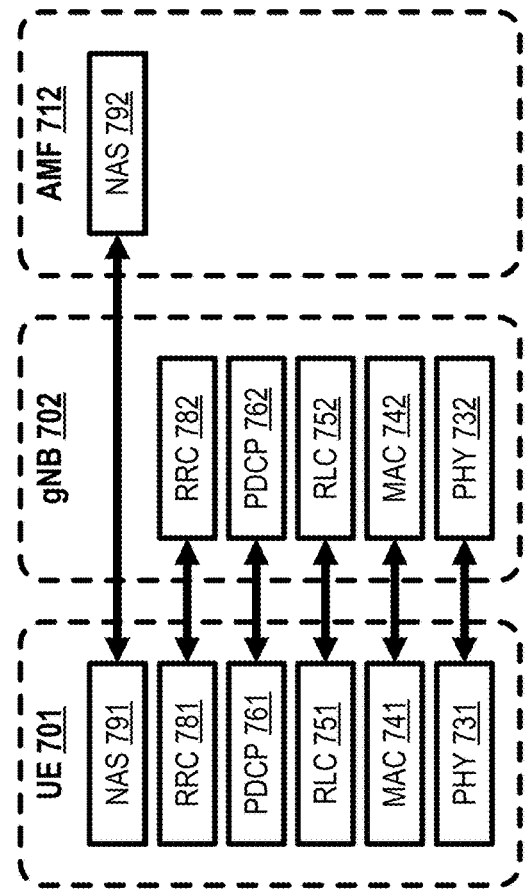

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QOS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
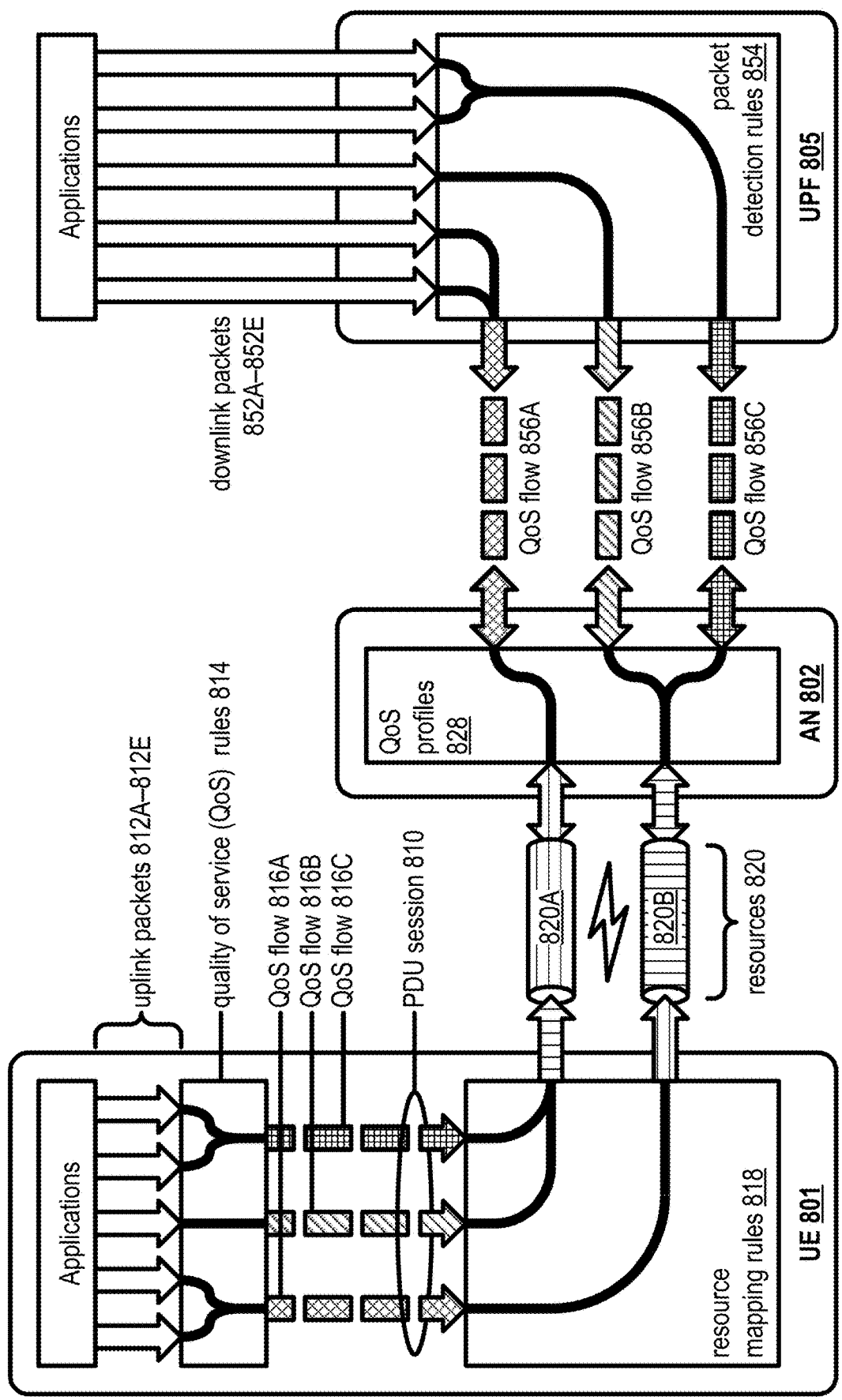
FIG. 8 illustrates an example of a quality of service model for data exchange.

FIG. 8 illustrates an example of a quality of service (QOS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
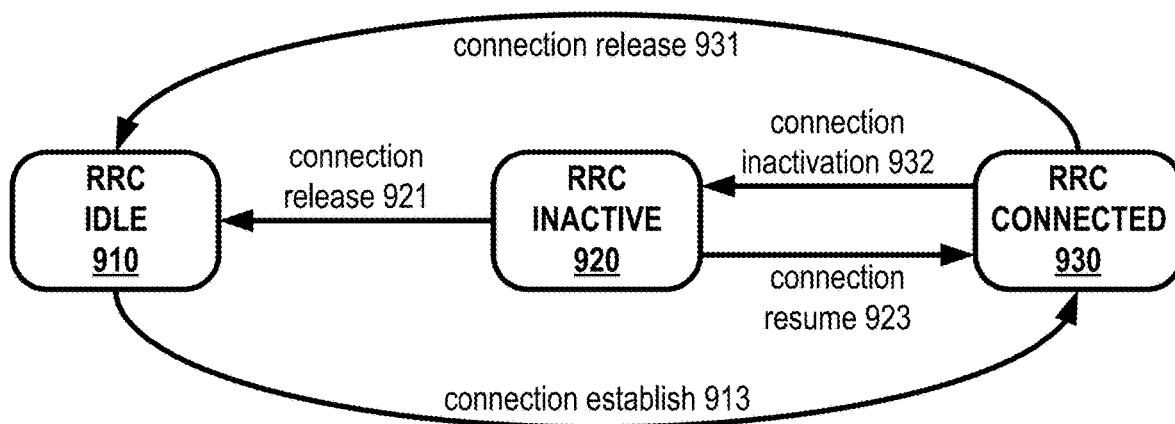
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
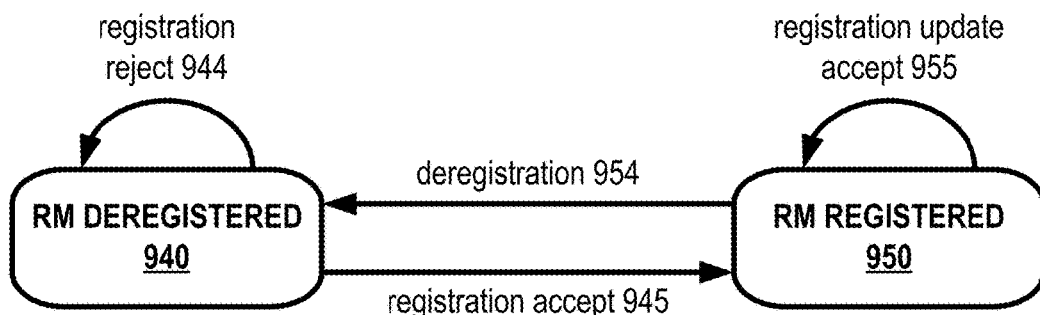

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
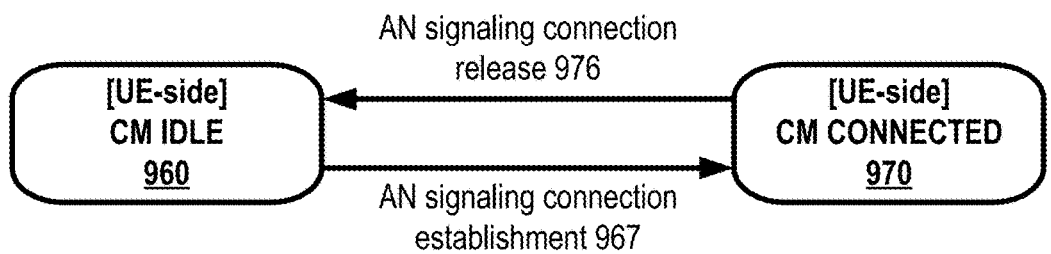

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
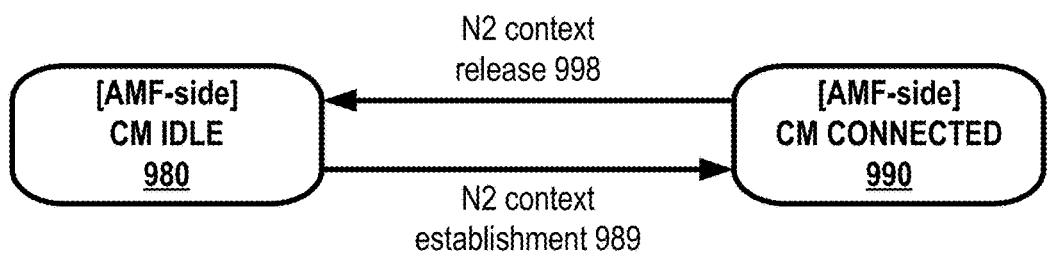

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
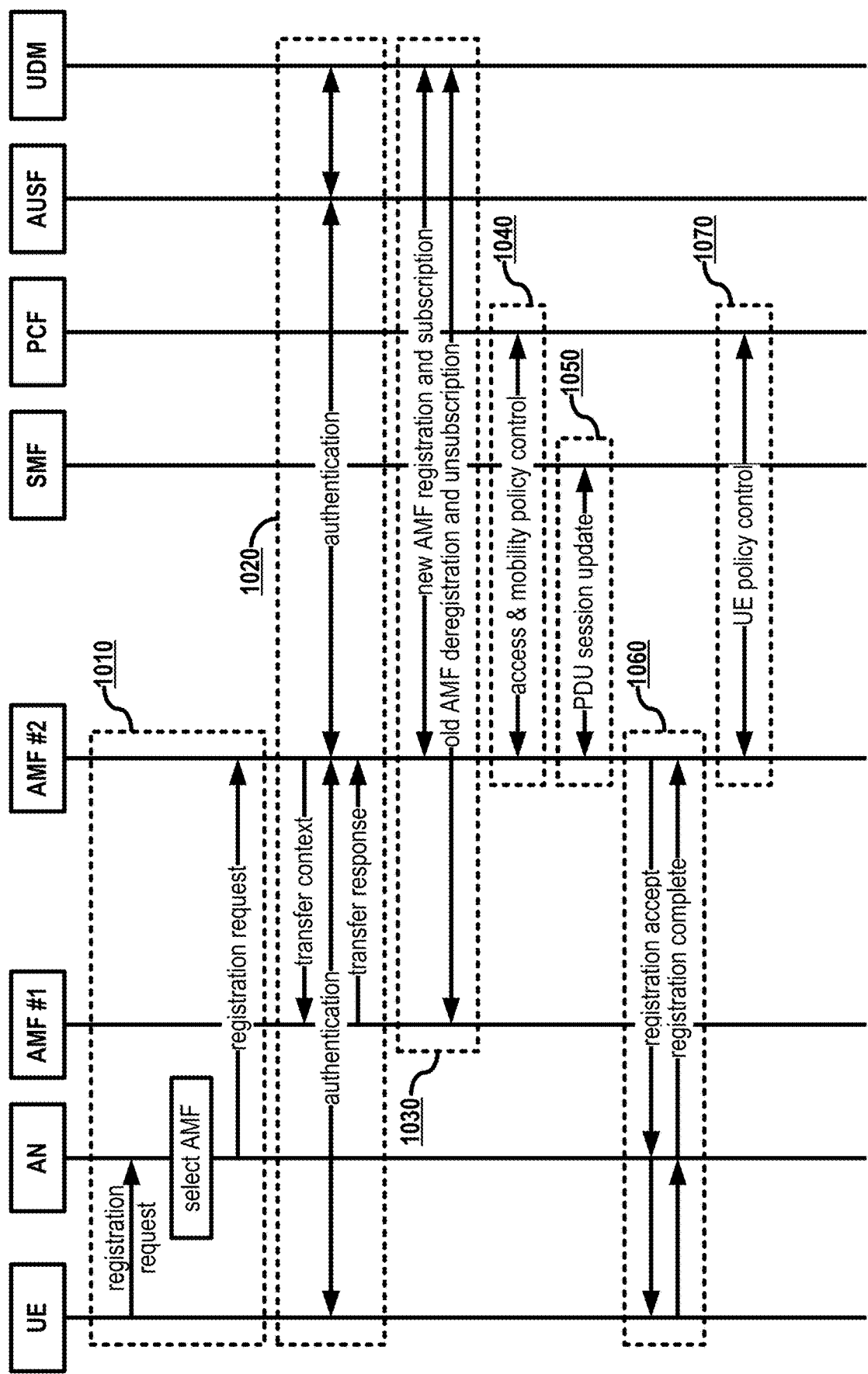
FIG. 10 illustrates an example of a registration procedure for a wireless device.
Figure 11:
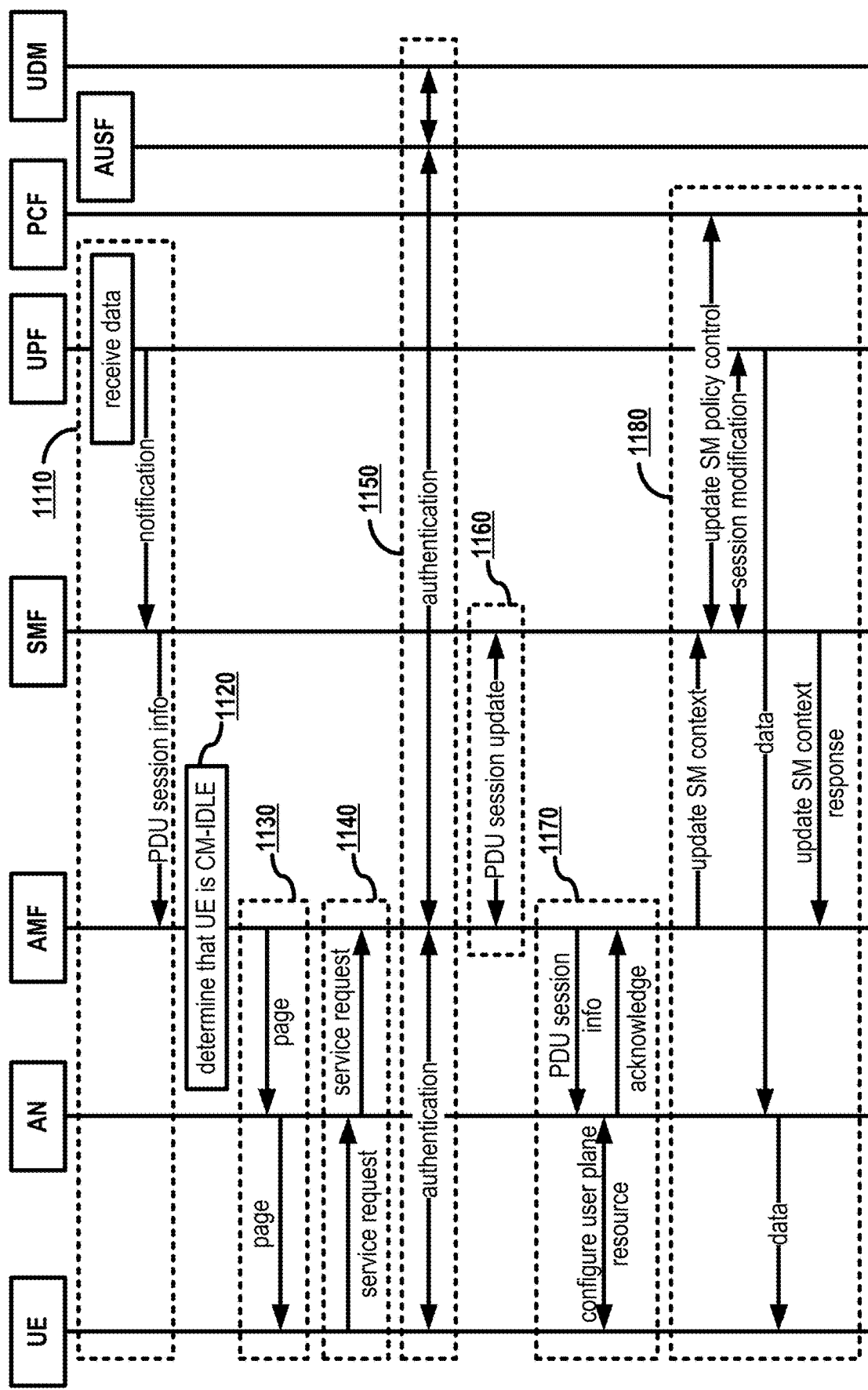
FIG. 11 illustrates an example of a service request procedure for a wireless device.
Figure 12:
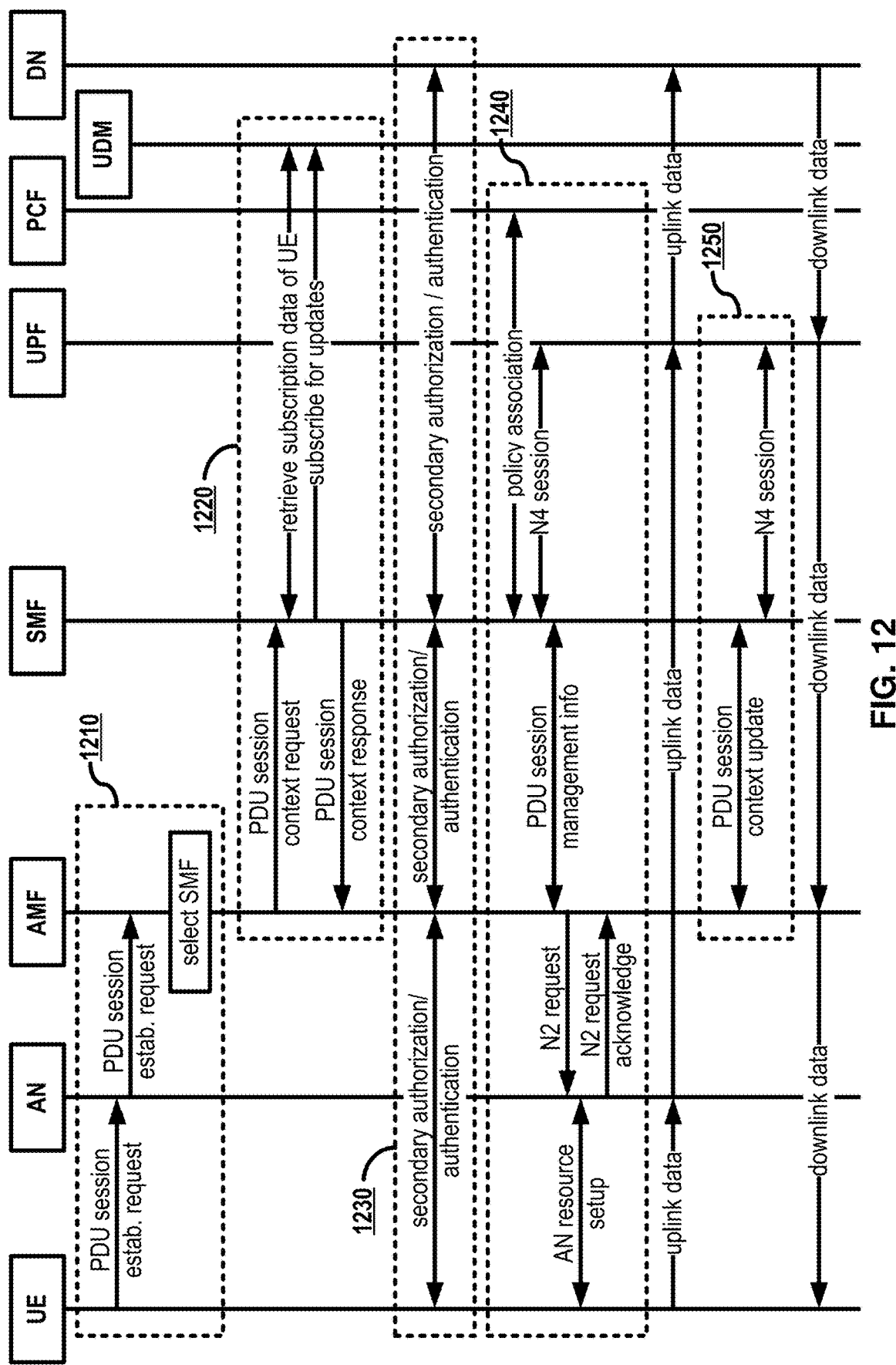
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode;

and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSMContext Request and/or a Nsmf_PDUSession_UpdateSMContext Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_PDUSession_CreateSMContext Response and/or a Nsmf_PDUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a session service request (e.g., Namf_Communication_N1N2MessageTransfer) message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QOS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_PDUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
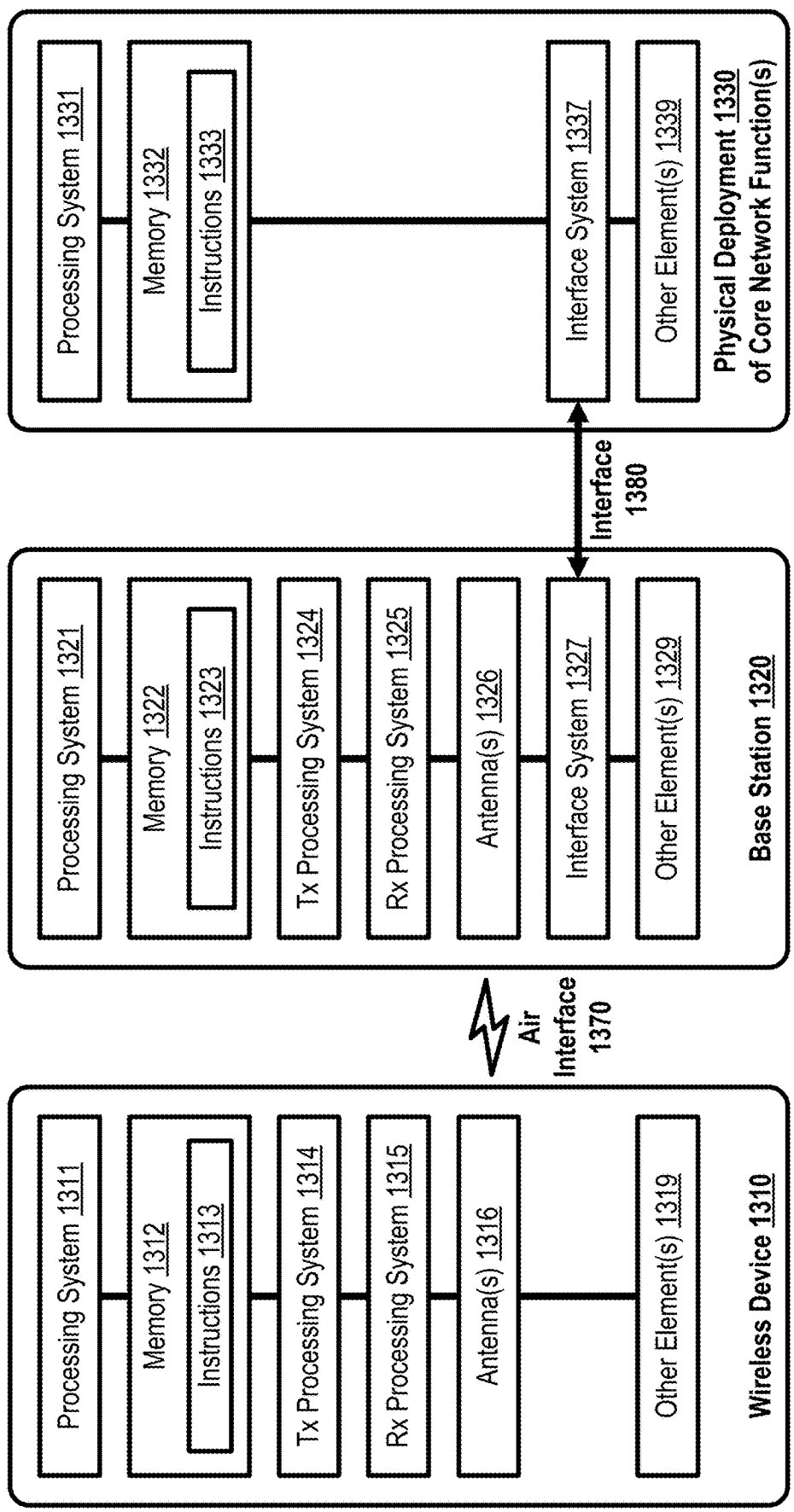
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behavior ally equivalent. For example, modules may be implemented as a software routine written in a computer language configured to be executed by a hardware machine (such as C, C++, Fortran, Java, Basic, Matlab and/or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICS, FPGAs, and complex programmable logic devices (CPLDs). Computers, microcontrollers and microprocessors may be programmed using languages such as assembly, C, C++ and/or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figure 15:
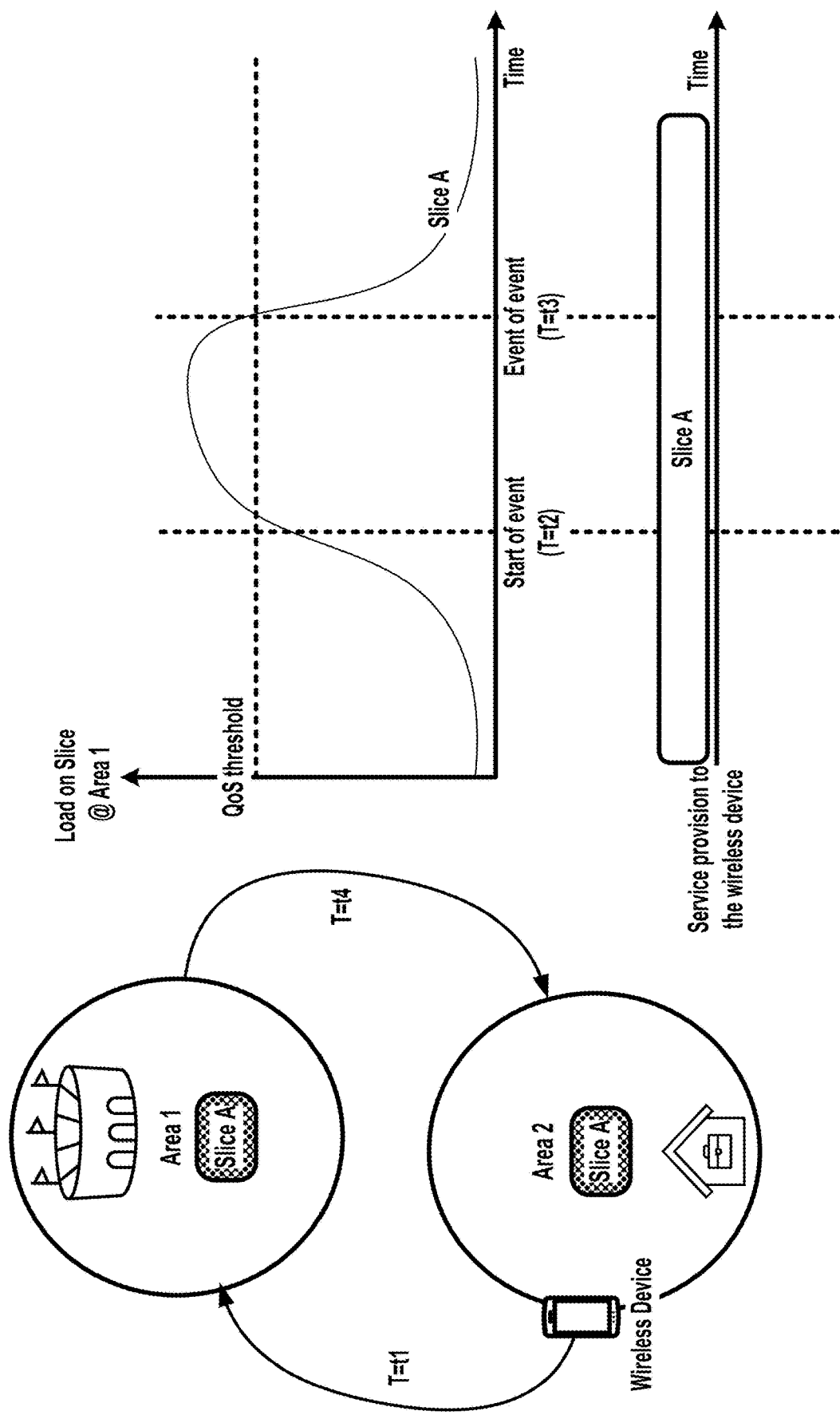
FIG. 15 is a diagram of an aspect of an example embodiment of the present disclosure.

In example embodiments as depicted in FIG. 15, a network slice (e.g., slice A) may be provided in one or more areas. In one example, the one or more areas may comprise a first area (area 1) and/or a second area (area 2). For example, the first area may comprise a sport complex, a stadium and/or the like. Demands for the network slice in the one or more areas may be change over time. When there is an ongoing event in the first area, lots of UEs may be present in the first area, leading to a greater demand for a network service. On the other hand, when there is no scheduled event in the first area, the number of UEs in the first area may be fewer, leading to a lesser demand for the network service. For example, the second area may comprise a residential area, one or more houses and/or the like. The average number of UEs present in the second area may be static throughout the day, leading to stable demand for the network slice. Based on this different characteristic of different areas, a network operator may allocate different amounts of resources for different areas. For example, based on that the numbers of UEs present at the first area is low on average, the network operator may allocate small amount of network resources for the network slice, within the first area. For example, based on that the numbers of UEs present at the second area is high on average, the network operator may allocate bigger amount of network resources for the network slice within the second area.

In an example, at T=t1, a UE (e.g., a wireless device) may move from the second area to the first area. For example, the UE may depart the first area to attend an event scheduled in the second area. The event may be held from the T=t2 to T=t3. The UE may be configured to use the network slice (e.g., slice A) for the first area and/or for the second area. As the start time for the event approaches, the number of UEs within the first area may increase. If the UEs are subscribed to the network slice, the demand for the network slice may increase dramatically compared to other time (e.g., when there is no event). As demands for the network slice increases, loads on the network slice may increase. If the amount of resources reserved for the network slice is not enough to handle the loads on the network slice, QoS provided to the subscribers of the network slice within the first area may deteriorate. For example, the amount of required resources (e.g., radio frequency, computing resources) for the number of UEs may be larger than the amount of reserved resources for the network slice. In this case, even though the network slice is setup for the number of UEs, the actual achieved QoS experienced at each of the UEs may not be enough to satisfy the requirement of applications running in the UEs.

Figure 16:
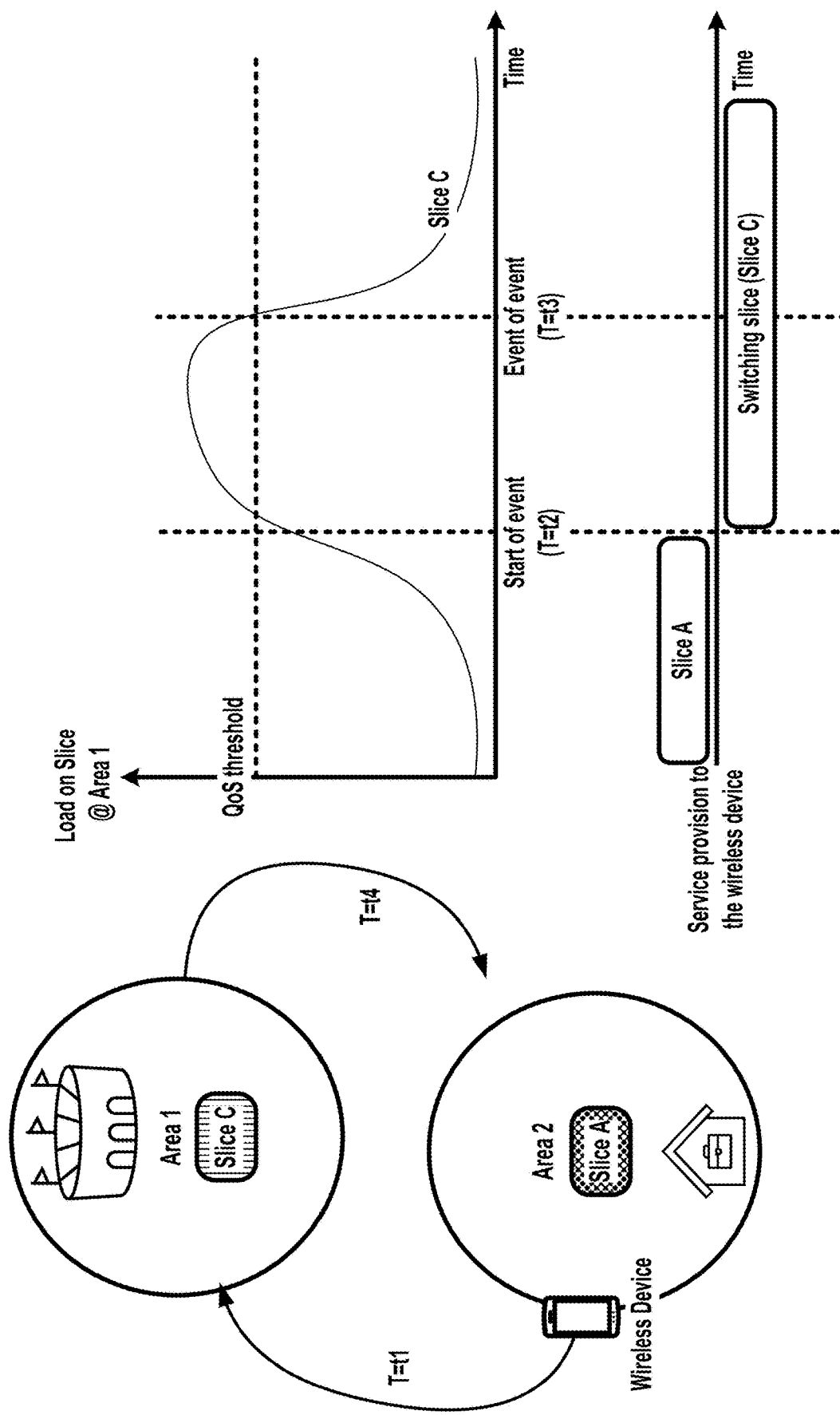
FIG. 16 is a diagram of an aspect of an example embodiment of the present disclosure.

FIG. 16 illustrates an example embodiment of using a switching slice. For example, the switching slice may be a temporary slice and/or may be available in a specific area (e.g., area 1). For example, the temporary slice (e.g., slice C) may be setup for a specific time period (e.g., during an event) at the specific area. The information of the temporary slice may be provided to a UE and/or may indicate that the temporary slice (e.g., slice C) is used for the first area. For easy allocation and deallocation of resources for the temporary slice, the network may select the temporary slice independently from the existing slice. For example, by decoupling the temporary slice and the existing slice, the UE may not know the relationship between the slice A and the slice C. This may make the UE switch between the existing slice and the temporary slice. For example, at T=t1, the UE may depart the second area and move toward the first area. As the UE crosses the border of the first area and the second area, the network may allocate to the UE the temporary network slice (e.g., slice C). For example, the temporary network slice may not have any association information with the existing (previous) network slice (e.g., slice A) When the UE arrives at the first area, the UE may send a request to the network. The request may indicate the temporary network slice and/or may not indicate the existing/previous network slice (slice A). By using the temporary network slice, the network may be able to control the load at the second area, not considering other network slices (e.g., slice A).

Figure 17:
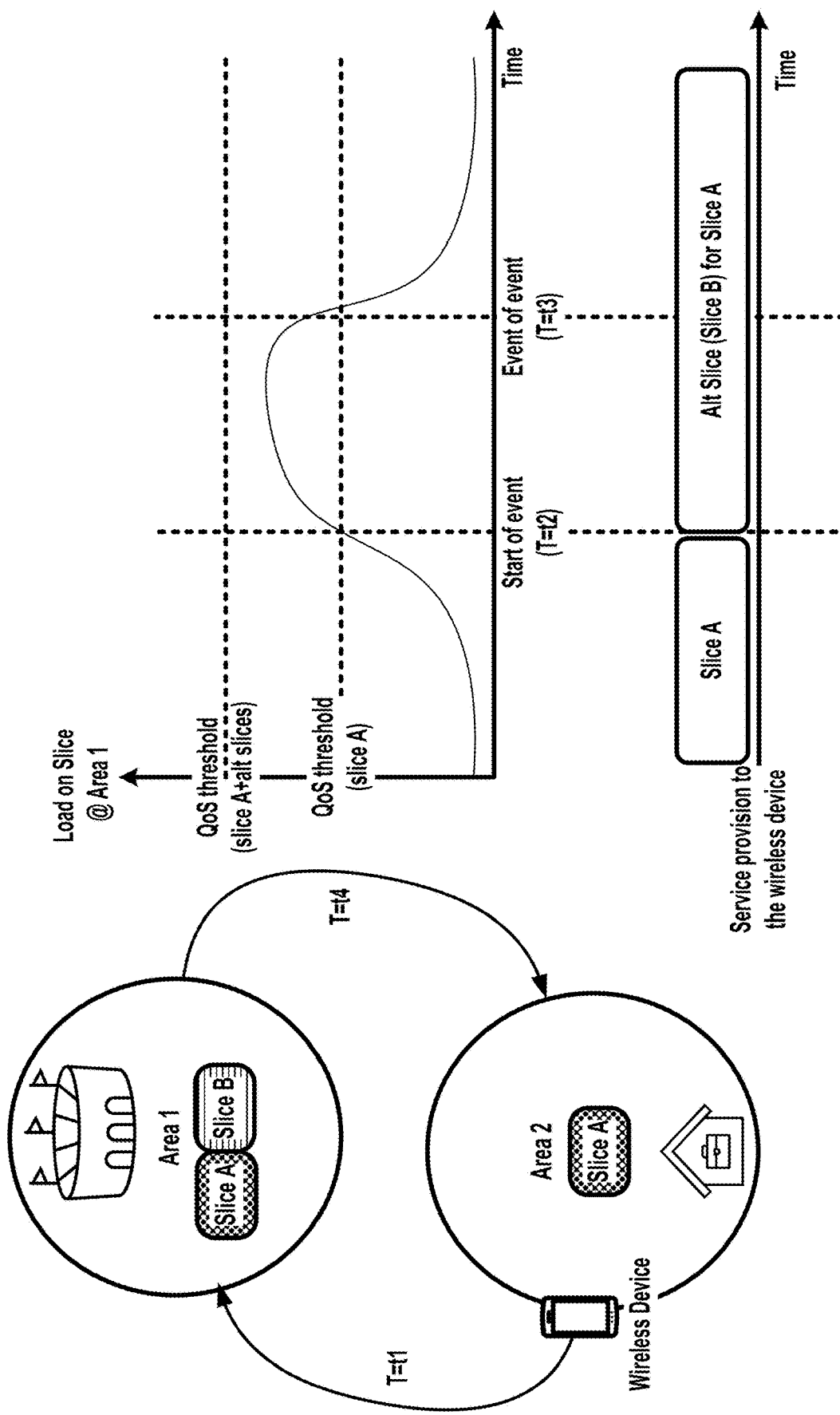
FIG. 17 is a diagram of an aspect of an example embodiment of the present disclosure.

FIG. 17 illustrates an example embodiment of using an alternative slice. For example, the alternative slice may be a slice that can be alternatively used for a network slice. For example, the alternative slice (e.g., slice B) for the network slice (e.g., slice A) may be assigned and/or provided to a UE with an indication that the alternative slice (e.g., slice B) is used as alternative to the network slice (e.g., slice A). For example, at T=t1, the UE may depart the second area and move to the first area. The network may indicate to the UE that the slice B is the alternative slice for the slice A. When the UE arrives at the first area, the UE may determine to establish a PDU session for the slice A. Based on that alternative slice is available for the existing/previous slice, and/or by using the information that the slice B is the alternative slice for the slice A, the UE may send a request for the PDU session. The request may indicate the slice A and the alternative slice (slice B) for the slice A. Based on the request, the network may determine that the request is associated with the slice A, that the request is associated with the slice B, and/or that the alternative slice for the slice A is the slice B. Based on the determination, the network may adjust network resource usage. For example, based on that the slice B is the alternative for the slice A, to fulfill the QoS requirement of the UE, the network may consider status of network resources of the slice A and/or status of network resource of the slice B. For example, if resources for the slice A is available, the network may serve the request of the UE via using the slice A. For example, if resources for the slice A is not available, the network may serve the request of the UE via using the alternative slice (e.g., slice B). Using alternative slice information in addition to the network slice information may assist a network in optimizing network resource allocation to server the UE.

Figure 18:
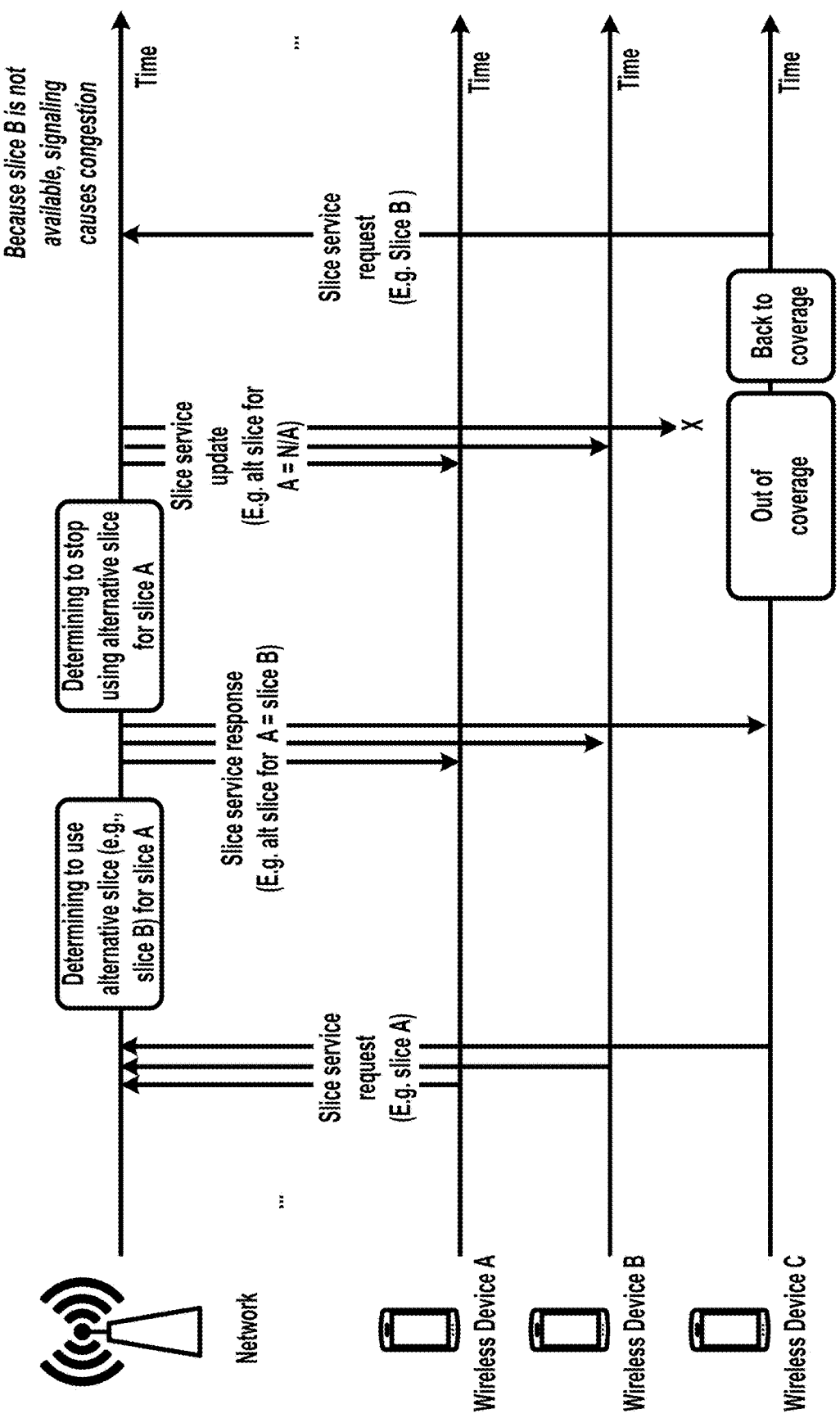
FIG. 18 is a diagram of an aspect of an example embodiment of the present disclosure.

In the example of FIG. 18, one or more wireless devices (e.g., UEs) may connect to a network. The network may comprise one or more network nodes. The one or more wireless device may comprise a wireless device A, a wireless device B, and/or a wireless device C.

In an example, the one or more wireless devices may send to the network, one or more first slice service request messages. The one or more first slice service request may be one or more registration request messages. The one or more registration request messages may indicate one or more network slices that the one or more wireless devices request. For example, the one or more network slices may be one or more requested network slices (e.g., slice A).

In an example, the network may receive the one or more first slice service request messages. In an example, the network may determine whether the slice A can be provided to the one or more wireless devices. For example, the network may determine whether QoS requirements are met for the slice A, whether network resources can be provided for the slice A, and/or the like. If the network determines that the slice A cannot be provided, the network may determine to use an alternative network slice for the slice A. For example, the network may determine to use a slice B as the alternative network slice for the slice A.

In an example, in response to the one or more first slice service request messages, the network may send one or more first slice service response messages. For example, the one or more first slice response messages may indicate one or more allowed network slices and/or one or more rejected network slices. For example, the one or more allowed network slices may comprise the slice A and/or the one or more rejected network slices may comprise the slice A. For example, the one or more first slice response messages may comprise information of the alternative network slice. For example, the information of the alternative network slice may indicate that the slice B is the alternative network slice for the slice A.

In an example, the one or more wireless devices may receive the one or more first slice service response messages. Based on the information indicated by the one or more first slice service response messages, the one or more wireless device may request a communication service from the network.

In an example, the network may determine to stop using the alternative slice. For example, if network resources becomes available for the slice A, if QoS requirement for the slice A can be met, and/or if a number of the wireless devices requesting the slice A decreases, the network may determine to stop using the alternative slice (e.g., slice B) for the slice A. Based on the determination, the network may determine to send one or more slice service update messages to the one or more wireless devices. For example, the one or more slice service update messages may indicate that the alternative slice (e.g., slice B) is removed/released, that the slice B is not used as the alternative slice for the slice A anymore, that the one or more wireless devices may not use the alternative slice for the slice A, and/or the like.

In an example, one or more first wireless devices (e.g., wireless device A, wireless device B) may receive the one or more slice service update messages and/or one or more second wireless devices (e.g., wireless device C) may not receive the one or more slice service update messages. For example, the network may send the one or more slice service update messages while the one or more second wireless devices are out of coverage. The one or more second wireless devices may not have updated information, and/or may not have information that there is no more alternative slice configured for the slice A.

In an example, the one or more second wireless devices may come back to coverage. The one or more second wireless device may have a data to transmit for the slice A. A URSP (user route selection policy) configured at the one or more wireless device may indicate which network slice needs to be used for which application. For example, a first rule of the URSP may indicate that the slice A is used for an application 1, and/or that the slice C is used for an application 3. The wireless device C may have a data to send for the application 1. Based on that the URSP indicates to use the slice A for the application 1, the wireless device may determine whether there is an established PDU session for the slice A. If there is no PDU session established for the slice A, the wireless device C may determine to establish a PDU session for the slice A. To establish the PDU session for the slice A, the wireless device C may check whether the slice A is allowed and/or whether there is an alternative network slice configured for the slice A. Based on that the slice B is configured as the alternative network slice for the slice A and/or that information of the alternative slice for the slice A is available/valid, the wireless device may send a second slice service request message to the network. For example, the second slice request message may comprise the identifier of the slice A, the identifier of the slice B, and/or an indication that the slice B is the alternative network slice for the slice A.

In an example, the network may receive the second slice request message from the wireless device C. Based on that the second slice request message requests service for the slice B, that the second slice request message requests service for the alternative network slice, and/or that there is no configured alternative slice for the slice A, the network may determine that the wireless device does not have up-to-date configuration, and/or that the wireless device is mis-configured. Based on the determination, the network may reject the request from the wireless device C, and/or may remove the wireless device C from list of registered wireless devices. This may cause the wireless device to perform registration procedure again, may cause the wireless device to start another slice service request messages, may consume additional network resource for exchange of signaling messages, and/or may increase the service interruption time of the wireless device C.

Example embodiments of the present disclosure may improve system efficiency by exchange of validity information of an alternative network slice between a network and/or a wireless device. In an example, a core network node may provide to the wireless device, one or more conditions with which the core network and/or the wireless device manage information of the alternative slice for a network slice. This may assist the network node and/or the wireless device in determining whether the alternative network slice is allowed to be requested and/or whether the information of the alternative network slice is removed from a storage. In other examples, the network node may provide a value for a time period to the wireless device. This may assist for the wireless device to determine whether the alternative network slice is used and/or the network slice is used. This may reduce unnecessary signalling between the network node and the wireless device, may reduce radio resource shortage caused by the unnecessary signalling. In other example, a first network system may provide information of the alternative slice of a second network system. This may help a network operator using one or more types of network system, to efficiently manage service requests from the wireless device for the use of alternative network slice.

In the specification, the term "NG-RAN" may be interpreted as a base station, which may comprise at least one of a gNB, an eNB, a ng-eNB, a NodeB, an access node, an access point, an N3IWF, a relay node, a base station central unit (e.g., gNB-CU), a base station distributed unit (e.g., gNB-DU), and/or the like. In the specification, a gNB may be interpreted as a base station. In the specification, a gNB-CU may be interpreted as a base station central unit. In the specification, a gNB-DU may be interpreted as a base station distributed unit.

In the specification, the term "core network" node may be interpreted as a core network device, which may comprise at least one of an AMF, a SMF, a NSSF, a UPF, a NRF a UDM, a PCF, a SoR-AF, an AF, an DDNMF, an MB-SMF, an MB-UPF and/or the like. A term of core network may be interpreted as a core network node. In the specification, a term of an access node may be interpreted as a base station, which may comprise a NG-RAN, and/or the like.

In the specification, the term "network node" may be interpreted as a core network node, an access node, a NG-RAN, a UE, and/or the like. A network may comprise one or more network nodes.

In the specification, the term "network node" may be interpreted as a core network node, an access node, a NG-RAN, a UE, and/or the like. A network may comprise one or more network nodes.

In the specification, the term "network system" may be interpreted as a communication system, and/or a generation of the communication system. For example, one or more network systems may comprise an EPS, a 5GS. For example, the first network system may be the EPS. The EPS may comprise of one or more UEs, one or more eNB, one or more en-gNBs, one or more EPCs. The one or more EPCs may comprise a MME, a SGW, a PGW, and/or the like. For example, the second network system may be the 5GS. The 5GS may comprise of one or more UEs, one or more gNB, one or more ng-eNBs, one or more 5G core networks. The one or more 5G core networks may comprise an AMF, a SMF, a PCF, and/or the like.

In the specification, the term "alternative slice management information" may be an information associated with handling an alternative network slice. The alternative slice management information may be information of the alternative network slice, information indicating one or more conditions for the use of the alternative network slice. For example, the one or more conditions for the use of alternative network slice may indicate when the alternative network slice is allowed to be used, where the alternative network slice is allowed to be used, and/or a value for a time period associated with the alternative network slice. For example, the time period associated with the alternative network slice may be the time period for the alternative network slice. For example, the alternative slice management information associated with the alternative slice may be the alternative slice management information for the alternative slice.

In the specification, the term "alternative network slice" may be a network slice (e.g., slice B, replacing network slice, S-NSSAI B) compatible with a network slice (e.g., slice A, replaced network slice, S-NSSAI A), and/or may be a network slice (e.g., slice B) that is alternatively used for the network slice (e.g., slice A). For example, this may indicate a compatible S-NSSAI slice (e.g., slice B, replacing network slice, S-NSSAI B) for an S-NSSAI (e.g., slice A, replaced network slice, S-NSSAI A), in the Allowed NSSAI (e.g., list of allowed network slices, allowed slices, allowed network slices, one or more allowed S-NSSAIs) that the AMF uses to replace an S-NSSAI when the S-NSSAI is not available or congested, as specified in clause 5.15.x. For example, the alternative network slice may be used to replace the network slice, if the network slice is not available or congested. For example, a UE may request from a network, service of the network slice A. If the network slice A is not available or congested, the network may indicate to the UE that another network slice (e.g., a network slice B) is an alternative network slice for the network slice A. An identifier of the alternative network slice may be at least one of an NSSAI, a S-NSSAI, and/or the like. The identifier of the alternative network slice may indicate that the UE is requesting an alternative of a network slice. The identifier of the alternative network slice may indicate a network resources (e.g., resource of the slice B) to serve the network slice (e.g., slice A).

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 19:
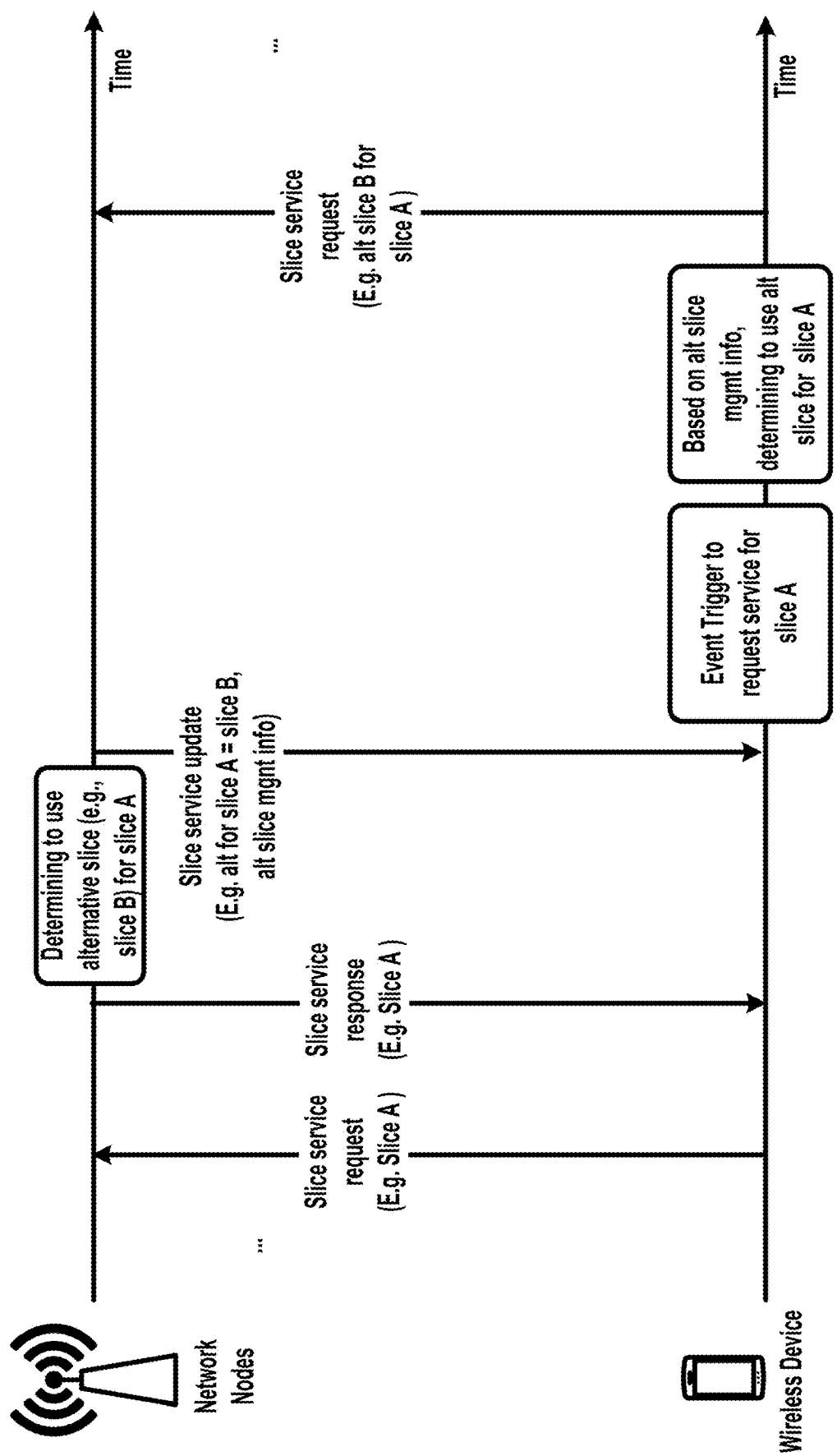
FIG. 19 is a diagram of an aspect of an example embodiment of the present disclosure.

FIG. 19 may depict one example embodiment of the present disclosure. In an example, a UE may be provided with an alternative slice management information (e.g., alt slice mgmt info) associated with an alternative network slice (alternative slice). Based on the alternative slice management information, the UE may be able to determine when to use the alternative slice. This may reduce unnecessary signalling by use of the alternative slice.

In an example, the UE may send to the network, a first slice service request message. The first slice service request may be at least one of a registration request message, a service request message, a PDU session establishment request message, a PDU session modification request message, and/or the like. The first slice service request message may comprise at least one of an identifier of the UE, a list of requested network slices (e.g., requested slices), and/or a network slice replacement capability indicator. The identifier of the UE may indicate the identity of the UE. For example, the identifier of the UE may be at least one of a SUPI, a SUCI, an IMEI, an IMSI, a GUTI, and/or the like. The list of requested network slices may indicate one or more network slices that the UE request from the network. For example, the list of requested network slices may indicate a network slice A (e.g., slice A). For example, the list of requested network slices may comprise one or more identifier of the one or more network slices that the UE requests from the network. The network slice replacement capability indicator may indicate whether the UE supports the feature of the network slice replacement. For example, the feature of the network slice replacement may be to use, process, handle, and/or interpret information associated with the alternative network slice. For example, the network slice replacement capability indicator of the first slice service request may indicate that the UE supports the feature of the network slice replacement.

In an example, the network may receive the first slice service request message from the UE. For example, a network node of the network may receive the first slice service request message. The network node may comprise at least one of an AMF, a SMF, a PCF, a base station (e.g., NG-RAN, gNB, and/or the like).

In an example, in response to the first slice service request message from the UE, the network node may send a first slice service response message to the UE. For example, the first slice service response message may be at least one of a registration accept message, a registration reject message, a PDU session establishment accept message, a PDU session establishment reject message, a service accept message, a service reject message, a UE configuration update message, a PDU session modification command message and/or the like. For example, the first slice service response message may comprise at least one of a list of allowed network slices (e.g., allowed network slices, allowed slices), a list of rejected network slices (e.g., rejected network slices, rejected slices), a list of alternative network slices (e.g., alternative network slices, alternative slices), and/or a list of configured network slices (e.g., configured network slices, configured slices). The list of allowed network slices may indicate one or more network slices that are allowed for the UE to use. For example, the list of allowed network slice may comprise one or more identifier of the network slices that are allowed for the UE, among the one or more requested network slices. For example, the list of allowed network slice may further comprise one or more identifiers of the alternative network slices associated with the one or more allowed network slices. The list of rejected network slices may indicate one or more network slices that are rejected (not allowed) for the UE to use. For example, the list of rejected network slice may comprise one or more identifiers of the network slices that are rejected for the UE, among the one or more requested network slices. For example, the list of rejected network slices may further comprise one or more identifiers of the alternative network slices associated with the one or more rejected network slices. The list of rejected network slices may further indicate one or more reasons of rejection. For example, a reason of the one or more reasons of rejections may indicate that a network slice of the rejected network slices is rejected due to an alternative slice, and/or due to that the alternative slice is available for the rejected network slice of the rejected network slices. For example, the first slice service response may indicate that the slice A is allowed for the UE.

In an example, the UE may receive the first slice service response message. The UE may store the information included in the first slice service response message in the storage. For example, the storage may be a memory of the UE.

In an example, the network may determine whether to use an alternative slice for a network slice. For example, the network node (e.g., AMF, SMF, PCF, NSSF, and/or the like) of the network may monitor network resources available for the network slice, may check whether there is a congestion for the network slice, and/or may check whether QoS requirement is met for the network slice. For example, based on that there is shortage of network resource for the slice A, based on that there is a congestion for the slice A, and/or based on that QoS requirement is not met for the slice A, the network node may determine to use an alternative slice (e.g., slice B, slice B1, slice B2, and/or the like) for the slice A.

In an example, based on the determination to use the alternative slice for the slice A, the network node may send a slice service update message to the UE. For example, the slice service update message may be at least one of the registration accept message, the registration reject message, the PDU session establishment accept message, the PDU session establishment reject message, the service accept message, the service reject message, the UE configuration update message, the PDU session modification command/request message and/or the like. For example, the slice service update message may comprise at least one of the list of (updated) allowed network slices (e.g., allowed network slices, allowed slices), the list of (updated) rejected network slices (e.g., rejected network slices, rejected slices), the list of (updated) alternative network slices (e.g., alternative network slices, alternative slices), the list of configured network slices (e.g., configured network slices, configured slices), and/or alternative slice management information (e.g., alt slice mgmt info). In one example, the first slice service response message may be the slice service update message.

In an example, the alternative slice management information may comprise one or more conditions associated with the alternative slice of the alternative slices. For example, for slice A, the network node may determine one or more alternative network slices. For example, the one or more alternative network slices may comprise at least one of slice B, slice B1, slice B2. For example, the alternative slice management information may comprise one or more first conditions for the slice B, one or more second conditions for the slice B1, and/or one or more third conditions for the slice B2.

In an example, the network node may determine to use one or more alternative slices for a network slice. For example, if the slice A is congested, and/or if there are many UEs using the slice A, the network node may determine to allocate one or more alternative slices for the slice A. This may help to prevent further congestion, by distributing loads onto multiple alternative slices. For example, the network node may divide area for the slice A into one or more service areas. For example, the network node may determine to assign the slice B1 as an alternative to the slice A, for the UEs located in the first service area. For example, the network node may determine to assign the slice B2 as an alternative to the slice A, for the UEs located in the second service area. For example, the network node may determine to assign the slice B1 as an alternative to the slice A, during a first time (e.g., from 1:00 AM to 11:00 AM) for the UEs. For example, the network node may determine to assign the slice B2 as an alternative to the slice A, during a second time (e.g., from 11:00 AM to 9:00 PM) for the UEs.

In an example, based on the determination, the network node may construct the alternative slice management information. For example, the alternative slice management information may comprise at least one of:

information of a network slice: This may indicate the network slice (e.g., a replaced slice) for which the one or more alternative network slices (e.g., replacing slices) are associated. This may be at least one of one or more NSSAI, one or more S-NSSAI, and/or the like. For the network slice, this may comprise at least one of a subscribed S-NSSAI (e.g., HPLMN S-NSSAI, home network S-NSSAI) and/or a mapped S-NSSAI (e.g., VPLMN S-NSSAI, S-NSSAI value configured for a serving/visited network). For example, the UE may have a subscription to a slice A. An identifier of the subscribed S-NSSAI for the slice A may be AH, and/or an identifier of the mapped S-NSSAI for the slice A in VPLMN 1 may be AV1 and/or an identifier of the mapped S-NSSAI for the slice A in VPLMN 2 may be AV2.

information of alternative network slice: This may indicate one or more network slices (e.g., replacing slices) used as alternatives for the network slice (e.g., replaced slice). This may be at least one of one or more NSSAI, one or more S-NSSAI, and/or the like. For example, for slice A, this may indicate that the slice B, slice B1, and/or slice B2 are alternatives used for slice A. This may further comprise one or more indications indicating which alternative slice (of the one or more alternative slices) is used alternatively for which S-NSSAI. For example, if a first alternative slice (e.g., slice BV1, B1) of the one or more alternative slices is alternatively used for the subscribed slice (e.g., HPLMN S-NSSAI, slice A), the indication may indicate that the first alternative slice is an alternative for the subscribed S-NSSAI (e.g., HPLMN S-NSSAI). For example, if a second alternative slice (e.g., slice BV2) of the one or more alternative slices is alternatively used for the mapped S-NSSAI (e.g., VPLMN S-NSSAI, slice AV1), the indication may indicate that the second alternative slice (e.g., slice BV2, B2) is an alternative for the mapped S-NSSAI (e.g., VPLMN S-NSSAI). This indication may help the UE to determine which type (e.g., home slice or visited slice) of S-NSSAI is replaced to an alternative S-NSSAI.

information of one or more conditions for alternative slice: This may indicate, for each alternative slice of the one or more alternative network slices, one or more conditions indicating when the each alternative slice can be used and/or when the each alternative slice cannot be used. For example, the one or more conditions may indicate a time condition and/or a location condition. For example, the time condition may indicate a time when the alternative slice can be used and/or when the alternative slice cannot be used. For example, the location condition may indicate a location where the alternative slice can be used and/or where the alternative slice cannot be used. For example, this may indicate that the alternative slice B1 can be used in the first service area (e.g., TAs, Cells, networks) and/or in the first time. For example, this may indicate that the alternative slice B2 can be used in the second service area (e.g, TAs, Cells, networks) and/or in the second time.

Alternatively and/or additionally, the list of allowed network slices, the list of rejected network slices, and/or the list of configured network slices may further comprise the alternative slice management information.

In an example, the UE may receive from the network node, the slice service update message. The UE may store information of the slice service update message.

In an example, the UE may have data to send. For example, an application (e.g., application A) of the UE may generate the data. The UE may determine a PDU session and/or a network slice to deliver the data. For example, the UE may evaluate a URSP. The URSP may indicate which network slice is used for which data. For example, the URSP may indicate that the data of the application A needs to be sent via the slice A. Based on that the data needs to be sent via the slice A, the UE may check whether there is an established PDU session over the slice A. If there is no PDU session established for the slice A, the UE may determine whether the slice A is allowed and/or whether there is a configured alternative slice for the slice A. For example, based on the stored information (e.g., delivered from the network via the slice service update message), the UE may determine that the alternative slice (e.g., slice B, slice B1, slice B2) is assigned for the slice A. For example, based on the alternative slice management information, the UE may determine whether the UE needs to use an alternative slice and/or which alternative slice needs to be used for the slice A (or for the PDU session). For example, the UE may determine whether one or more conditions associated with the alternative network slice is met or not. For example, based on that the time is 10:00 AM, and/or based on that the condition of the alternative slice B1 indicates the first time (e.g., from 1:00 AM to 11:00 AM), the UE may determine to use the alternative slice B1 as alternative for the slice A.

In an example, based on the determined alternative slice, the UE may send a second slice service request message to the network node. For example, the second slice service request may be at least one of a registration request message, a service request message, a PDU session establishment request message, a PDU session modification request message, and/or the like. The second slice service request message may comprise at least one of an information of a slice (e.g., original slice, replaced slice) and/or an information of an alternative slice (e.g., replacing slice). For example, the second slice service request message may indicate at least one of a home network S-NSSAI of the replaced network slice (e.g., slice AH), a visited network S-NSSAI (e.g., slice AV1, an alternative S-NSSAI (e.g., identifier of alternative network slice), and/or an indication of which S-NSSAI (e.g., home network S-NSSAI, visited network S-NSSAI) is associated with the alternative S-NSSAI. For example, the second slice service request message may indicate at least one of an identifier of the slice AH, an identifier of the slice AV1, an identifier of the slice B1, and/or an indication of whether slice B1 is alternative for slice AH or AV1.

In the example of FIG. 19, based on the one or more conditions, unnecessary use of alternative network slice can be prevented and/or the alternative slice can be used in time/place where the network operator intends.

Figure 20:
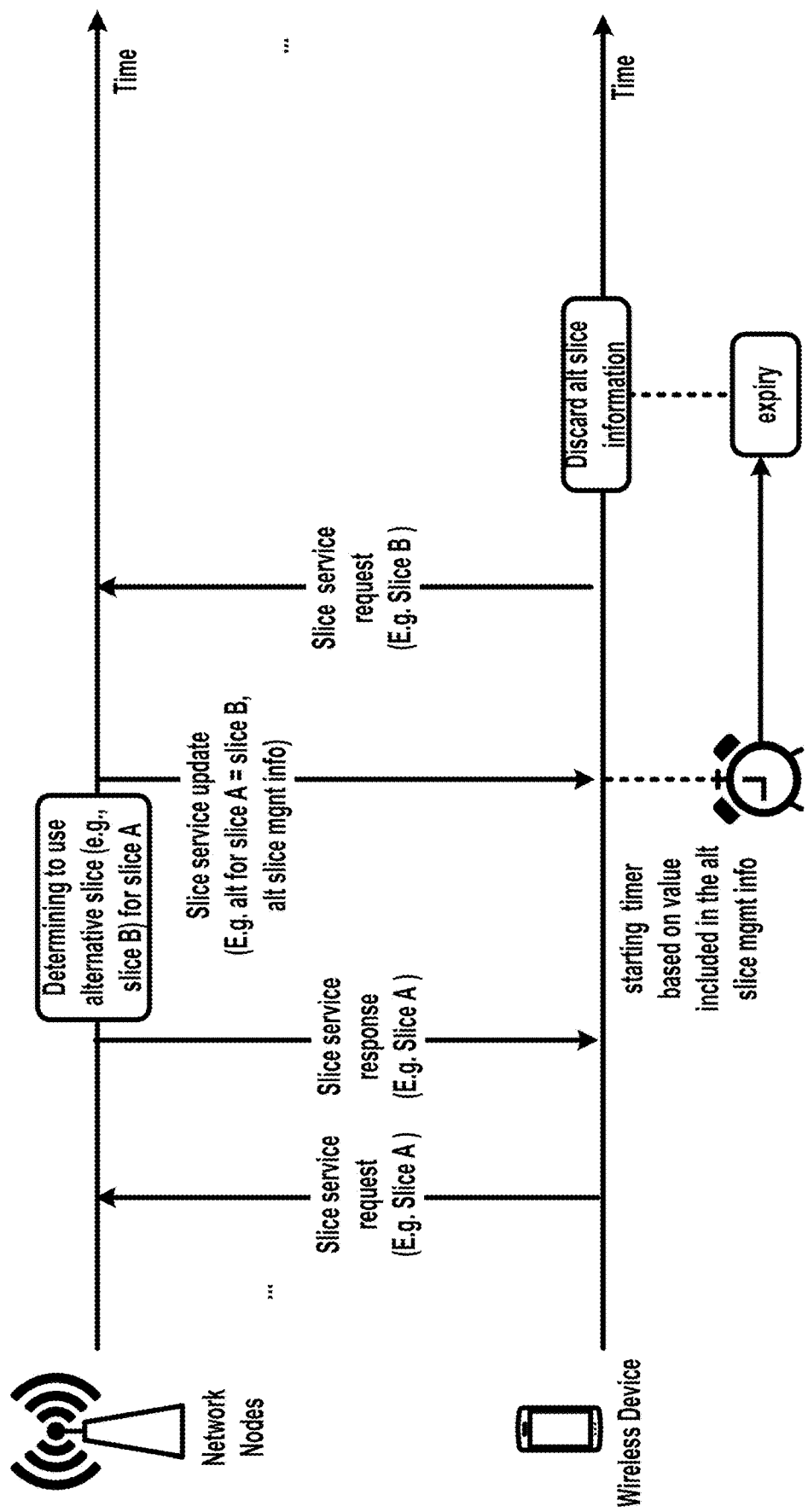
FIG. 20 is a diagram of an aspect of an example embodiment of the present disclosure.

FIG. 20 may depict one example embodiment of the present disclosure. In an example, a UE may be provided with an alternative slice management information (e.g., alt slice mgmt info) associated with an alternative network slice (alternative slice). Based on the alternative slice management information, the UE may be able to manage information associated with the alternative slice. This may reduce unnecessary signalling to update the UE. Similar to the previous figure (e.g., FIG. 19), the UE may receive the alternative network slice management information. For brevity, redundant details will be omitted.

In an example, the UE may send to the network, the first slice service request message. The first slice service request may be at least one of the registration request message, the service request message, the PDU session establishment request message, the PDU session modification request message, and/or the like. The first slice service request message may comprise at least one of the identifier of the UE, the list of requested network slices (e.g., requested slices), and/or the network slice replacement capability indicator.

In an example, the network may receive the first slice service request message from the UE. In response to the first slice service request message from the UE, the network node may send the first slice service response message to the UE. For example, the first slice service response message may be at least one of the registration accept message, the registration reject message, the PDU session establishment accept message, the PDU session establishment reject message, the service accept message, the service reject message, the UE configuration update message, the PDU session modification command message and/or the like. For example, the first slice service response message may comprise at least one of the list of allowed network slices (e.g., allowed network slices, allowed slices), the list of rejected network slices (e.g., rejected network slices, rejected slices), the list of alternative network slices (e.g., alternative network slices, alternative slices), and/or the list of configured network slices (e.g., configured network slices, configured slices).

In an example, the UE may receive the first slice service response message. The UE may store the information included in the first slice service response message in the storage.

In an example, the network may determine whether to use an alternative slice for a network slice. Based on the determination to use the alternative slice for the slice A, the network node may send the slice service update message to the UE. For example, the slice service update message may be at least one of the registration accept message, the registration reject message, the PDU session establishment accept message, the PDU session establishment reject message, the service accept message, the service reject message, the UE configuration update message, the PDU session modification command/request message and/or the like. For example, the slice service update message may comprise at least one of the list of (updated) allowed network slices (e.g., allowed network slices, allowed slices), the list of (updated) rejected network slices (e.g., rejected network slices, rejected slices), the list of (updated) alternative network slices (e.g., alternative network slices, alternative slices), the list of configured network slices (e.g., configured network slices, configured slices), and/or alternative slice management information (e.g., alt slice mgmt info). In one example, the first slice service response message may be the slice service update message.

In an example, the alternative slice management information may comprise a value for a time duration (time period, timer, and/or the like) associated with the alternative slice. For example, the value may indicate 1 second, 2 minutes, 3 hours, and/or the like. For example, the value for the time duration may be determined based on the time when the network slice is available and/or the time when the alternative slice is not needed to be used any more. For example, the time period may be used to prevent the UE from using the alternative slice, to make the UE to delete (discard, remove from the memory) the information of the alternative slice.

In an example, the UE may receive from the network node, the slice service update message. The UE may store information of the slice service update message. In an example, the UE may determine whether the slice service update message comprises the alternative slice management information. For example, the UE may determine whether the slice service update message comprises information of the time duration associated with the alternative slice. The information of the time duration may indicate a time duration, a duration of time, a time period, a value for a timer, and/or the like. Based on that the slice service update message indicates the alternative slice, and/or based on that the slice service update messages comprises information of the time duration associated with the alternative slice, the UE may start the time period (e.g., the timer) associated with the alternative slice.

In an example, the UE may have data to send. For example, the application (e.g., application A) of the UE may generate the data. The UE may evaluate the URSP, and/or the URSP may indicate which network slice is used for which data. For example, the URSP may indicate that the data of the application A needs to be sent via the slice A. Based on that the data needs to be sent via the slice A, the UE may check whether there is a configured alternative slice for the slice A. For example, based on the stored information (e.g., delivered from the network via the slice service update message), the UE may determine that the alternative slice (e.g., slice B, slice B1, slice B2) is assigned for the slice A. For example, based on the alternative slice management information, the UE may further determine whether the UE is allowed to use the alternative slice and/or which alternative slice needs to be used for the slice A (or for the PDU session). For example, the UE may determine whether the time period associated with the alternative slice is running, whether the time period associated with the alternative slice started, whether the time period associated with the alternative slice is not stopped, whether the time period associated with the alternative slice is not expired, and/or the like. Based on that the timer associated with the alternative slice is running (or not expired, or not stopped), and/or based on that the time period associated with the alternative slice started (or is not stopped, is running, is not expired), the UE may determine to send the second slice service request message to the network node, and/or to include the information of the alternative slice (e.g., slice B) into the second slice service request message, and/or to include the information of the slice (e.g., slice A) associated with the alternative slice (e.g., slice B) into the second slice service request message. For example, the second slice service request may be at least one of the registration request message, the service request message, the PDU session establishment request message, the PDU session modification request message, and/or the like. In an example, the UE may send the second slice service request message to the network.

In an example, the UE may receive a second slice service response, in response to the second slice service request.

In an example, the time period associated with the alternative slice may expire. For example, if the timer associated with the alternative slice runs for the time equal to the value associated with the alternative slice, the time period may expire. For example, if the time period passes the time equal to the value associated with the alternative slice, the time period may expire. In response to that the timer (or the time period) associated with the alternative slice expires, the UE may discard (remove, delete) the information (e.g., alternative slice management information associated with the alternative slice for which the timer (or the time period) expires, the identifier of the alternative slice) associated with the alternative slice. For example, the UE may remove association with the network slice (e.g., slice A) and the alternative slice (e.g., slice B, slice B1, slice B2). For example, the UE may determine that the network slice (e.g., slice A) does not have an associated alternative slice, and/or may determine not to send information of the alternative slice to the network.

In an example, the UE may have another data to send. The UE may compose a third slice service request. For example, the application (e.g., application A) of the UE may generate the data. For example, the URSP may indicate that the data of the application A needs to be sent via the slice A. Based on that the data needs to be sent via the slice A, the UE may check whether there is a configured alternative slice for the slice A. For example, based on the expiry of the time period associated with the alternative slice (e.g., slice B) for the slice (e.g., slice A), based on that the information of the alternative slice is discarded, and/or based on that there is no stored information of alternative slice for the slice, the UE may determine not to include the information of the alternative slice into the third slice service request, and/or to include information of the slice A into the third slice service request. For example, the third slice service request may be at least one of the registration request message, the service request message, the PDU session establishment request message, the PDU session modification request message, and/or the like. The UE may send the third slice service request to the network.

In an example, the UE may stop the timer (or time periods) associated with the alternative slice, if the UE receives a second slice service update message. For example, the second slice service update message may indicate that the alternative slice (e.g., slice B) is not associated with the slice (e.g., slice A). For example, the second slice service request message may comprise information of the slice (e.g., slice A) without comprising information of an alternative slice associated with the slice. For example, if the UE registers to a new network, the UE may stop the time period. For example, when the time period (timer) stops, the UE may discard information associated with the alternative network slice.

In an example, the UE may restart the timer (or time period) associated with the alternative slice, if the UE receives a third slice service update message. For example, the third slice service update message may indicate that an alternative slice associated with the slice (e.g., slice A) is changed to new alternative slice (e.g., slice C), and/or that a new value for the time period associated with the alternative slice is assigned. For example, the UE may restart the time period with new value and/or for new alternative slice.

In the example of FIG. 20, based on the time period, the network can control the UE's use of the alternative network slice, without increasing additional signaling.

Figure 21:
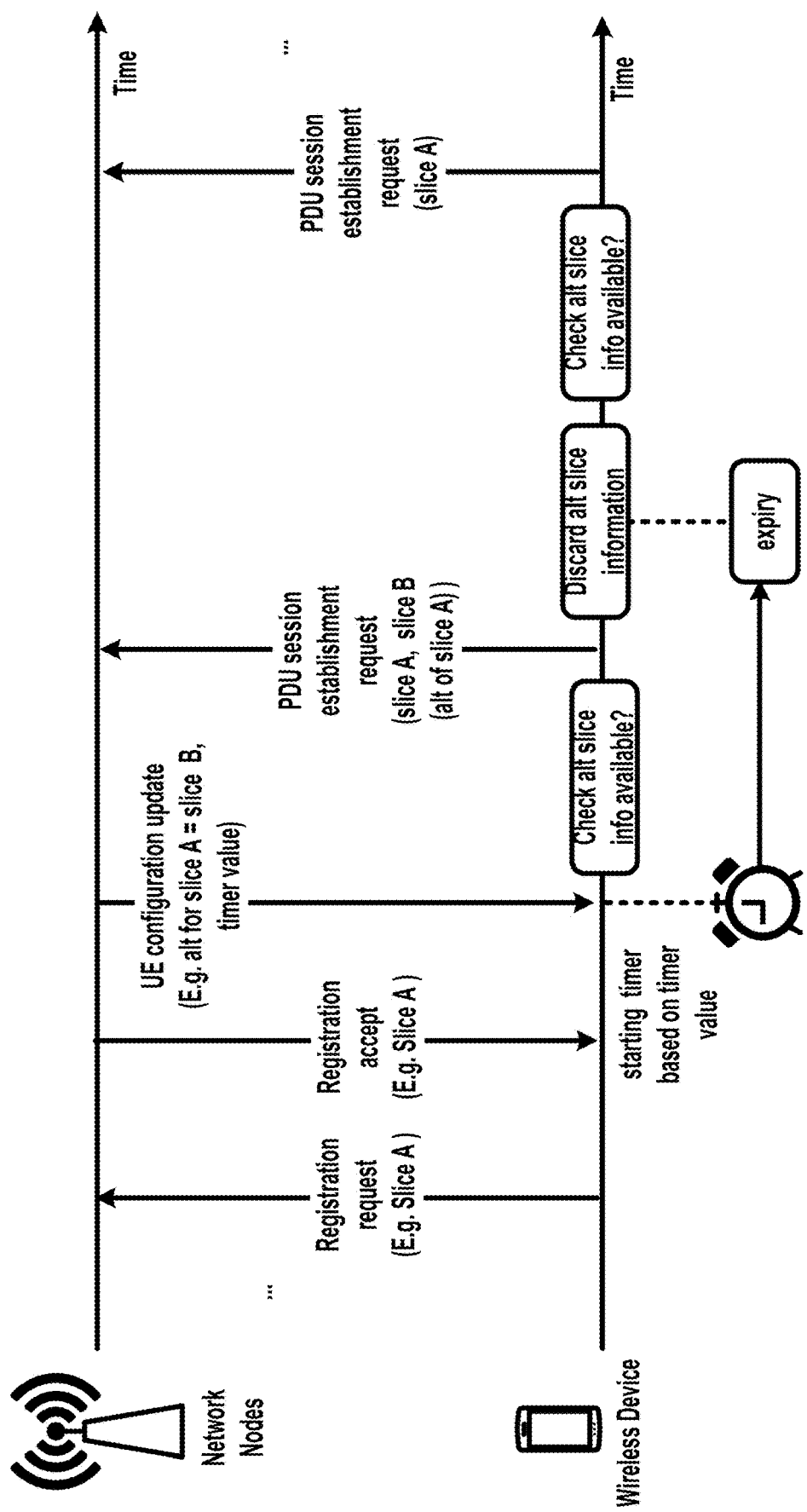
FIG. 21 is a diagram of an aspect of an example embodiment of the present disclosure.

FIG. 21 may depict one example embodiment of the present disclosure. In an example, a UE may be provided with an alternative slice management information (e.g., alt slice mgmt info) associated with an alternative network slice (alternative slice). Based on the alternative slice management information, the UE may be able to determine whether to use the information of the alternative slice for PDU session management. Similar to the previous figure (e.g., FIG. 20), the UE may receive the alternative network slice management information. For brevity, redundant details are omitted.

In an example, the UE may send to the network, a registration request message, and/or the like. The registration request message may comprise at least one of the identifier of the UE, the list of requested network slices (e.g., requested slices, requested network slices, requested NSSAI, requested S-NSSAIs), and/or the network slice replacement capability indicator (e.g., alternative slice capability indicator, indication of support for the alternative slice).

In an example, the network may receive the registration request message from the UE. In response to the registration request message from the UE, the network node may send a registration accept message to the UE. For example, the registration accept message may comprise at least one of the list of allowed network slices (e.g., allowed network slices, allowed slices, allowed NSSAI, allowed S-NSSAIs), the list of rejected network slices (e.g., rejected network slices, rejected slices, rejected NSSAI, rejected S-NSSAIs), the list of alternative network slices (e.g., alternative network slices, alternative slices, alternative NSSAI, alternative S-NSSAIs), and/or the list of configured network slices (e.g., configured network slices, configured slices, configured NSSAI, configured S-NSSAIs).

In an example, the UE may receive the registration accept message. The UE may store the information included in the registration accept message in the storage.

In an example, the network may determine whether to use an alternative slice for a network slice (of the list of requested network slices, of the list of allowed network slices, of the list of rejected network slices, and/or of the list of configured network slices). Based on the determination to use the alternative slice (e.g., slice B) for the slice (e.g., slice A), the network node may send the UE configuration update message to the UE. For example, the UE configuration update message may comprise at least one of the list of (updated) allowed network slices (e.g., allowed network slices, allowed slices), the list of (updated) rejected network slices (e.g., rejected network slices, rejected slices), the list of (updated) alternative network slices (e.g., alternative network slices, alternative slices), the list of configured network slices (e.g., configured network slices, configured slices), and/or alternative slice management information (e.g., alt slice mgmt info). In one example, the UE configuration update message may be the registration accept message. In an example, the alternative slice management information may comprise the value for the time duration (time period, timer, and/or the like) associated with the alternative slice.

In an example, the UE may receive from the network node, the UE configuration update message. The UE may store information of the UE configuration update message. In an example, the UE may determine whether the UE configuration update message comprises information of the alternative network slice. If the UE configuration update message comprises information of the alternative network slice, the UE may determine whether the alternative network slice (alternative slice) is associated with the time duration. Based on that the UE configuration update message indicates the information of the alternative slice, and/or based on that the UE configuration update messages comprises information of the time duration associated with the alternative slice, the UE may start the time period (e.g., the timer) associated with the alternative slice, for the alternative slice and/or for the slice (e.g., slice A) associated with the alternative slice (e.g., slice B).

In an example, the UE may have data to send. For example, the application (e.g., application A) of the UE may generate the data. The URSP may indicate that the data of the application A needs to be sent via the slice A. For example, based on the stored information (e.g., delivered from the network via the UE configuration update message), the UE may determine that the alternative slice (e.g., slice B, slice B1, slice B2) is associated with the slice A. For example, based on the alternative slice management information, the UE may further determine whether the UE is allowed to use the alternative slice. For example, based on that the time period associated with the alternative slice is running (or is not expired, or is not stopped), and/or based on that the time period associated with the alternative slice starts (or is not stopped, is running, is not expired), the UE may determine to send a PDU session establishment request message to the network node, to include the information of the alternative slice (e.g., identifier of the slice B) into the PDU session establishment request message, and/or to include information of the slice (e.g., slice A) into the PDU session establishment request message. In an example, the UE may send the PDU session establishment request message to the network, to establish a PDU session over the alternative network slice.

In an example, the UE may receive a PDU session establishment accept message, in response to sending the PDU session establishment request message.

In an example, the time period (the timer) associated with the alternative slice may expire. In response to that the time period associated with the alternative slice expires, the UE may discard (remove, delete) the information (e.g., alternative slice management information associated with the alternative slice for which the timer (or the time period) expires, the identifier of the alternative slice) associated with the alternative slice (e.g., slice B) for the slice (slice A). For example, the UE may remove association between the network slice (e.g., slice A) and the alternative slice (e.g., slice B, slice B1, slice B2). For example, the UE may determine that the network slice (e.g., slice A) does not have an associated alternative slice, and/or may determine not to send information of the alternative slice to the network anymore in a (e.g., second) PDU session establishment (or, service request) message.

In an example, the UE may have another data to send. The UE may compose a second PDU session establishment request message. Based on that the data needs to be sent via the slice A, the UE may check whether there is an alternative slice for the slice A. For example, based on the expiry of the time period associated with the alternative slice (e.g., slice B) for the slice (e.g., slice A), based on that the information of the alternative slice is discarded, and/or based on that there is no stored (associated) information of the alternative slice for the slice (e.g., slice A), the UE may determine not to include the information of the alternative slice into the second PDU session establishment request message, and/or to include information of the slice A into the second PDU session establishment request message. For example, the second PDU session establishment request message may be a NAS message, a NAS UL transfer message, and/or the like. The UE may send the second PDU session establishment request message to the network.

In the example of FIG. 21, based on the time period, the network can control whether the UE indicates the alternative network slice, without increasing additional signaling.

Figure 22:
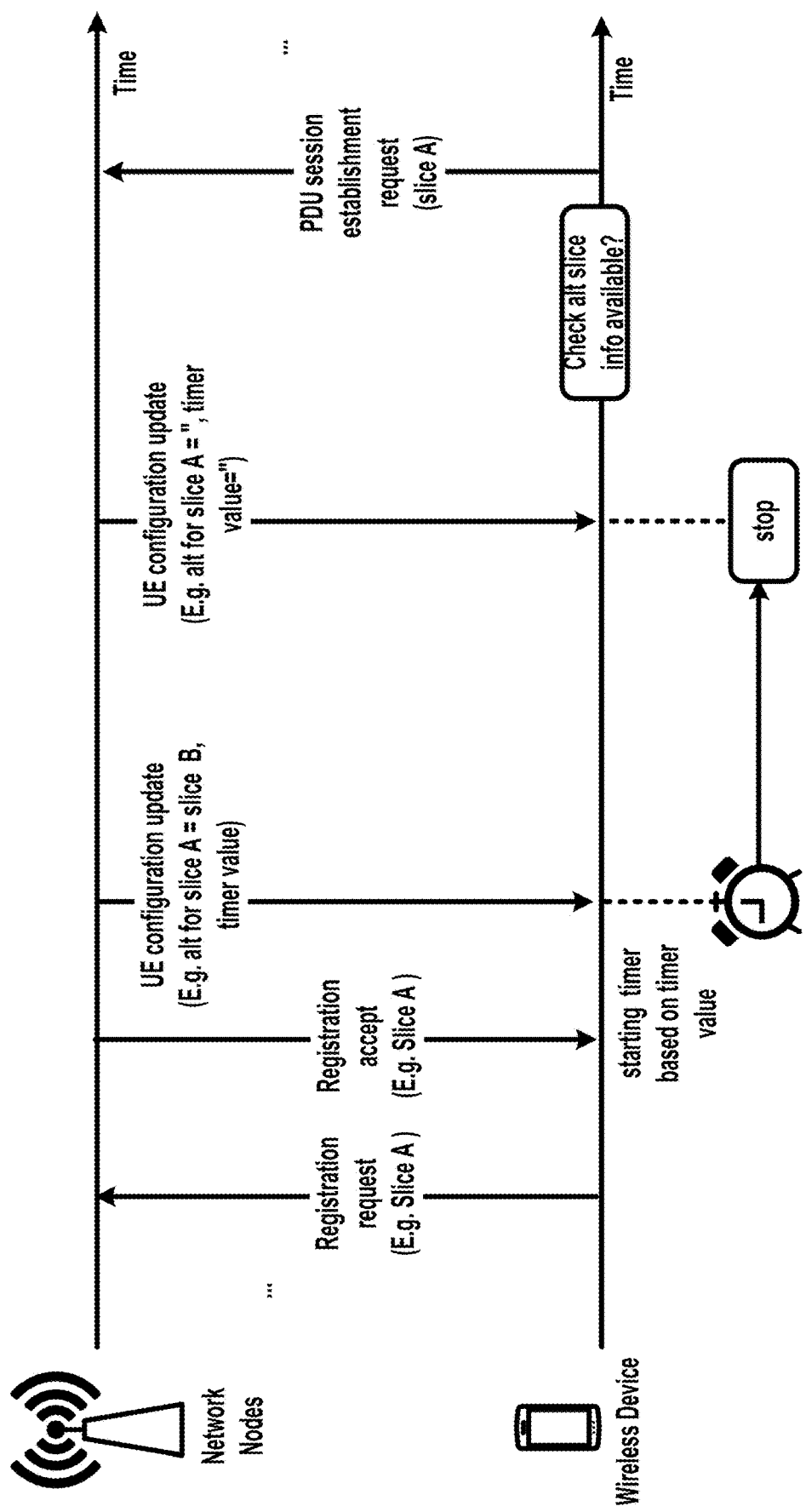
FIG. 22 is a diagram of an aspect of an example embodiment of the present disclosure.

FIG. 22 may depict one example embodiment of the present disclosure. In an example, a UE may be provided with an alternative slice management information (e.g., alt slice mgmt info) associated with an alternative network slice (alternative slice). Based on the alternative slice management information, the UE may be able to determine whether to use information of the alternative slice for PDU session management. Similar to the previous figure (e.g., FIG. 21), the UE may receive the alternative network slice management information. For brevity, redundant details will be omitted.

In an example, the UE may send to the network, a registration request message, and/or the like. In an example, the network may receive the registration request message from the UE. In response to the registration request message from the UE, the network node may send a registration accept message to the UE. In an example, the UE may receive the registration accept message. The UE may store the information included in the registration accept message in the storage. In an example, the network may determine whether to use an alternative slice for a network slice. Based on the determination to use the alternative slice for the slice A, the network node may send the UE configuration update message to the UE. In an example, the UE may receive from the network node, the UE configuration update message. The UE may store information of the UE configuration update message. Based on that the UE configuration update message indicates the alternative slice, and/or based on that the UE configuration update messages comprises information of the time period associated with the alternative slice, the UE may start the time period (e.g., the timer) for the alternative slice, for the alternative slice and/or for the slice (e.g., slice A) associated with the alternative slice (e.g., slice B).

In an example, the UE may receive from the network node, a second UE configuration update (or a PDU session modification command) message. The UE may store information of the second UE configuration update message. Based on that the second UE configuration update message indicates that the alternative slice (e.g., slice B) is not used as an alternative for the slice (e.g., slice A) any more, based on that the second UE configuration update message indicates that a value for the time period associated with the alternative slice is empty (or zero, null value), and/or based on that the second UE configuration update message comprises the identifier of the network slice (e.g., slice A) and does not comprise the identifier of the alternative network slice, the UE may stop the time period (e.g., the timer) associated with the alternative slice, for the alternative slice and/or for the slice (e.g., slice A) associated with the alternative slice (e.g., slice B). For example, based on stopping the time period, the UE may discard (delete, remove) from the storage, the information associated with the alternative slice.

In an example, the UE may have a data to send. The UE may compose a PDU session establishment request message. Based on that the data needs to be sent via the slice A, the UE may check whether there is a configured alternative slice for the slice A. For example, based on the stopping of the time period associated with the alternative slice (e.g., slice B) for the slice (e.g., slice A), based on that the information of the alternative slice is discarded, and/or based on that there is no stored information of alternative slice for the slice, the UE may determine not to include the information of the alternative slice into the PDU session establishment request message, and/or to include information of the slice A into the PDU session establishment request message. For example, the PDU session establishment request message may be a NAS message, a NAS UL transfer message, and/or the like. The UE may send the PDU session establishment request message to the network.

In the example of FIG. 22, the network can control the UE's use of the alternative network slice before the time period expiry, without increasing additional signaling.

Figure 23:
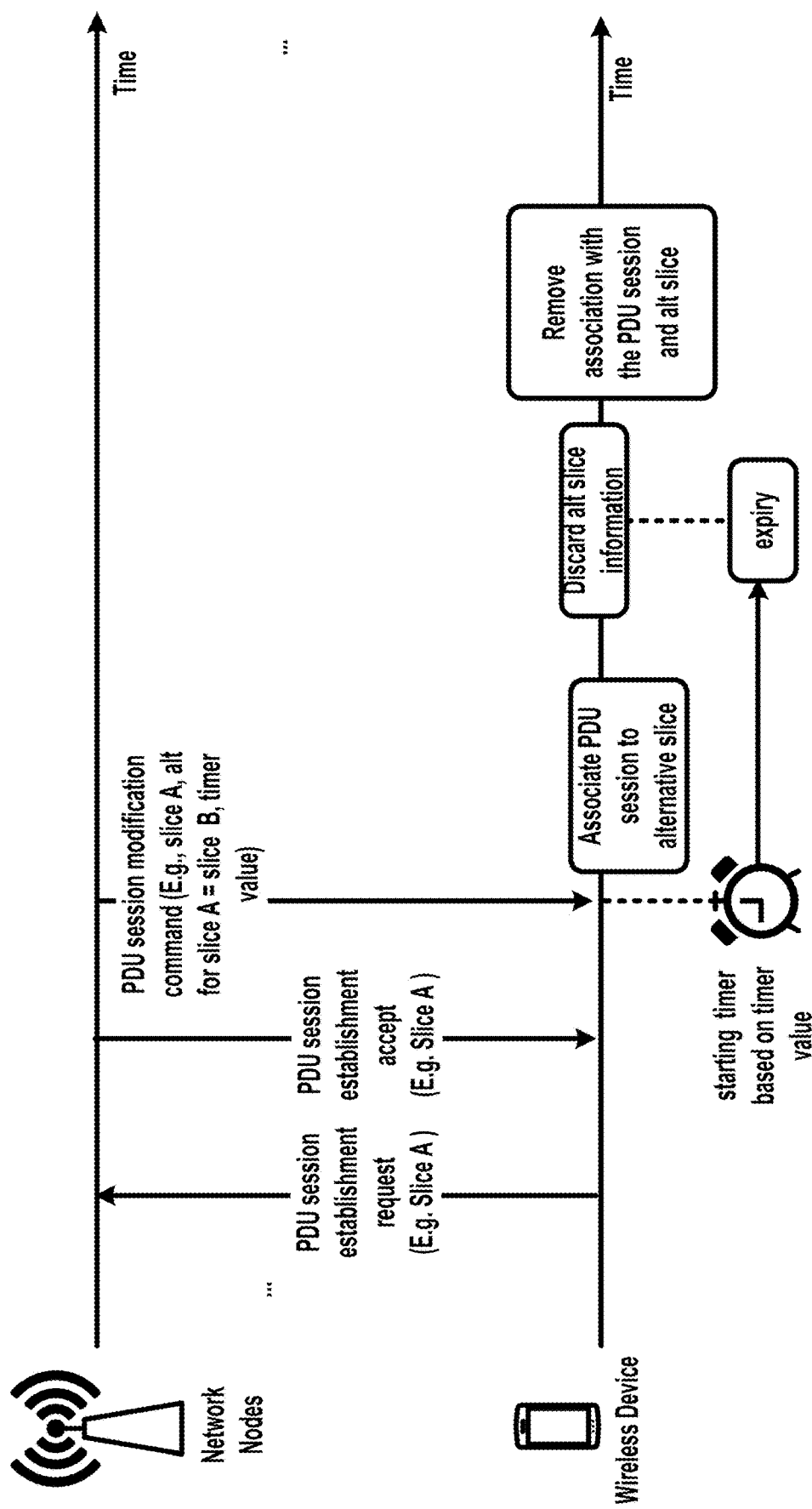
FIG. 23 is a diagram of an aspect of an example embodiment of the present disclosure.

FIG. 23 may depict one example embodiment of the present disclosure. In an example, a UE may be provided with an alternative slice management information (e.g., alt slice mgmt info) associated with an alternative network slice (alternative slice). Based on the alternative slice management information, the UE may be able to determine whether to use information of the alternative slice for PDU session management. For brevity, redundant details will be omitted.

In an example, the UE may send to the network, a PDU session establishment request message to establish a PDU session for a network slice (e.g., slice A), and/or the like. The PDU session establishment request message may comprise at least one of the identifier of the UE, an information (e.g., an identifier) of a network slice for which the PDU session is established.

In an example, the network (e.g., an SMF) may receive the PDU session establishment request message from the UE. In response to the PDU session establishment request message from the UE, the network node may send a PDU session establishment accept message to the UE. For example, the PDU session establishment accept message may comprise at least an identifier of the PDU session, QoS information associated with PDU session, and/or the like.

In an example, the UE may receive the PDU session establishment accept message. The UE may store the information included in the PDU session establishment accept message in the storage.

In an example, the network node may determine whether to use an alternative slice for the network slice (e.g., slice A). Based on the determination to use the alternative slice for the slice (e.g., slice A), the network node may send the PDU session modification command (or UE configuration update) message to the UE. For example, the PDU session modification command message may comprise at least one of information (e.g., an identifier) of the alternative slice (e.g., slice B) of the network slice (e.g., slice A), the information of the slice (e.g., slice A), the identifier of the PDU session, and/or alternative slice management information (e.g., alt slice mgmt info). In an example, the alternative slice management information may comprise the value for the time duration (time period, timer, and/or the like) associated with the alternative slice.

In an example, the UE may receive from the network node, the PDU session modification command message. The UE may store information of the PDU session modification command message. Based on the PDU session modification command message, and/or based on the information of the alternative slice associated with the PDU session, the UE may determine that the PDU session is associated with the alternative slice (e.g., slice B) and the slice (e.g., slice A). Based on the PDU session modification command message, and/or based on the value of the time period associated with the alternative slice, the UE may start the time period for the alternative slice and/or the UE may start the time period for the PDU session.

In an example, the UE may determine whether the time period for the PDU session expires or not. For example, if the time period expires, the UE may discard (remove, delete) the information of the alternative slice associated with the PDU session. For example, the UE may remove the association between the PDU session and the alternative slice (e.g., slice B, slice B1, slice B2), and/or may determine that the PDU session is not associated with the alternative slice. For example, based on the removal, the UE may determine that the PDU session is associated with the network slice (e.g., slice A) and/or that the PDU session is not associated with the alternative slice (e.g., slice B).

In an example, alternatively and additionally, at the time period expiry for the alternative slice, the UE may determine whether there is at least one PDU session associated with the alternative slice. For example, if there is at least one PDU session associated with the alternative slice for which the time period expires, the UE may send to the network node, a message indicating the time expiry for the alternative slice. In other example, alternatively and additionally, if there is at least one PDU session associated with the alternative slice for which the time period expires, the UE may not discard the information for the alternative slice and/or may not remove the association between the PDU session and the alternative network slice.

In the example of FIG. 23, based on the time period, the network can control the association between the PDU session and the alternative network slice.

Figure 24:
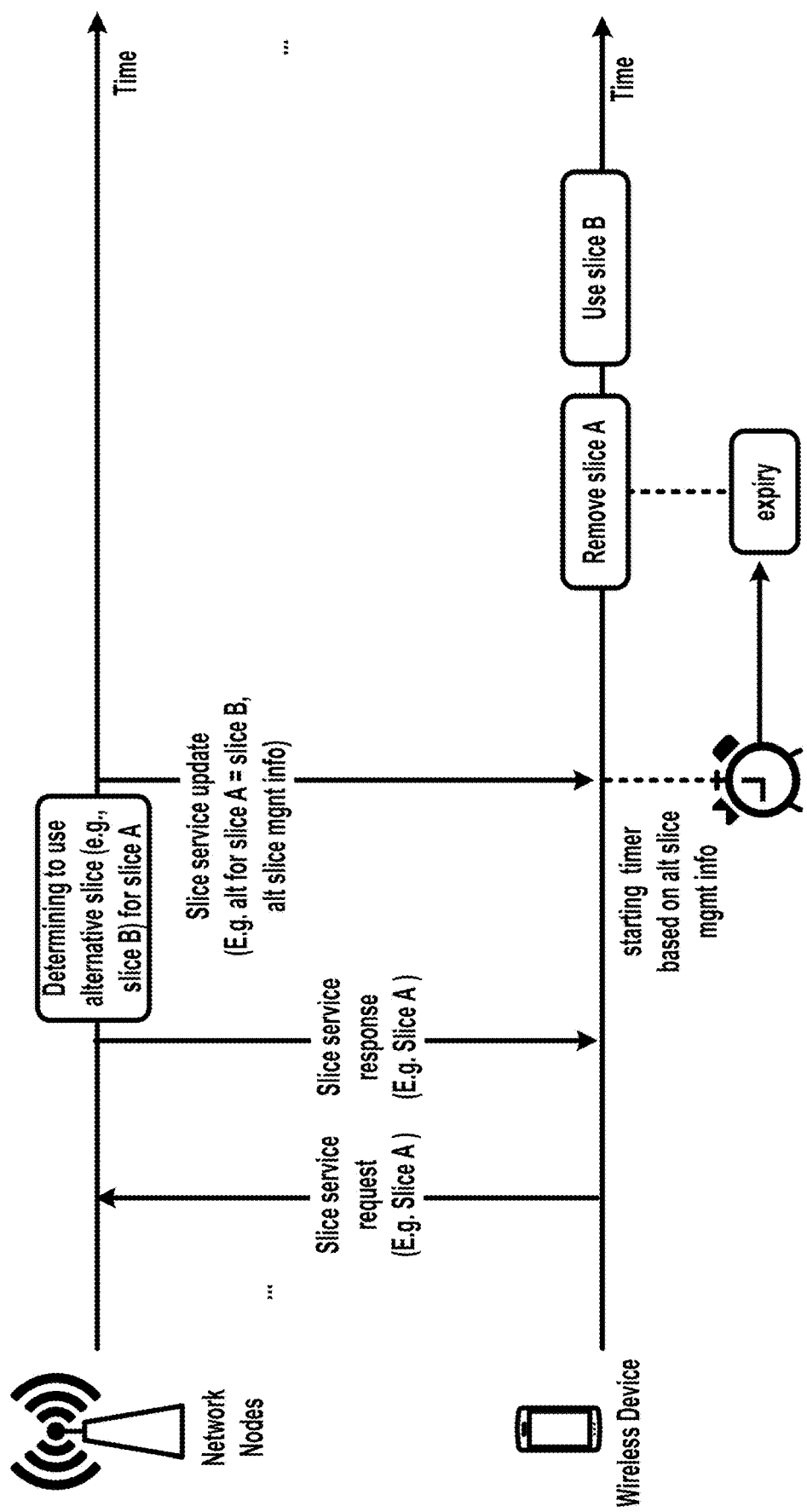
FIG. 24 is a diagram of an aspect of an example embodiment of the present disclosure.

FIG. 24 may depict one example embodiment of the present disclosure. In an example, a UE may be provided with an alternative slice management information (e.g., alt slice mgmt info) associated with an alternative network slice (alternative slice). Based on the alternative slice management information, the UE may be able to determine when to switch the network slice (e.g., slice A) of the alternative network slice (e.g., slice B). Similar to the previous figure (e.g., FIG. 19), the UE may receive the alternative network slice management information. For brevity, redundant details will be omitted.

In an example, the UE may send to the network, the slice service request message. The slice service request may be at least one of the registration request message, the service request message, the PDU session establishment request message, the PDU session modification request message, and/or the like. The slice service request message may comprise at least one of the identifier of the UE, the list of requested network slices (e.g., requested slices), and/or the network slice replacement capability indicator.

In an example, the network may receive the slice service request message from the UE. In response to the slice service request message from the UE, the network node may send the slice service response message to the UE. For example, the slice service response message may be at least one of the registration accept message, the registration reject message, the PDU session establishment accept message, the PDU session establishment reject message, the service accept message, the service reject message, the UE configuration update message, the PDU session modification command message and/or the like. For example, the slice service response message may comprise at least one of the list of allowed network slices (e.g., allowed network slices, allowed slices), the list of rejected network slices (e.g., rejected network slices, rejected slices), the list of alternative network slices (e.g., alternative network slices, alternative slices), and/or the list of configured network slices (e.g., configured network slices, configured slices).

In an example, the UE may receive the slice service response message. The UE may store the information included in the slice service response message in the storage.

In an example, the network may determine whether to use an alternative slice for a network slice. Based on the determination to use the alternative slice for the slice A, the network node may send the slice service update message to the UE. For example, the slice service update message may be at least one of the registration accept message, the registration reject message, the PDU session establishment accept message, the PDU session establishment reject message, the service accept message, the service reject message, the UE configuration update message, the PDU session modification command/request message and/or the like. For example, the slice service update message may comprise at least one of the list of (updated) allowed network slices (e.g., allowed network slices, allowed slices), the list of (updated) rejected network slices (e.g., rejected network slices, rejected slices), the list of (updated) alternative network slices (e.g., alternative network slices, alternative slices), the list of configured network slices (e.g., configured network slices, configured slices), and/or alternative slice management information (e.g., alt slice mgmt info). In one example, the slice service response message may be the slice service update message.

In an example, the alternative slice management information may comprise a value for a time duration (time period, timer, and/or the like) associated with the alternative slice. For example, the value may indicate 1 second, 2 minutes, 3 hours, and/or the like. For example, the value for the time duration may be determined based on the time when the network slice is available, and/or based on the time when the network slice (e.g., slice A) associated with the alternative slice (e.g., slice B) needs to be removed. For example, the time period may be used to prevent the UE from requesting the network slice (e.g., slice A) of the alternative slice (e.g., slice B), to make the UE to delete (discard, remove from the memory) the information of the network slice. For example, this may assist to switch resources from the slice (e.g., slice A) to the alternative network slice (e.g., slice B), and remove the slice (e.g., slice A).

In an example, the UE may receive from the network node, the slice service update message. The UE may store information of the slice service update message. In an example, the UE may determine whether the slice service update message comprises the alternative slice management information. For example, the UE may determine whether the slice service update messages comprise information of the time duration associated with the alternative slice. The information of the time duration may indicate a time duration, a duration of time, a time period, a value for a timer, and/or the like. Based on that the slice service update message indicates the alternative slice, and/or based on that the slice service update message comprises information of the time duration associated with the alternative slice, the UE may start the time period (e.g., the timer) associated with the alternative slice.

In an example, the time period associated with the alternative slice may expire. For example, if the timer associated with the alternative slice runs for the time equal to the value associated with the alternative slice, the time period may expire. For example, if the time period passes the time equal to the value associated with the alternative slice, the time period may expire. In response to that the timer (or the time period) associated with the alternative slice expires, the UE may discard (remove, delete) the information of the slice (e.g., slice A) associated with the alternative slice (e.g., slice B). For example, the UE may remove association with the network slice (e.g., slice A) and the alternative slice (e.g., slice B, slice B1, slice B2). For example, the UE may determine that the network slice (e.g., slice A) is not valid anymore, that the network slice (e.g., slice A) of the alternative slice (e.g., slice B) is rejected (not allowed), that the alternative slice is a configured slice for a subscribed network slice. For example, before the expiry of the time period, the UE may have information of a visited (configured) S-NSSAI (e.g., slice AV) for the subscribed S-NSSAI (e.g., slice AH) of the slice (e.g., slice A) and the alternative S-NSSAI (e.g., slice B) for the visited S-NSSAI. If the time period expires, the UE determines that the slice B is the visited S-NSSAI for the subscribed S-NSSAI (e.g., slice AH, slice A). For example, the UE may update the URSP. For example, the updated URSP may indicate that the data of the application A needs to use the slice B instead of slice the A.

In the example of FIG. 24, based on the time period, the network can update a configured slice information or a URSP without increasing additional signaling.

Figure 25:
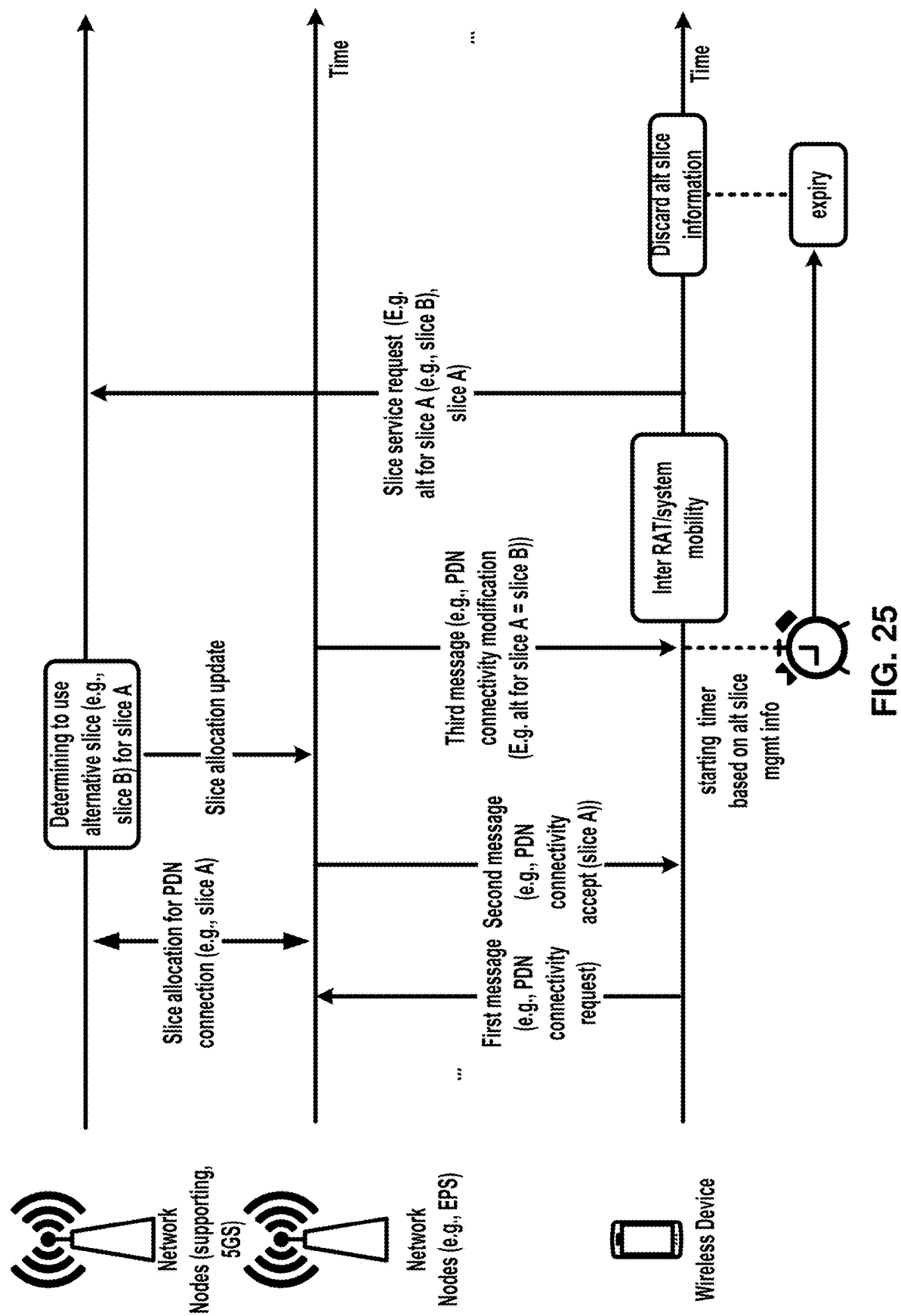
FIG. 25 is a diagram of an aspect of an example embodiment of the present disclosure.

FIG. 25 may depict one example embodiment of the present disclosure. In an example, a UE may be provided with an alternative slice management information (e.g., alt slice mgmt info) and/or an alternative network slice (alternative slice) from a first network system (e.g., first network type), EPS. Based on the alternative slice management information and/or the information of the alternative network slice, the UE may be able to determine to use information of the alternative slice when the UE moves to a second network system (e.g., a second network type, 5GS).

In an example, a UE may send a first message to a first network system. For example, the first message may indicate a request to establish one or more PDN (Packet Data Network) connections, one or more default EPS bearers, one or more dedicated EPS bearers, one or more EPS (evolved packet system) contexts, and/or the like. For example, the first network system may be an EPS, an EPC (evolved packet core), an enhanced packet core, and/or the like. For example, the first network system may comprise at least one of an MME (mobility management entity), a SGW (S-GW, serving gateway), a PGW (P-GW, PDN gateway), a PGW-U+UPF (UPF+PGW-U), a PGW-C+SMF (SMF+PGW-C), E-UTRAN and/or the like. For example, the first message may be at least one of a Attach Request message, a Service request messages, a Tracking area update request message, a Uplink NAS transport message, a Uplink generic NAS transport message, a Activate dedicated EPS bearer context request message, a Activate default EPS bearer context request message, a bearer resource allocation request message, a bearer resource modification request message, a ESM information request message, a Modify EPS bearer context request message, a PDN connectivity request message, a ESM data transport message and/or the like. For example, the first message may comprise at least one of a EPS bearer identity, a message identity, a PDN type, a request type, a protocol configuration options (PCO), a extended protocol configuration options (ePCO), an access point name, and/or the like. For example, the first message may indicate at least one of whether the UE supports a second network system (e.g., 5GS), and/or whether the UE supports the feature of the alternative network slice or not. For example, the UE may indicate that the UE supports the feature of the alternative network slice. The indication that the UE supports the feature of the alternative network slice may assist the first network system to determine whether to deliver the information of the alternative network slice of the second network system to the UE or not. For example, the second network system may be a 5GS (5G system), a 5GC (5G core network), an 5G packet core, and/or the like. For example, the second network system may comprise at least one of an AMF, a SMF, a UPF, a PCF, a PGW-U+UPF (UPF+PGW-U), a PGW, a PGW-C+SMF (SMF+PGW-C), NG-RAN and/or the like.

In an example, a first network node (e.g., a MME, a SMF+PGW-C, and/or the like) of the first network system may receive the first message. In response to the first message, the first network node may send a second message to the UE. For example, the second message may indicate at least one of one or more established EPS contexts, one or more default EPS bearers, one or more EPS bearers, and/or or more PDN connections. For example, based on that the UE indicates that the UE supports the feature of the alternative slice (e.g., a feature of a network slice replacement), the first network node may further include into the second message, at least one of an information of an alternative slice, an information associated with the alternative slice and/or the alternative network slice management information. For example, based on the requested (established, allowed) EPS context (of the one or more EPS contexts), based on the requested (established, allowed) EPS bearer (of the one or more EPS bearers), and/or based on the requested (established, allowed) PDN connection (of the one or more PDN connections), the first network system (or the first network node) may determine a network slice (e.g., slice A) associated with at least one of the EPS context, the EPS bearer, and/or the PDN connection. Based on the determined network slice (e.g., slice A), the first network system may determine an alternative network slice (e.g., slice B) for the determined network slice (e.g., slice A). For example, based on the determined alternative network slice (alternative slice), the first network system may determine the alternative slice management information associated with the alternative slice. For example, the second message may comprise at least one of an identifier of the EPS bearer (or the PDN connection, the EPS context), an identifier associated with the network slice (e.g., slice A), and/or an identifier associated with the alternative network slice (e.g., slice B). For example, the second message may be at least one of a Attach accept message, a Service accept messages, a Tracking area update accept message, a Downlink NAS transport message, a Downlink generic NAS transport message, a Activate dedicated EPS bearer context request message, a Activate dedicated EPS bearer context accept message, a Activate default EPS bearer context accept message, a bearer resource allocation accept message, a bearer resource modification accept message, a ESM information accept message, a Modify EPS bearer context accept message, a PDN connectivity accept message, a ESM data transport message and/or the like. For example, the second message may comprise at least one of A EPS attach type: This may indicate a type of requested attach. For example, this may indicate EPS attach, EPS/IMSI attach, EPS emergency attach, and/or the like.

A EPS bearer identity: This may indicate an identifier of the EPS bearer. The EPS bearer may uniquely identify traffic flows that receive a common QoS treatment between the UE and a PDN GW (e.g., UPF+PGW-U). For example, the EPS bearer is the level of granularity for bearer level QoS control in the first network system (e.g., EPS, EPC).

A EPS QOS: This may indicate QoS parameters for the EPS bearer (associated with the PDN connection, and/or the EPS context). For example, for the EPS bearer, this may indicate a QCI (QOS Class Identifier), a maximum bit rate for uplink, a maximum bit rate for a downlink, and/or the like.

A PDN type: This may indicate the type of PDN connection. For example, this may indicate IP, non IP, ethernet, and/or the like. The PDN connection may be an association between a PDN represented by an APN and a UE, represented by one IPv4 address and/or one IPv6 prefix (for IP PDN Type) or by the UE Identity (for Non-IP and Ethernet PDN Types). The PDN connection may be associated with one or more EPS bearers and/or one or more EPS contexts. For the PDN connection, an identifier (e.g., a PDN ID) may be associated with. For example, the EPS bearer may be configured for the PDN connection.

A PDN address: This may indicate an IPv4 address assigned to the UE for the PDN connection (or the EPS bearer, the EPS context).

A request type: This may indicate a type of request. For example, this may indicate initial request, Handover, emergency and/or the like.

A protocol configuration options (PCO). This may be used to transfer external network protocol options associated with a PDP (packet data protocol) context, and/or the EPS context (e.g., the EPS bearer, the PDN connection).

An extended protocol configuration options (ePCO). This may be used to transfer external network protocol options associated with a PDP (packet data protocol) context, and/or the EPS context (e.g., the EPS bearer, the PDN connection), and/or to transfer additional protocol data.

An access point name (APN): This may identify the PDN (e.g., an internet network, a multimedia network, a private network, an enterprise network, and/or the like) to which the UE wishes to connect. This may identify the PDN associated with the PDN connection (or the EPS bearer, the EPS context)

A packet flow identifier: This may indicate a packet flow identifier for a packet flow context. For example, this may indicate whether the packet flow is for best effort delivery, for a SMS, and/or for a signalling.

For example, the PCO and/or the ePCO may comprise at least one of:

PDU session ID. This may indicate an identifier of the PDU session associated with the PDN connection, the EPS bearer, and/or the EPS context.

5GSM cause value. This may indicate a cause associated with the second network system. For example, the SMF (or the SMF+PGW-C) may use this to indicate information associated with the PDU session.

ATSSS request. This may be used for the UE to request ATSSS for the PDN connection (or EPS bearer, EPS context).

Indication of support the feature of the alternative network slice (or, support of the feature of slice replacement). This may indicate whether the UE supports the feature of the alternative network slice. Based on this, the first network system may send information associated with the (alternative) network slice (e.g., associated with the second network system) to the UE.

Slice information. For example, this may indicate a network slice (e.g., slice A) associated with the PDN connection (e.g., PDN connection 1), the EPS bearer (e.g., EPS bearer 1), and/or the EPS context (e.g., EPS context 1). For example, this may comprise information of the alternative slice (e.g., slice B) for the slice (e.g., slice A), the PDN connection, the EPS bearer, and/or the EPS context. For example, this may comprise information of one or more criterion. For example, the one or more condition may indicate when the slice information (or associated alternative slice) is valid and/or where the slice information is valid. For example, when the UE moves to 5GS, the UE may determine whether the one or more conditions (e.g., one or more frequency, one or more cells, one or more TAs, and/or the like) are met. If the one or more conditions are met (e.g., the condition indicates a cell A1, and if the UE is in the cell A1), the UE may determine that the slice information is valid. For example, based on that the slice information is valid, the UE may consider that the slice (e.g., slice A, slice B) is allowed in the 5GS. For example, based on that the slice information is not valid, the UE may consider that the slice (and/or the alternative slice) is not allowed. For example, after reselecting to 5GS, based on that the slice information is valid, the UE may include the slice (and/or the alternative slice) indicated by the slice information into a registration request message, and may send the registration request message to AMF. For example, after reselecting to 5GS, based on that the slice information is not valid, the UE may not include the slice indicated by the slice information into a registration request message, and may send the registration request message to AMF.

Alternative slice information. For example, this may comprise information of the alternative slice (e.g., slice B) for the slice (e.g., slice A), the PDN connection, the EPS bearer, and/or the EPS context. For example, this may comprise alternative network slice management information associated with the alternative network slice, the slice (e.g., slice A), the PDN connection (e.g., PDN connection 1), the EPS bearer (e.g., EPS bearer 1), and/or the EPS context (e.g., EPS context 1).

For example, the second message may indicate that a first PDN connection (e.g., PDN connection 1) is established, that the first PDN connection is associated with a first EPS bearer (e.g., EPS bearer 1), that the first PDN connection (or, the first EPS bearer) is associated with a first network slice (e.g., Slice A), and/or that the first network slice is associated with an alternative network slice (e.g., slice B).

In an example, the UE may receive the second message. In response to receiving the second message, the UE may store information of the second message in the storage of the UE. For example, the UE may store the ePCO and/or the PCO.

In an example, the network may determine whether to use an alternative slice for a network slice. For example, the first network node (and/or the first network system, and/or the like) may monitor network resources available for the network slice (e.g., associated with the PDN connection, and/or associated with the second network system), may check whether there is a congestion for the network slice, and/or may check whether QoS requirement is met for the network slice. For example, the first network node (and/or the first network system, and/or the like) may receive from a second network node (of the second network system) information of status of the network resources available for the network slice. Based on the determination and/or based on the information from the second network node, the first network node determine that there is a congestion for the network slice, and/or that QoS requirement is not met for the network slice, and/or that there is shortage of network resource for the slice A. Based on the determination, the first network node may determine to use the alternative slice (e.g., slice B, slice B1, slice B2, and/or the like) for the slice (e.g., slice A). Alternatively and additionally, the information delivered from the second network node may comprise information of the alternative slice (e.g., slice B, slice B1, slice B2, and/or the like) for the slice (e.g., slice A).

In an example, the first network node may determine to send a third message to the UE. For example, the first network node may check if there is a PDN connection (or EPS bearers) for the alternative network slice associated with the congested network slice. For example, to indicate the alternative slice information for the network slice, the first network node may send the third message to the UE. For example, the third message may comprise similar information as the second message. For example, if the information of the alternative slice is available, the second message may be the third message. For example, the third message may comprise information (e.g., an identifier) of the alternative slice (e.g., slice B) for the network slice (e.g., slice A) associated with the PDN connection (or, the EPS bearer, the EPS context), and/or the alternative network slice management information associated with the alternative network slice (alternative slice). For example, based on that the UE indicates that the UE supports the feature of the alternative slice (e.g., a feature of a network slice replacement), the first network node may further include into the third message, the information of an alternative slice, the information associated with the alternative slice and/or the alternative network slice management information. For example, based on the requested (established, allowed) EPS context (of the one or more EPS contexts), based on the requested (established, allowed) EPS bearer (of the one or more EPS bearers), and/or based on the requested (established, allowed) PDN connection (of the one or more PDN connections), the first network system (or the first network node) may determine the network slice (e.g., slice A) associated with the EPS context, the EPS bearer, and/or the PDN connection. Based on the determined network slice (e.g., slice A), the first network system may determine the alternative network slice (e.g., slice B) for the determined network slice (e.g., slice A). For example, based on the determined alternative network slice (alternative slice), the first network system may determine the alternative slice management information associated with the alternative slice. For example, the third message may comprise at least one of an identifier of the EPS bearer (or the PDN connection, the EPS context), the identifier associated with the network slice (e.g., slice A), and/or the identifier associated with the alternative network slice (e.g., slice B). For example, the third message may comprise the EPS attach type, the EPS bearer identity, The EPS QoS, the PDN type, the PDN address, the request type, the PCO, the ePCO, the APN, the packet flow identifier, and/or the like. For example, the third message may be at least one of the Attach accept message, the Service accept messages, the Tracking area update accept message, the Downlink NAS transport message, a Activate dedicated EPS bearer context request message, the Downlink generic NAS transport message, the Activate dedicated EPS bearer context accept message, the Activate default EPS bearer context accept message, the bearer resource allocation accept message, the bearer resource modification accept message, the ESM information accept message, the Modify EPS bearer context accept message, the PDN connectivity accept message, the ESM data transport message and/or the like. For example, the PCO and/or the ePCO may comprise the information of the alternative network slice.

In an example, the UE may receive from the first network system, the third message. The UE may store the information of the third message. For example, based on the value for the time period associated with the alternative slice (associated with the e.g., the network slice, the EPS context, the EPS bearer, the PDN connection), the UE may start the time period for the alternative slice.

In an example, the UE may perform measurement of one or more neighboring cells. For example, the UE may measure one or more cells of the first network system and/or one or more cells of the second network system. Based on the measurement, the UE may determine to select a second cell of the one or more cells of the second network system. For example, if a signal quality of a first cell (of the first network system) is weaker than the signal quality of the second cell, the UE may determine to select the second cell and/or may determine to switch from the first network system to the second network system. Alternatively, the UE may switch from the first network system to the second network system, if the UE receives from the first network node, a command (e.g., handover command) to move to the second network system.

In an example, the UE may select the second cell of the second network system. In response to selecting the second network system, the UE may send a slice service request message. For example, the slice service request message may be similar to the slice service request message (e.g., of the FIG. 19, 20, 21). For example, the UE may check the one or more EPS bearer, the one or more EPS context and/or the one or more PDN connection. For the one or more EPS bearer, the one or more EPS context and/or the one or more PDN connection, the UE may determine one or more associated PDU sessions, and/or one or more associated network slices. The slice service request message may comprise information of the one or more associated PDU sessions and/or the one or more associated network slices. For example, the UE may determine to move the one or more PDN connections (or the one or more EPS bearers, the one or more EPS contexts) of the first network system to the second network system. For example, the UE may move the PDN connection 1 (or EPS bearer 1, EPS context 1) from the first network system to the second network system. In an example, based on the determination to move the PDN connection 1, the UE may determine a PDU session (e.g., PDU session 1) and/or a network slice (e.g., slice A) associated with the PDN connection 1 (e.g., EPS bearer 1, EPS context 1). Based on the determination, the slice service request message may comprise information of the PDU session and/or the network slice. For example, the slice service request message may indicate the PDU session 1, and/or the slice A. In an example, the UE may check whether there is an alternative slice (e.g., slice B) associated for the network slice (e.g., slice A). For example, the UE may determine whether there is any received (or stored) alternative network slice (e.g., slice B) information for the network slice (e.g., slice A) of the PDN connection (e.g., PDN connection 1, EPS bearer 1, EPS context 1). Based on that the alternative slice (e.g., slice B) is associated with the slice A, the UE may determine to include information of the alternative slice in the slice service request message. For example, the UE may determine whether the time period associated with the alternative slice expires or not and/or whether the condition indicated by the alternative slice management information is met. If the time period associated with the alternative slice does not expire (or running) and/or if the condition indicated by the alternative network slice management information is met, the UE may determine to include the information of the alternative slice into the slice service request message. In an example, the UE may send the slice service request message to the second network system (e.g., the second network node).

For example, the slice service request message may be similar to the second slice service request message (as described in FIG. 19, 20) and/or the PDU session establishment request message (as described in FIG. 21, 22) and/or the registration request message (as described in FIG. 21). The slice service request may further comprise information of the first network system. For example, to configure resources for the PDU session in the second system based on the EPS bearer (or the PDN connection, the EPS context), the slice service request message may further comprise information (e.g., identifier) of the EPS bearer (or the PDN connection, the EPS context).

In an example, the second network node (or the second network system) may receive the slice service request message. Based on the slice service request message comprises information of the alternative network slice (e.g., slice B) and/or the network slice (e.g., slice A), the second network may allocate resources for the UE (and/or the PDU session), using the alternative network slice and/or the network slice.

In an example, the time period may expire. In response to the expiry of the time period associated with the alternative slice, the UE may discard (delete, remove) information associated with the alternative network slice. For example, in response to the expiry of the time period associated with the alternative slice, the UE may not use the information associated with the alternative network slice anymore. For example, after the expiry of the time period, the UE may send a third slice service request message requesting a service of the network slice (e.g., slice A). Based on the expiry of the time period associated with (for) the alternative slice (e.g., slice B) for the network slice (e.g., slice A), the third slice service request message may not comprise information of the alternative network slice.

Figure 26:
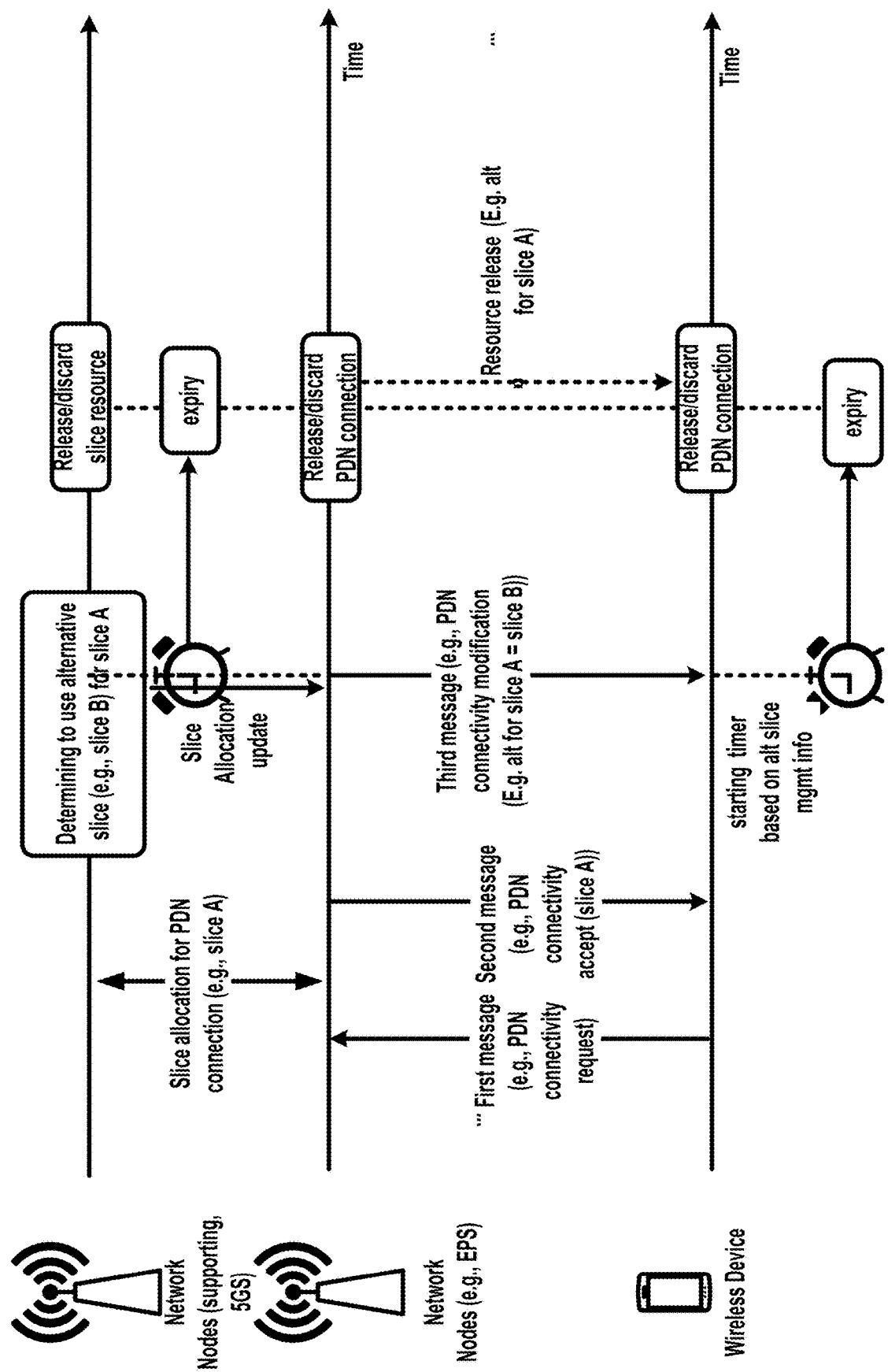
FIG. 26 is a diagram of an aspect of an example embodiment of the present disclosure.

FIG. 26 may depict one example embodiment of the present disclosure. In an example, a network system may be provided with an alternative slice management information (e.g., alt slice mgmt info) and/or an information of an alternative network slice (alternative slice). Based on the alternative slice management information and/or the information of the alternative network slice, the network node (or the network system) may determine to manage the use of the alternative slice. Similar to the previous figure (e.g., FIG. 25), the UE may receive information of the alternative network slice from the first network system. For brevity, redundant details will be omitted.

In an example, the UE may send the first message to the first network system. For example, the first message may indicate the request to establish one or more PDN (Packet Data Network) connections, one or more default EPS bearers, one or more dedicated bearers, one or more EPS (evolved packet system) contexts, and/or the like.

In an example, the first network node (e.g., a MME, a SMF+PGW-C, and/or the like) of the first network system may receive the first message. In response to the first message, the first network node may send the second message to the UE. For example, the second message may indicate the one or more established EPS contexts, the one or more default EPS bearers, the one or more EPS bearers, and/or the one or more PDN connections.

In an example, the UE may receive the second message. In response to receiving the second message, the UE may store information of the second message in the storage of the UE. For example, the UE may store the ePCO and/or the PCO of the second message.

In an example, the network may determine whether to use an alternative slice for a network slice. In an example, the first network node may determine to send the third message to the UE. For example, to indicate the alternative slice information for the network slice associated with the PDN connection (or, the EPS bearer), the first network node may send the third message to the UE.

In an example, when the first network node sends the third message to the UE, the first network node may start a second time period the UE. The second time period may be similar to the time period (as described in FIG. 25). For example, by using the second time period, the first network node may be able to determine when the time period expires at the UE. Alternatively, by using the second time period, the first network node may be able to remove resources used for the alternative network slice. For example, when the second time period expires, one or more network nodes of the first network system (and/or the second network system) may determine whether there is one or more PDU sessions established using the alternative network slice (e.g., slice B) for the network slice (e.g., slice A) and/or may determine one or more UEs for which the alternative network slice is allowed. Based on the determination, the first network node may delete (remove) resources allocated to the one or more PDU sessions and/or the one or more UEs. For example, based on the determination, the first network node may send to the UE a resource release message (e.g., PDN connectivity release message, Deactivate EPS bearer message), a message indicating removal of the PDN connection (or EPS bearer, EPS context) associated with the alternative network slice, a message to deactivate (release) the PDU session associated with the alternative network slice, and/or a message to reject (deallocate, remove) the alternative network slice from the allowed network slice.

In an example, the second time period may be used similarly in previous examples. For example, (in the example of FIG. 19, 20, 21), the network node may start the second time period when the network sends the slice service update message to the UE. When the second time period expires, the network node may determine whether there is a PDU session established using (or associated with) the alternative network slice. If there is the PDU session established using the alternative slice, and based on the expiry of the second time period, the network may determine to remove the association between the PDU session and the alternative slice, and/or may determine to deactivate (release) the PDU session. For example, the associated network slices for the PDU session may change from {slice A, slice B} to {slice A}. For example, the network node may send a fourth message to the UE. For example, the fourth message may indicate that alternative network slice is removed (deactivated), and/or may indicate the updated association between the PDU session and the network slices. For example, the fourth message may indicate that the alternative slice is not associated with the PDU session.

Figure 27:
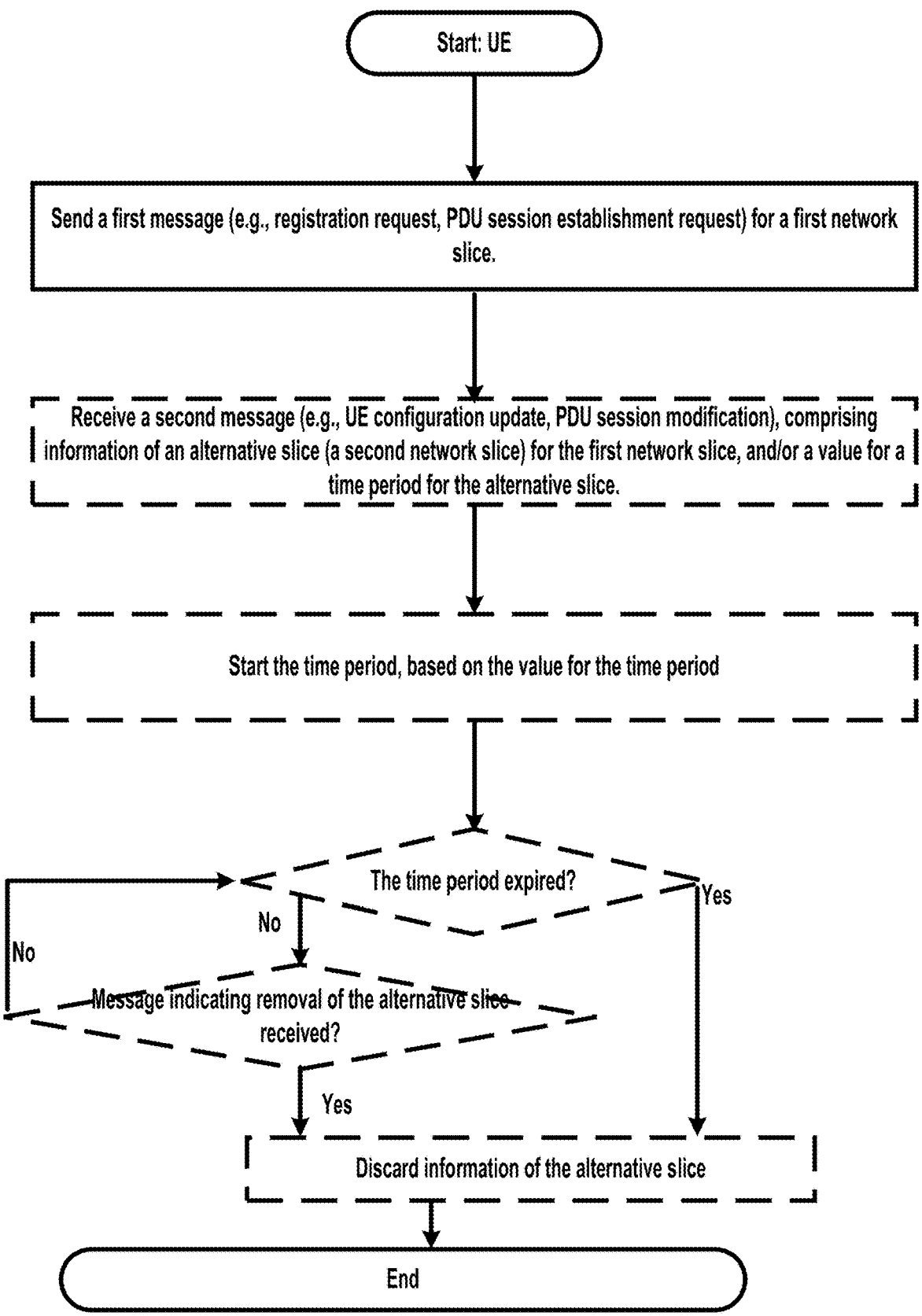
FIG. 27 is a diagram of an aspect of an example embodiment of the present disclosure.

FIG. 27 may depict one example embodiment of the present disclosure. In an example, a UE may receive information of an alternative slice and may manage the information. For brevity, redundant details will be omitted.

In an example, the UE may send to a first network node, a first message to request one or more network slices. For example, the one or more network slices may comprise a first network slice. For example, the first message may be at least one of a registration request message (e.g., requesting registration of the first network slice), a PDU session establishment request message (e.g., requesting establishment of a first PDU session using the first network slice). For example, the first network node may be at least one of an AMF, an SMF, an MME, an SGW, an PGW, and/or the like. For example, the first message may comprise one or more identifiers of the one or more network slices.

In an example, the first network node may receive the first message. In response to receiving the first message, the first network node may send a response message to the UE. For example, the response message may be at least one of a registration accept message, a PDU session establishment accept message, and/or the like.

In an example, the first network node may determine whether there is a need to allocate an alternative slice for the one or more network slices. For example, the first network node may determine to use an alternative slice (e.g., a second slice) for the first network slice. Based on the determination, the first network node may send a second message to the UE. For example, the second message may be at least one of a UE configuration update message, a PDU session modification command message, and/or the like. The second message may comprise information of the alternative slice and/or an alternative slice management information (e.g., a value for a time period for the alternative slice). In one example, the information of the alternative slice may comprise the alternative slice management information.

In an example, the UE may receive the second message. In response to receiving the second message, the UE may store the information of the alternative slice and/or the alternative slice management information. Based on that the second message comprises information of the alternative slice, and/or based on the alternative network slice management information, and/or based on the value for the time period for the alternative network slice, the UE may start the time period for the alternative network slice. For example, the value may indicate 1 ms, 10 seconds, 100 minutes, and/or the like.

In an example, the UE may check whether the time period expires or not. If the time period expires, the UE may discard (delete, remove) the information of the alternative slice and/or the alternative network slice management information from a storage. For example, if there is no stored information of an alternative slice for a slice (e.g., the first network slice), when the UE sends a request message (e.g., PDU session establishment request, PDU session modification request, PDU session release request, service request) for the network slice, the UE may not include the information of the alternative slice in the request message. If the time period is not expired and/or if the time period is running, the UE may determine whether a third message is received. For example, the third message may indicate removal of the alternative slice and/or removal of association between the slice and the alternative slice, and/or removal of association between the PDU session and the alternative slice. For example, the third message may be a message comprising information (e.g., an identifier) of a network slice (e.g., a first network slice) and/or may not comprise information of an alternative network slice. For example, the third message may be a PDU session modification request, a PDU session release message, a UE configuration update message, and/or the like. If the UE receives the third message, the UE may discard (delete, remove) the information of the alternative slice and/or the alternative network slice management information, and/or remove association between the slice (the PDU session) and the alternative network slice.

In an example, a UE (e.g., a wireless device) may send a first message to a network node. For example, the UE may send the first message to register the UE for one or more network slices, to request allowance for the one or more network slices, and/or to establish one or more PDU sessions for the one or more network slices. For example, the one or more network slices may comprise at least a first network slice (e.g., first slice, slice A, S-NSSAI 1, at least one requested network slice). For example, the first message may indicate the one or more network slices (slices), and/or may indicate one or more identifiers (e.g., S-NSSAI, NSSAI) of the one or more network slices. For example, the one or more network slices of the first message may be the requested network slices (or requested slices). For example, the network node may be at least one of an AMF, an MME, an SMF, an SMF+PGW-C, an SMF+PGW-C, and/or the like. For example, the first message may further comprise at least one of an identifier (e.g., IMSI, PEI, SUPI, SUCI, and/or the like) of the UE, an identifier of a PDU session, an indication of whether the UE supports a feature of an alternative network slice (or replacement of an network slice, and/or the like). For example, the first message may be at least one of a registration request message, a PDU session establishment request message, a service request message, an attach request message, an activate default (or dedicated) EPS bearer request message and/or the like.

In an example, the UE may receive from the network node, a response message for the first message. For example, the response message may be at least one of a registration accept message, a service accept message, a registration reject message, a service reject message, a PDU session establishment accept message, a PDU session establishment reject message, a UE configuration update message. For example, the response message may indicate one or more allowed network slices, one or more rejected network slices, one or more PDU sessions established for the one or more allowed network slices, and/or one or more PDU sessions rejected for the one or more allowed network slices. For example, the network node may determine the one or more allowed network slice and/or the one or more rejected network slices, based on the one or more requested network slices.

In an example, the UE may receive from the network node, a second message. For example, the network node may send the second message to indicate an information of one or more alternative network slices for the one or more network slices. For example, the one or more (requested, allowed, configured and/or rejected) network slices may comprise the first network slice. For example, the one or more rejected network slices and/or the one or more allowed network slices may comprise the first network slice. In response to receiving the second message (or information of alternative network slice), the UE may store the information (an identifier, a time period, and/or the like) of the alternative network slice into storage (or memory) of the UE. For example, the network may determine to use a network slice (e.g., a second network slice) for the first network slice, as an alternative slice for the first network slice.

For example, the second message may comprise (or indicate) at least one of: >>the identifier of the first network slice (e.g., an at least one requested (or allowed, or rejected, or configured) network slice); >>an identifier of an alternative network slice (e.g., the second network slice) for the first network slice; >>a time period for the alternative network slice. This may indicate a value of a time duration, and/or a timer. For example, the time period may indicate a time until when an information (e.g., the identifier) of the alternative slice (e.g., the second network slice) is applied (or valid) for the network slice (e.g., the first network slice); >>an identifier of a network slice group for the alternative network slice. This may indicate which network slice group (e.g., NSSG, network slice selection group, and/or the like) the alternative network slice is associated with. For example, a cell of a NG-RAN may send a SIB indicating one or more network slice groups. Based on the SIB, the UE may be able to determine whether the cell supports the alternative network slice and/or whether the alternative slice is valid or not. For example, if the network slice group for the alternative network slice is a network slice group 2, and if the SIB indicates that the network slice group 2 is supported, the UE may determine that the cell supports the alternative slice and/or that the information of the alternative slice is valid.

In an example, the UE may receive the second message. In response to receiving the second message, the UE may start the time period. For example, based on the value indicated by the second message, the UE may start the time period for the alternative network slice. For example, the UE may stop the time period if the UE receives a third message. For example, the third message may comprise information of the first network slice and/or may not comprise the information of the alternative network slice (e.g., the second network slice). Based on that the third message does not comprise information of the alternative network slice, the UE may stop the time period. Based on stopping the time period, the UE may discard the identifier of the alternative network slice. For example, the time period may expire after starting, if the time period is not stopped. For example, the UE may send the information (e.g., an identifier) of the alternative slice, if the time period is not stopped and/or is not expired and/or is running. For example, the UE may use the information (e.g., an identifier) of the alternative slice, if the time period is not stopped and/or is not expired and/or is running. For example, using the alternative slice and/or using the information of the alternative slice may be at least one of sending a data via the alternative network slice for the network slice, receiving a data via the alternative network slice (e.g., slice B) for the network slice (e.g., slice A), sending a request to establish a PDU session with information of the alternative network slice and with the information of the network slice, sending a request to activate a PDU session with information of the alternative network slice and with the information of the network slice, and/or the like. In an example, the UE may stop the time period, if the UE establishes at least one PDU session with the alternative network slice for the network slice, to prevent release of the PDU session.

In an example, the time period may expire. Based on the expiry of the time period for the alternative network slice, the UE may discard the identifier of the alternative network slice. For example, the discarding of the identifier may be at least one of deleting the identifier from the wireless device, removing the identifier from a memory, releasing a PDU session associated with the alternative network slice, not using the identifier of the alternative slice, and/or not sending the identifier of the alternative slice to the network node. Based on the expiry of the time period, the UE may send a third message to the network node. For example, the third message may comprise the identifier of the first network slice, and/or may not comprise the identifier of the alternative network slice (e.g., the second network slice). In other example, the third message may comprise the identifier of the alternative network slice and/or an indication indicating the expiry of the time period for the alternative network slice. In other example, at the expiry of the time period, if there is at least a PDU session over the alternative network slice, the UE may send the third message.

In an example, a UE may receive a message indicating at least one of an alternative network slice for a network slice and a time period associated with the alternative network slice. For example, the message may comprises an identifier of the alternative network slice. For example, the UE may start the time period in response to receiving the message. For example, the UE may send a request message comprising an identifier of the one network slice. For example, the request message may further comprise an identifier of the alternative network slice for the network slice before expiry of the time period.

In an example, a UE may receive from a first network system (e.g, MME, EPS, EPC, and/or the like), a first message comprising at least one of an identifier of a bearer (e.g., an EPS bearer, a PDN connection, an EPS context) established in the first network system, an identifier of a network slice for the bearer; and an identifier of an alternative slice for the network slice. For example, the UE may communicate with the first network system and via the EPS bearer, one or more data. For example, the UE may send to a second network system (e.g., a 5GS, 5G core, SMF, AMF, and/or the like) a second message comprising the identifier of the alternative network slice.

Clause 1. A method comprising: sending, by a wireless device to a mobility management entity (MME) of an evolved packet system (EPS), via a first cell, a packet data network connectivity request message; receiving, by the wireless device from the MME, via the first cell, a packet data network connectivity accept message comprising an identifier of an allowed network slice configured for a 5th generation system (5GS); receiving, by the wireless device from the MME, via the first cell, a packet data network connectivity modification message comprising: the identifier of the allowed network slice configured for the 5GS; and an identifier of an alternative network slice mapped to the allowed network slice; determining, by the wireless device, mobility to a second cell, wherein the second cell is associated with the 5GS; sending, by the wireless device to an access and mobility management function (AMF) of the 5GS, via the second cell, a non-access stratum (NAS) message and/or a slice service request comprising the identifier of an alternative network slice; and accessing, by the wireless device, via the second cell, the alternative network slice.

Clause 2. A method comprising: receiving, by a wireless device from a mobility management entity (MME) of an evolved packet system (EPS), a message comprising: an identifier of a network slice configured for a 5th generation system (5GS); and an identifier of an alternative network slice mapped to the network slice.

Clause 3. The method of clause 2, wherein the receiving the message is via a first cell.

Clause 4. The method of one or more of clauses 2 to 3, wherein the message is a packet data network connectivity modification message and/or an extended protocol option; and/or the message indicates at least one of an EPS context associated with the alternative network slice, a packet data network connection associated with the alternative network slice, or an EPS bearer associated with the alternative network slice.

Clause 5. The method of one or more of clauses 2 to 4, wherein the network slice is an allowed network slice.

Clause 6. The method of one or more of clauses 2 to 5, further comprising determining, by the wireless device, mobility to a second cell, wherein the second cell is associated with the 5GS.

Clause 7. The method of one or more of clauses 2 to 5, further comprising sending, by the wireless device to an access and mobility management function (AMF) of the 5GS, the identifier of an alternative network slice.

Clause 8. The method of clause 7, wherein the sending the identifier of an alternative network slice is via a second cell.

Clause 9. The method of clause 8, wherein the sending the identifier of an alternative network slice is based on determining, by the wireless device, mobility to the second cell, wherein the second cell is associated with the 5GS.

Clause 10. The method of one or more of clauses 2 to 10, wherein the identifier of an alternative network slice is sent by the wireless device in a non-access stratum (NAS) message and/or a slice service request.

Clause 11. The method of one or more of clauses 6 to 10, further comprising accessing, by the wireless device, via the second cell, the alternative network slice.

Clause 12. The method of one or more of clauses 2 to 5, further comprising accessing, by the wireless device, via a second cell associated with the 5GS, the alternative network slice.

Clause 13. The method of one or more of clauses 2 to 12, further comprising receiving, by the wireless device from the MME, via the first cell, a packet data network connectivity accept message comprising the identifier of the network slice configured for the 5GS.

Clause 14. The method of clause 13, wherein the receiving the message is after the receiving the packet data network connectivity accept message.

Clause 15. The method of one or more of clauses 13 to 14, further comprising sending, by the wireless device to the MME, before receiving the packet data network connectivity accept message, via a first cell, a packet data network connectivity request message.

Clause 16. The method of one or more of clauses 2 to 12, further comprising sending, by the wireless device to the MME, via a first cell, a packet data network connectivity request message.

Clause 17. The method of one or more of clauses 15 to 16, wherein the packet data network connectivity request message comprises a capability indicator indicating at least one of: that the wireless device supports receiving information of one or more alternative slices via EPS; and/or that the wireless devices supports a capability of alternative slice.

Clause 18. A method comprising: sending, by a mobility management entity (MME) of an evolved packet system (EPS) to a wireless device, a message comprising: an identifier of a network slice configured for a 5th generation system (5GS); and an identifier of an alternative network slice mapped to the network slice.

Clause 19. The method of clause 18, wherein the sending the message is via a first cell.

Clause 20. The method of one or more of clauses 18 to 19, wherein the message is a packet data network connectivity modification message and/or an extended protocol option; and/or the message indicates at least one of an EPS context associated with the alternative network slice, a packet data network connection associated with the alternative network slice, or an EPS bearer associated with the alternative network slice.

Clause 21. The method of one or more of clauses 18 to 20, wherein the network slice is an allowed network slice.

Clause 22. The method of one or more of clauses 18 to 21, further comprising sending, by the MME to the wireless device, via the first cell, a packet data network connectivity accept message comprising the identifier of the network slice configured for the 5GS.

Clause 23. The method of clause 13, wherein the sending the message is after the sending the packet data network connectivity accept message.

Clause 24. The method of one or more of clauses 22 to 14, further comprising receiving, by the MME from the wireless device, before receiving the packet data network connectivity accept message, via the first cell, a packet data network connectivity request message.

Clause 25. The method of one or more of clauses 2 to 21, further comprising sending, by the wireless device to the MME, via a first cell, a packet data network connectivity request message.

Clause 26. The method of one or more of clauses 24 to 25, wherein the packet data network connectivity request message comprises a capability indicator indicating at least one of: that the wireless device supports receiving information of one or more alternative slices via EPS; and/or that the wireless devices supports a capability of alternative slice.

Clause 27. An apparatus comprising one or more processors and memory storing instructions that, when executed by the one or more processors, cause the apparatus to perform the method of any of clauses 1 to 26.

Clause 28. A non-transitory computer-readable medium comprising instructions that, when executed by one or more processors of an apparatus, cause the apparatus to perform the method of any one of clauses 1 to 26.

Clause 101. A method comprising: sending, by a wireless device to a core network node, via a cell of a base station, a slice service request comprising one or more identifiers of one or more requested network slices; receiving, by the wireless device from the core network node, via the cell, a slice service response comprising an identifier of an allowed network slice of the one or more requested network slices; receiving, by the wireless device from the core network node, a slice service update comprising: the identifier of the allowed network slice; an identifier of an alternative network slice mapped to the allowed network slice; and alternative slice management information comprising a timer value associated with the alternative network slice; based on receiving the slice service update comprising the alternative slice management information, starting, by the wireless device, a timer based on the timer value; and based on the timer not being expired, sending, by the wireless device to the core network node, of the base station, a slice service request indicating the alternative network slice; and/or based on the timer being expired: discarding the identifier of the alternative network slice; and/or sending, by the wireless device to the core network node, a slice service request indicating the allowed network slice.

Clause 102. A method comprising: receiving, by a wireless device from a core network node, one or more messages comprising: an identifier of an alternative network slice mapped to a network slice; and time information associated with the alternative network slice.

Clause 103. The method of clause 102, further comprising sending, by the wireless device to the core network node: one or more identifiers of one or more requested network slices; a slice service request comprising the one or more identifiers of the one or more requested network slices; and/or a registration request message, a service request message, a protocol data unit session establishment request message, and/or a protocol data unit session modification request message comprising the slice service request and/or the one or more identifiers of the one or more requested network slices; wherein the one or more requested network slices comprise the network slice.

Clause 104. The method of clause 103, wherein the registration request message, the service request message, the protocol data unit session establishment request message, the protocol data unit session modification request message, and/or the slice service request comprises a capability indicator indicating: the wireless device supporting network slice replacement; and/or using the alternative network slice when the network slice is not available.

Clause 105. The method of one or more of clauses 102 to 104, wherein the network slice is an allowed network slice.

Clause 106. The method of one or more of clauses 102 to 105, wherein the one or more messages comprise: an identifier of the network slice; a slice service response comprising the identifier of the network slice; a registration accept message comprising the slice service response; a slice service update; and/or a slice service update comprising the identifier of the alternative network slice, the time information, and/or the identifier of the network slice.

Clause 107. The method of clause 106, wherein the identifier of the network slice and/or the slice service response are included in a registration accept message, a service accept message, a protocol data unit session establishment accept message, a UE configuration update message, and/or a protocol data unit session modification command message.

Clause 108. The method of one or more of clauses 106 to 107, wherein the identifier of the alternative network slice, the time information, the identifier of the network slice, and/or the slice service update are included in a registration accept message, a registration reject message, a protocol data unit session establishment accept message, a protocol data unit session establishment reject message, a service accept message, a service reject message, a user equipment configuration update message, and/or a protocol data unit session modification command message.

Clause 109. The method of one or more of clauses 102 to 108, wherein the core network node is at least one of an access and mobility management function, a session management function, and/or a mobility management entity.

Clause 110. The method of one or more of clauses 102 to 109, further comprising starting, by the wireless device, a timer based on the time information.

Clause 111. The method of clause 110, wherein the starting is based on receiving the time information, an element of the time information, and/or a message comprising the time information.

Clause 112. The method of one or more of clauses 102 to 111, wherein the time information: comprises a timer value for a timer associated with the alternative network slice; and/or is included in alternative slice management information associated with the alternative network slice.

Clause 113. The method of one or more of clauses 102 to 112, wherein the time information comprises information of one or conditions indicating one or more valid time periods during which use of the network slice is allowed.

Clause 114. The method of one or more of clauses 102 to 113, further comprising sending, by the wireless device to the core network node, a slice service request indicating the alternative network slice.

Clause 115. The method of clause 114, wherein the sending is based on a timer associated with the alternative network slice not being expired.

Clause 116. The method of one or more of clauses 114 to 115, further comprising using the alternative network slice after sending the slice service request indicating the alternative network slice, wherein the using the alternative network slice comprises communicating a data via the alternative network slice, sending an establishment request of a protocol data unit session for the alternative network slice, and/or sending an activation request of the protocol data unit session.

Clause 117. The method of one or more of clauses 102 to 116, further comprising discarding the identifier of the alternative network slice.

Clause 118. The method of clause 117, wherein the discarding is based on a timer associated with the alternative network slice being expired.

Clause 119. The method of one or more of clauses 117 to 118, wherein the discarding the identifier of the alternative network slice comprises deleting the identifier of the alternative network slice from the wireless device, removing the identifier of the alternative network slice from a memory of the wireless device.

Clause 120. The method of one or more of clauses 102 to 119, further comprising sending, by the wireless device to the core network node, a slice service request indicating the network slice.

Clause 121. The method of clause 120, wherein the sending is based on a timer associated with the alternative network slice being expired.

Clause 122. A method comprising: sending, by a core network node to a wireless device, one or more messages comprising: an identifier of an alternative network slice mapped to a network slice; and time information associated with the alternative network slice.

Clause 123. The method of clause 122, further comprising receiving, by the core network node from wireless device: one or more identifiers of one or more requested network slices; a slice service request comprising the one or more identifiers of the one or more requested network slices; and/or a registration request message, a service request message, a protocol data unit session establishment request message, and/or a protocol data unit session modification request message comprising the slice service request and/or the one or more identifiers of the one or more requested network slices; wherein the one or more requested network slices comprise the network slice.

Clause 124. The method of clause 123, wherein the registration request message, the service request message, the protocol data unit session establishment request message, the protocol data unit session modification request message, and/or the slice service request comprises a capability indicator indicating: the wireless device supporting network slice replacement; and/or using the alternative network slice when the network slice is not available.

Clause 125. The method of one or more of clauses 122 to 124, wherein the network slice is an allowed network slice.

Clause 126. The method of one or more of clauses 122 to 125, wherein the one or more messages comprise: an identifier of the network slice; a slice service response comprising the identifier of the network slice; a registration accept message comprising the slice service response; a slice service update; and/or a slice service update comprising the identifier of the alternative network slice, the time information, and/or the identifier of the network slice.

Clause 127. The method of clause 126, wherein the identifier of the network slice and/or the slice service response are included in a registration accept message, a service accept message, a protocol data unit session establishment accept message, a UE configuration update message, and/or a protocol data unit session modification command message.

Clause 128. The method of one or more of clauses 126 to 127, wherein the identifier of the alternative network slice, the time information, the identifier of the network slice, and/or the slice service update are included in a registration accept message, a registration reject message, a protocol data unit session establishment accept message, a protocol data unit session establishment reject message, a service accept message, a service reject message, a user equipment configuration update message, and/or a protocol data unit session modification command message.

Clause 129. The method of one or more of clauses 122 to 128, wherein the core network node is at least one of an access and mobility management function, a session management function, and/or a mobility management entity.

Clause 130. The method of one or more of clauses 122 to 129, further comprising starting, by the core network node, a timer based on the time information.

Clause 131. The method of clause 130, wherein the starting is based on sending the time information, an element of the time information, and/or a message comprising the time information.

Clause 132. The method of one or more of clauses 122 to 131, wherein the time information: comprises a timer value for a timer associated with the alternative network slice; and/or is included in alternative slice management information associated with the alternative network slice.

Clause 133. The method of one or more of clauses 122 to 132, wherein the time information comprises information of one or conditions indicating one or more valid time periods during which the use of the network slice is allowed.

Clause 134. The method of one or more of clauses 122 to 133, further comprising receiving, by the core network node from wireless device, a slice service request indicating the alternative network slice.

Clause 135. The method of clause 134, wherein the receiving is while a timer associated with the alternative network slice is not expired.

Clause 136. The method of one or more of clauses 134 to 135, further comprising using the alternative network slice after sending the slice service request indicating the alternative network slice, wherein the using the alternative network slice comprises communicating a data via the alternative network slice, receiving an establishment request of a protocol data unit session for the alternative network slice, and/or receiving an activation request of the protocol data unit session.

Clause 137. The method of one or more of clauses 122 to 136, further comprising discarding the identifier of the alternative network slice.

Clause 138. The method of clause 137, wherein the discarding is based on a timer associated with the alternative network slice being expired.

Clause 139. The method of one or more of clauses 137 to 138, wherein the discarding the identifier of the alternative network slice comprises deleting the identifier of the alternative network slice from the wireless device, removing the identifier of the alternative network slice from a memory of the wireless device.

Clause 140. The method of one or more of clauses 122 to 139, further comprising receiving, by the core network node from wireless device, a slice service request indicating the network slice.

Clause 141. The method of clause 140, wherein the receiving is after a timer associated with the alternative network slice is expired.

Clause 142. A method comprising: receiving, by a base station from a core network node and/or sending, by the base station to a wireless device, one or more messages comprising: an identifier of an alternative network slice mapped to a network slice; and time information associated with the alternative network slice.

Clause 143. The method of clause 142, further comprising receiving, by the base station from wireless device and/or sending, by the base station to the core network node: one or more identifiers of one or more requested network slices; a slice service request comprising the one or more identifiers of the one or more requested network slices; and/or a registration request message, a service request message, a protocol data unit session establishment request message, and/or a protocol data unit session modification request message comprising the slice service request and/or the one or more identifiers of the one or more requested network slices; wherein the one or more requested network slices comprise the network slice.

Clause 144. The method of clause 143, wherein the registration request message, the service request message, the protocol data unit session establishment request message, the protocol data unit session modification request message, and/or the slice service request comprises a capability indicator indicating: the wireless device supporting network slice replacement; and/or using the alternative network slice when the network slice is not available.

Clause 145. The method of one or more of clauses 142 to 144, wherein the network slice is an allowed network slice.

Clause 146. The method of one or more of clauses 142 to 145, wherein the one or more messages comprise: an identifier of the network slice; a slice service response comprising the identifier of the network slice; a registration accept message comprising the slice service response; a slice service update; and/or a slice service update comprising the identifier of the alternative network slice, the time information, and/or the identifier of the network slice.

Clause 147. The method of clause 146, wherein the identifier of the network slice and/or the slice service response are included in a registration accept message, a service accept message, a protocol data unit session establishment accept message, a UE configuration update message, and/or a protocol data unit session modification command message.

Clause 148. The method of one or more of clauses 146 to 147, wherein the identifier of the alternative network slice, the time information, the identifier of the network slice, and/or the slice service update are included in a registration accept message, a registration reject message, a protocol data unit session establishment accept message, a protocol data unit session establishment reject message, a service accept message, a service reject message, a user equipment configuration update message, and/or a protocol data unit session modification command message.

Clause 149. The method of one or more of clauses 142 to 148, wherein the time information: comprises a timer value for a timer associated with the alternative network slice; and/or is included in alternative slice management information associated with the alternative network slice.

Clause 150. The method of one or more of clauses 142 to 149, wherein the time information comprises information of one or conditions indicating one or more valid time periods during which the use of the network slice is allowed.

Clause 151. The method of one or more of clauses 142 to 150, further comprising: receiving, by the base station from wireless device, a slice service request indicating the alternative network slice; and/or sending, by the base station to the core network node, the slice service request indicating the alternative network slice.

Clause 152. The method of clause 151, wherein the receiving is while a timer associated with the alternative network slice is not expired.

Clause 153. The method of one or more of clauses 151 to 152, further comprising using the alternative network slice after sending the slice service request indicating the alternative network slice, wherein the using the alternative network slice comprises communicating a data via the alternative network slice, receiving an establishment request of a protocol data unit session for the alternative network slice, and/or receiving an activation request of the protocol data unit session.

Clause 154. The method of one or more of clauses 142 to 153, further comprising receiving, by the base station from wireless device, and/or sending, by the base station to the core network node, a slice service request indicating the network slice.

Clause 155. The method of clause 154, wherein the receiving is after a timer associated with the alternative network slice is expired.

Clause 156. An apparatus comprising one or more processors and memory storing instructions that, when executed by the one or more processors, cause the apparatus to perform the method of any of clauses 101 to 155.

Clause 157. A non-transitory computer-readable medium comprising instructions that, when executed by one or more processors of an apparatus, cause the apparatus to perform the method of any one of clauses 101 to 155.

What is claimed is:

1. A method comprising:
    receiving, by a wireless device from a core network node, a message comprising:
        an identifier of an allowed network slice;
        an identifier of an alternative network slice mapped to the allowed network slice; and
        information of a network slice group associated with the alternative network slice; and
    sending, by the wireless device to the core network node, a registration request message comprising one of:
        the identifier of the allowed network slice; or
        the identifier of the alternative network slice.

2. The method of claim 1, further comprising receiving, by the wireless device from a base station, an identifier of the network slice group.

3. The method of claim 2, wherein the base station is a second base station, and the message is received from a first base station different from the second base station.

4. The method of claim 2, wherein the identifier of the network slice group is received from the base station in a system information and/or a system information block (SIB).

5. The method of claim 2, further comprising sending, by the wireless device to the base station, the identifier of the alternative network slice.

6. The method of claim 5, wherein the identifier of the alternative network slice is sent in a non-access stratum (NAS) message.

7. The method of claim 5, wherein the sending the identifier of the alternative network slice is based on the receiving the identifier of the network slice group.

8. A wireless device comprising one or more processors and memory storing instructions that, when executed by the one or more processors, cause the wireless device to:
    receive, from a core network node, a message comprising:
        an identifier of an allowed network slice;
        an identifier of an alternative network slice mapped to the allowed network slice; and
        information of a network slice group associated with the alternative network slice; and
    send, to the core network node, a registration request message comprising one of:
        the identifier of the allowed network slice; or
        the identifier of the alternative network slice.

9. The wireless device of claim 8, wherein the instructions further cause the wireless device to receive, from a base station, an identifier of the network slice group.

10. The wireless device of claim 9, wherein the base station is a second base station, and the message is received from a first base station different from the second base station.

11. The wireless device of claim 9, wherein the identifier of the network slice group is received from the base station in a system information and/or a system information block (SIB).

12. The wireless device of claim 9, wherein the instructions further cause the wireless device to send, to the base station, the identifier of the alternative network slice.

13. The wireless device of claim 12, wherein the identifier of the alternative network slice is sent in a non-access stratum (NAS) message.

14. The wireless device of claim 12, wherein the sending the identifier of the alternative network slice is based on the receiving the identifier of the network slice group.

15. A non-transitory computer-readable medium comprising instructions that, when executed by one or more processors of a wireless device, cause the wireless device to:
receive, from a core network node, a message comprising:
an identifier of an allowed network slice;
an identifier of an alternative network slice mapped to the allowed network slice; and
information of a network slice group associated with the alternative network slice; and
send, to the core network node, a registration request message comprising one of:
the identifier of the allowed network slice; or
the identifier of the alternative network slice.

16. The non-transitory computer-readable medium of claim 15, wherein the instructions further cause the wireless device to receive, from a base station, an identifier of the network slice group.

17. The non-transitory computer-readable medium of claim 16, wherein the base station is a second base station, and the message is received from a first base station different from the second base station.

18. The non-transitory computer-readable medium of claim 16, wherein the identifier of the network slice group is received from the base station in a system information and/or a system information block (SIB).

19. The non-transitory computer-readable medium of claim 16, wherein the instructions further cause the wireless device to send, to the base station, the identifier of the alternative network slice.

20. The non-transitory computer-readable medium of claim 19, wherein the identifier of the alternative network slice is sent in a non-access stratum (NAS) message.

* * * * *